US012657589B1

(12) United States Patent (10) Patent No.: US 12,657,589 B1
Abraham et al. (45) Date of Patent: Jun. 16, 2026

(54) IDENTITY LINKAGE SYSTEMS AND METHODS FOR FRAUD DETECTION

(71) Applicant: Experian Information Solutions, Inc., Costa Mesa, CA (US)

(72) Inventors: Cherian K. Abraham, Richmond, VA (US); Manoj Khanwalkar, Princeton Junction, NJ (US); Jose Rafael Pallares, Culver City, CA (US); Matthew Becker, Bismarck, ND (US); Martin John Christiansen, Mesa, AZ (US); Geoffrey David Cadien, Mesa, AZ (US); Muhilan Mahalingam Govindaraj, Phoenix, AZ (US); Rafi Shaik, Santa Clara, CA (US); David Gene Tiezzi, Laguna Beach, CA (US)

(73) Assignee: EXPERIAN INFORMATION SOLUTIONS, INC., Costa Mesa, CA (US)

( * ) Notice: Subject to any disclaimer, the term of this patent is extended or adjusted under 35 U.S.C. 154(b) by 0 days.

(21) Appl. No.: 17/647,647

(22) Filed: Jan. 11, 2022

Related U.S. Application Data

(60) Provisional application No. 63/136,591, filed on Jan. 12, 2021.

(51) Int. Cl.
G06Q 40/00 (2023.01)
G06Q 20/40 (2012.01)

(52) U.S. Cl.
CPC ..... G06Q 20/4016 (2013.01); G06Q 20/4014 (2013.01)

(58) Field of Classification Search
CPC ...................... G06Q 20/4016; G06Q 20/4014
(Continued)

(56) References Cited

U.S. PATENT DOCUMENTS

| 3,752,904 A | 8/1973 | Waterbury |
| 4,795,890 A | 1/1989 | Goldman |

(Continued)

FOREIGN PATENT DOCUMENTS

| AU | 2017397325 | 8/2018 |
| AU | 2018291152 | 11/2021 |

(Continued)

OTHER PUBLICATIONS

U.S. Appl. No. 12/705,489, filed Feb. 12, 2010, Bargoli et al.
(Continued)

*Primary Examiner* — Olabode Akintola
(74) *Attorney, Agent, or Firm* — KNOBBE, MARTENS, OLSON & BEAR, LLP

(57) ABSTRACT

Embodiments are disclosed of a system for detecting potential online transaction fraud. The system can receive transaction data associated with an online transaction. In some embodiments, the system can determine consumer identification data and payment instrument data from the transaction data. The system can compare the consumer identification data and the payment instrument data associated with the online transaction against consumer profiles generated based on existing consumer information and payment instrument information. Based on the comparison, the system can generate a match score indicative of a likelihood that the online transaction is fraudulent.

20 Claims, 14 Drawing Sheets

(58) Field of Classification Search
USPC .......................................................... 705/44
See application file for complete search history.

(56) References Cited

U.S. PATENT DOCUMENTS

| | | | |
|---|---|---|---|
| 4,891,503 A | 1/1990 | Jewell |
| 4,977,595 A | 12/1990 | Ohta et al. |
| 4,989,141 A | 1/1991 | Lyons et al. |
| 5,095,480 A | 3/1992 | Fenner |
| 5,126,936 A | 6/1992 | Champion et al. |
| 5,351,293 A | 9/1994 | Michener et al. |
| 5,490,258 A | 2/1996 | Fenner |
| 5,590,038 A | 12/1996 | Pitroda |
| 5,640,577 A | 6/1997 | Scharmer |
| 5,659,725 A | 8/1997 | Levy et al. |
| 5,659,731 A | 8/1997 | Gustafson |
| 5,715,314 A | 2/1998 | Payne et al. |
| 5,719,941 A | 2/1998 | Swift et al. |
| 5,748,098 A | 5/1998 | Grace |
| 5,754,632 A | 5/1998 | Smith |
| 5,828,840 A | 10/1998 | Cowan et al. |
| 5,832,068 A | 11/1998 | Smith |
| 5,842,224 A | 11/1998 | Fenner |
| 5,844,218 A | 12/1998 | Kawan et al. |
| 5,860,136 A | 1/1999 | Fenner |
| 5,866,889 A | 2/1999 | Weiss et al. |
| 5,881,131 A | 3/1999 | Farris et al. |
| 5,903,830 A | 5/1999 | Joao et al. |
| 5,913,196 A | 6/1999 | Talmor et al. |
| 5,956,693 A | 9/1999 | Geerlings |
| 5,966,695 A | 10/1999 | Melchione et al. |
| 5,999,596 A | 12/1999 | Walker et al. |
| 6,021,397 A | 2/2000 | Jones et al. |
| 6,021,943 A | 2/2000 | Chastain |
| 6,026,440 A | 2/2000 | Shrader et al. |
| 6,038,551 A | 3/2000 | Barlow et al. |
| 6,055,570 A | 4/2000 | Nielsen |
| 6,069,941 A | 5/2000 | Byrd et al. |
| 6,072,894 A | 6/2000 | Payne |
| 6,073,106 A | 6/2000 | Rozen et al. |
| 6,073,140 A | 6/2000 | Morgan et al. |
| 6,084,704 A | 7/2000 | Button et al. |
| 6,085,242 A | 7/2000 | Chandra |
| 6,119,103 A | 9/2000 | Basch et al. |
| 6,128,602 A | 10/2000 | Northington et al. |
| 6,157,707 A | 12/2000 | Baulier et al. |
| 6,161,139 A | 12/2000 | Win et al. |
| 6,182,068 B1 | 1/2001 | Culliss |
| 6,182,219 B1 | 1/2001 | Feldbau et al. |
| 6,182,229 B1 | 1/2001 | Nielsen |
| 6,196,460 B1 | 3/2001 | Shin |
| 6,233,588 B1 | 5/2001 | Marchoili et al. |
| 6,247,000 B1 | 6/2001 | Hawkins et al. |
| 6,253,202 B1 | 6/2001 | Gilmour |
| 6,254,000 B1 | 7/2001 | Degen et al. |
| 6,263,447 B1 | 7/2001 | French et al. |
| 6,269,369 B1 | 7/2001 | Robertson |
| 6,282,658 B2 | 8/2001 | French et al. |
| 6,292,795 B1 | 9/2001 | Peters et al. |
| 6,311,169 B2 | 10/2001 | Duhon |
| 6,321,339 B1 | 11/2001 | French et al. |
| 6,327,578 B1 | 12/2001 | Linehan |
| 6,343,279 B1 | 1/2002 | Bissonette et al. |
| 6,356,937 B1 | 3/2002 | Montville et al. |
| 6,397,212 B1 | 5/2002 | Biffar |
| 6,453,353 B1 | 9/2002 | Win et al. |
| 6,457,012 B1 | 9/2002 | Jatkowski |
| 6,463,533 B1 | 10/2002 | Calamera et al. |
| 6,473,740 B2 | 10/2002 | Cockril et al. |
| 6,496,936 B1 | 12/2002 | French et al. |
| 6,510,415 B1 | 1/2003 | Talmor et al. |
| 6,523,021 B1 | 2/2003 | Monberg et al. |
| 6,523,041 B1 | 2/2003 | Morgan et al. |
| 6,539,377 B1 | 3/2003 | Culliss |
| 6,564,210 B1 | 5/2003 | Korda et al. |
| 6,571,334 B1 | 5/2003 | Feldbau et al. |
| 6,574,736 B1 | 6/2003 | Andrews |
| 6,581,059 B1 | 6/2003 | Barrett et al. |
| 6,601,173 B1 | 7/2003 | Mohler |
| 6,607,136 B1 | 8/2003 | Atsmon et al. |
| 6,622,131 B1 | 9/2003 | Brown et al. |
| 6,629,245 B1 | 9/2003 | Stone et al. |
| 6,647,383 B1 | 11/2003 | August et al. |
| 6,654,786 B1 | 11/2003 | Fox et al. |
| 6,658,393 B1 | 12/2003 | Basch et al. |
| 6,679,425 B1 | 1/2004 | Sheppard et al. |
| 6,714,944 B1 | 3/2004 | Shapiro et al. |
| 6,725,381 B1 | 4/2004 | Smith et al. |
| 6,734,886 B1 | 5/2004 | Hagan et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,782,379 B2 | 8/2004 | Lee |
| 6,795,812 B1 | 9/2004 | Lent et al. |
| 6,796,497 B2 | 9/2004 | Benkert et al. |
| 6,804,346 B1 | 10/2004 | Mewhinney |
| 6,805,287 B2 | 10/2004 | Bishop et al. |
| 6,816,850 B2 | 11/2004 | Culliss |
| 6,816,871 B2 | 11/2004 | Lee |
| 6,823,319 B1 | 11/2004 | Lynch et al. |
| 6,829,711 B1 | 12/2004 | Kwok et al. |
| 6,845,448 B1 | 1/2005 | Chaganti et al. |
| 6,857,073 B2 | 2/2005 | French et al. |
| 6,871,287 B1 | 3/2005 | Ellingson |
| 6,892,307 B1 | 5/2005 | Wood et al. |
| 6,900,731 B2 | 5/2005 | Kreiner et al. |
| 6,907,408 B2 | 6/2005 | Angel |
| 6,908,030 B2 | 6/2005 | Rajasekaran et al. |
| 6,910,624 B1 | 6/2005 | Natsuno |
| 6,920,435 B2 | 7/2005 | Hoffman et al. |
| 6,928,487 B2 | 8/2005 | Eggebraaten et al. |
| 6,934,714 B2 | 8/2005 | Meinig |
| 6,934,849 B2 | 8/2005 | Kramer et al. |
| 6,934,858 B2 | 8/2005 | Woodhill |
| 6,947,989 B2 | 9/2005 | Gullotta et al. |
| 6,950,807 B2 | 9/2005 | Brock |
| 6,950,809 B2 | 9/2005 | Dahan et al. |
| 6,950,858 B2 | 9/2005 | Ogami |
| 6,952,682 B1 | 10/2005 | Wellman |
| 6,965,881 B1 | 11/2005 | Brickell et al. |
| 6,968,319 B1 | 11/2005 | Remington et al. |
| 6,973,462 B2 | 12/2005 | Dattero et al. |
| 6,983,381 B2 | 1/2006 | Jerdonek |
| 6,985,887 B1 | 1/2006 | Sunstein et al. |
| 6,986,461 B1 | 1/2006 | Geoghegan et al. |
| 6,988,085 B2 | 1/2006 | Hedy |
| 6,993,596 B2 | 1/2006 | Hinton et al. |
| 6,999,941 B1 | 2/2006 | Agarwal |
| 7,016,907 B2 | 3/2006 | Boreham et al. |
| 7,028,013 B2 | 4/2006 | Saeki |
| 7,028,052 B2 | 4/2006 | Chapman et al. |
| 7,039,607 B2 | 5/2006 | Watarai et al. |
| 7,043,476 B2 | 5/2006 | Robson |
| 7,058,817 B1 | 6/2006 | Ellmore |
| 7,059,531 B2 | 6/2006 | Beenau et al. |
| 7,062,475 B2 | 6/2006 | Szabo et al. |
| 7,076,462 B1 | 7/2006 | Nelson et al. |
| 7,085,727 B2 | 8/2006 | VanOrman |
| 7,089,584 B1 | 8/2006 | Sharma |
| 7,107,241 B1 | 9/2006 | Pinto |
| 7,117,172 B1 | 10/2006 | Black |
| 7,121,471 B2 | 10/2006 | Beenau et al. |
| 7,124,144 B2 | 10/2006 | Christianson et al. |
| 7,154,375 B2 | 12/2006 | Beenau et al. |
| 7,155,739 B2 | 12/2006 | Bari et al. |
| 7,174,454 B2 | 2/2007 | Roskind |
| 7,177,846 B2 | 2/2007 | Moenickheim et al. |
| 7,194,416 B1 | 3/2007 | Provost et al. |
| 7,200,602 B2 | 4/2007 | Jonas |
| 7,203,653 B1 | 4/2007 | McIntosh |
| 7,209,895 B2 | 4/2007 | Kundtz et al. |
| 7,219,107 B2 | 5/2007 | Beringer |
| 7,222,369 B2 | 5/2007 | Vering et al. |

(56)                    References Cited

U.S. PATENT DOCUMENTS

| 7,225,464 | B2 | 5/2007 | Satyavolu et al. |
| 7,231,657 | B2 | 6/2007 | Honarvar et al. |
| 7,234,156 | B2 | 6/2007 | French et al. |
| 7,234,160 | B2 | 6/2007 | Vogel et al. |
| 7,237,267 | B2 | 6/2007 | Rayes et al. |
| 7,240,199 | B2 | 7/2007 | Tomkow |
| 7,240,363 | B1 | 7/2007 | Ellingson |
| 7,243,369 | B2 | 7/2007 | Bhat et al. |
| 7,246,067 | B2 | 7/2007 | Austin et al. |
| 7,246,740 | B2 | 7/2007 | Swift et al. |
| 7,249,096 | B1 | 7/2007 | Lasater et al. |
| 7,249,113 | B1 | 7/2007 | Continelli et al. |
| 7,251,347 | B2 | 7/2007 | Smith |
| 7,263,497 | B1 | 8/2007 | Wiser et al. |
| 7,289,971 | B1 | 10/2007 | O'Neil et al. |
| 7,303,120 | B2 | 12/2007 | Beenau et al. |
| 7,310,611 | B2 | 12/2007 | Shibuya et al. |
| 7,314,167 | B1 | 1/2008 | Kiliccote |
| 7,328,233 | B2 | 2/2008 | Salim et al. |
| 7,330,871 | B2 | 2/2008 | Barber |
| 7,333,635 | B2 | 2/2008 | Tsantes et al. |
| 7,337,468 | B2 | 2/2008 | Metzger |
| 7,340,042 | B2 | 3/2008 | Cluff et al. |
| 7,340,679 | B2 | 3/2008 | Botscheck et al. |
| 7,343,149 | B2 | 3/2008 | Benco |
| 7,343,295 | B2 | 3/2008 | Pomerance |
| 7,356,503 | B1 | 4/2008 | Johnson et al. |
| 7,356,506 | B2 | 4/2008 | Watson et al. |
| 7,356,516 | B2 | 4/2008 | Richey et al. |
| 7,370,044 | B2 | 5/2008 | Mulhern et al. |
| 7,370,351 | B1 | 5/2008 | Ramachandran et al. |
| 7,383,988 | B2 | 6/2008 | Slonecker, Jr. |
| 7,386,448 | B1 | 6/2008 | Poss et al. |
| 7,389,913 | B2 | 6/2008 | Starrs |
| 7,403,942 | B1 | 7/2008 | Bayliss |
| 7,421,732 | B2 | 9/2008 | Costa-Requena et al. |
| 7,433,864 | B2 | 10/2008 | Malik |
| 7,437,679 | B2 | 10/2008 | Uemura et al. |
| 7,438,226 | B2 | 10/2008 | Helsper et al. |
| 7,444,414 | B2 | 10/2008 | Foster et al. |
| 7,444,518 | B1 | 10/2008 | Dharmarajan et al. |
| 7,451,113 | B1 | 11/2008 | Kasower |
| 7,458,508 | B1 | 12/2008 | Shao et al. |
| 7,460,857 | B2 | 12/2008 | Roach, Jr. |
| 7,467,401 | B2 | 12/2008 | Cicchitto |
| 7,478,157 | B2 | 1/2009 | Bohrer et al. |
| 7,480,631 | B1 | 1/2009 | Merced et al. |
| 7,490,356 | B2 | 2/2009 | Lieblich et al. |
| 7,503,489 | B2 | 3/2009 | Heffez |
| 7,509,117 | B2 | 3/2009 | Yum |
| 7,509,278 | B2 | 3/2009 | Jones |
| 7,512,221 | B2 | 3/2009 | Toms |
| 7,519,558 | B2 | 4/2009 | Ballard et al. |
| 7,526,796 | B2 | 4/2009 | Lulich et al. |
| 7,529,698 | B2 | 5/2009 | Joao |
| 7,530,097 | B2 | 5/2009 | Casco-Arias et al. |
| 7,542,993 | B2 | 6/2009 | Satterfield et al. |
| 7,543,739 | B2 | 6/2009 | Brown et al. |
| 7,546,271 | B1 | 6/2009 | Chmielewski et al. |
| 7,548,886 | B2 | 6/2009 | Kirkland et al. |
| 7,552,080 | B1 | 6/2009 | Willard et al. |
| 7,552,123 | B2 | 6/2009 | Wade et al. |
| 7,552,467 | B2 | 6/2009 | Lindsay |
| 7,555,459 | B2 | 6/2009 | Dhar et al. |
| 7,562,184 | B2 | 7/2009 | Henmi et al. |
| 7,562,814 | B1 | 7/2009 | Shao et al. |
| 7,566,002 | B2 | 7/2009 | Love et al. |
| 7,571,473 | B1 | 8/2009 | Boydstun et al. |
| 7,575,157 | B2 | 8/2009 | Barnhardt et al. |
| 7,577,665 | B2 | 8/2009 | Ramer et al. |
| 7,577,934 | B2 | 8/2009 | Anonsen et al. |
| 7,580,884 | B2 | 8/2009 | Cook |
| 7,581,112 | B2 | 8/2009 | Brown et al. |
| 7,584,126 | B1 | 9/2009 | White |
| 7,584,146 | B1 | 9/2009 | Duhon |
| 7,587,366 | B2 | 9/2009 | Grim, III et al. |
| 7,587,368 | B2 | 9/2009 | Felsher |
| 7,603,701 | B2 | 10/2009 | Gaucas |
| 7,606,401 | B2 | 10/2009 | Hoffman et al. |
| 7,606,725 | B2 | 10/2009 | Robertson et al. |
| 7,610,216 | B1 | 10/2009 | May et al. |
| 7,613,600 | B2 | 11/2009 | Krane |
| 7,620,596 | B2 | 11/2009 | Knudson et al. |
| 7,623,844 | B2 | 11/2009 | Herrmann et al. |
| 7,630,932 | B2 | 12/2009 | Danaher et al. |
| 7,634,737 | B2 | 12/2009 | Beringer et al. |
| 7,636,941 | B2 | 12/2009 | Blinn et al. |
| 7,641,113 | B1 | 1/2010 | Alvarez et al. |
| 7,647,344 | B2 | 1/2010 | Skurtovich, Jr. et al. |
| 7,653,592 | B1 | 1/2010 | Flaxman et al. |
| 7,653,600 | B2 | 1/2010 | Gustin |
| 7,653,688 | B2 | 1/2010 | Bittner |
| 7,657,431 | B2 | 2/2010 | Hayakawa |
| 7,660,989 | B2 | 2/2010 | Tomkow |
| 7,672,833 | B2 | 3/2010 | Blume et al. |
| 7,676,834 | B2 | 3/2010 | Camaisa et al. |
| 7,685,096 | B2 | 3/2010 | Margolus et al. |
| 7,685,209 | B1 | 3/2010 | Norton et al. |
| 7,685,279 | B2 | 3/2010 | Miltonberger et al. |
| 7,686,214 | B1 | 3/2010 | Shao et al. |
| 7,689,487 | B1 | 3/2010 | Britto et al. |
| 7,689,505 | B2 | 3/2010 | Kasower |
| 7,689,563 | B1 | 3/2010 | Jacobson |
| 7,690,032 | B1 | 3/2010 | Peirce |
| 7,698,214 | B1 | 4/2010 | Lindgren |
| 7,698,217 | B1 | 4/2010 | Phillips et al. |
| 7,698,445 | B2 | 4/2010 | Fitzpatrick et al. |
| 7,698,558 | B2 | 4/2010 | Tomkow |
| 7,707,271 | B2 | 4/2010 | Rudkin et al. |
| 7,707,624 | B2 | 4/2010 | Tomkow |
| 7,708,190 | B2 | 5/2010 | Brandt et al. |
| 7,711,635 | B2 | 5/2010 | Steele et al. |
| 7,725,385 | B2 | 5/2010 | Royer et al. |
| 7,730,078 | B2 | 6/2010 | Schwabe et al. |
| 7,739,139 | B2 | 6/2010 | Robertson et al. |
| 7,747,494 | B1 | 6/2010 | Kothari et al. |
| 7,747,520 | B2 | 6/2010 | Livermore et al. |
| 7,747,521 | B2 | 6/2010 | Serio |
| 7,747,542 | B2 | 6/2010 | Morley et al. |
| 7,761,384 | B2 | 7/2010 | Madhogarhia |
| 7,761,568 | B1 | 7/2010 | Levi et al. |
| 7,765,166 | B2 | 7/2010 | Beringer et al. |
| 7,765,311 | B2 | 7/2010 | Itabashi et al. |
| 7,769,696 | B2 | 8/2010 | Yoda |
| 7,769,697 | B2 | 8/2010 | Fieschi et al. |
| 7,769,998 | B2 | 8/2010 | Lynch et al. |
| 7,774,270 | B1 | 8/2010 | MacCloskey |
| 7,788,040 | B2 | 8/2010 | Haskell et al. |
| 7,792,715 | B1 | 9/2010 | Kasower |
| 7,792,725 | B2 | 9/2010 | Booraem et al. |
| 7,793,835 | B1 | 9/2010 | Coggeshall et al. |
| 7,797,725 | B2 | 9/2010 | Lunt et al. |
| 7,801,828 | B2 | 9/2010 | Candella et al. |
| 7,801,956 | B1 | 9/2010 | Cumberbatch et al. |
| 7,802,104 | B2 | 9/2010 | Dickinson |
| 7,810,036 | B2 | 10/2010 | Bales et al. |
| 7,818,228 | B1 | 10/2010 | Coulter |
| 7,827,115 | B2 | 11/2010 | Weller et al. |
| 7,841,004 | B1 | 11/2010 | Balducci et al. |
| 7,841,008 | B1 | 11/2010 | Cole et al. |
| 7,844,520 | B1 | 11/2010 | Franklin |
| 7,849,014 | B2 | 12/2010 | Erikson |
| 7,849,624 | B2 | 12/2010 | Holt et al. |
| 7,853,493 | B2 | 12/2010 | DeBie et al. |
| 7,853,533 | B2 | 12/2010 | Eisen |
| 7,853,984 | B2 | 12/2010 | Antell et al. |
| 7,865,557 | B2 | 1/2011 | Tomkow |
| 7,865,958 | B2 | 1/2011 | Lieblich et al. |
| 7,870,078 | B2 | 1/2011 | Clark et al. |
| 7,877,304 | B1 | 1/2011 | Coulter |
| 7,877,784 | B2 | 1/2011 | Chow et al. |
| 7,880,728 | B2 | 2/2011 | de los Reyes et al. |
| 7,886,008 | B2 | 2/2011 | Tomkow et al. |
| 7,908,242 | B1 | 3/2011 | Achanta |

(56)             References Cited

U.S. PATENT DOCUMENTS

| | | | |
|---|---|---|---|
| 7,909,246 B2 | 3/2011 | Hogg et al. |
| 7,912,865 B2 | 3/2011 | Akerman et al. |
| 7,930,285 B2 | 4/2011 | Abraham et al. |
| 7,930,411 B1 | 4/2011 | Hayward |
| 7,941,324 B1 | 5/2011 | Sholtis |
| 7,957,266 B2 | 6/2011 | Kodialam et al. |
| 7,958,046 B2 | 6/2011 | Doerner et al. |
| 7,966,192 B2 | 6/2011 | Pagliari et al. |
| 7,966,372 B1 | 6/2011 | Tomkow |
| 7,970,679 B2 | 6/2011 | Kasower |
| 7,975,299 B1 | 7/2011 | Balducci et al. |
| 7,979,908 B2 | 7/2011 | Millwee |
| 7,983,932 B2 | 7/2011 | Kane |
| 7,983,979 B2 | 7/2011 | Holland, IV |
| 7,991,688 B2 | 8/2011 | Phelan et al. |
| 8,001,153 B2 | 8/2011 | Skurtovich, Jr. et al. |
| 8,001,235 B2 | 8/2011 | Russ et al. |
| 8,005,155 B1 | 8/2011 | Lee et al. |
| 8,011,582 B2 | 9/2011 | Ghafarzadeh |
| 8,032,932 B2 | 10/2011 | Speyer et al. |
| 8,037,097 B2 | 10/2011 | Guo et al. |
| 8,041,956 B1 | 10/2011 | White et al. |
| 8,055,904 B1 | 11/2011 | Cato et al. |
| 8,060,424 B2 | 11/2011 | Kasower |
| 8,060,916 B2 | 11/2011 | Bajaj et al. |
| 8,065,233 B2 | 11/2011 | Lee et al. |
| 8,073,785 B1 | 12/2011 | Candella et al. |
| 8,078,453 B2 | 12/2011 | Shaw |
| 8,078,524 B2 | 12/2011 | Crawford et al. |
| 8,078,881 B1 | 12/2011 | Liu |
| 8,079,070 B2 | 12/2011 | Camaisa et al. |
| 8,099,341 B2 | 1/2012 | Varghese |
| 8,104,679 B2 | 1/2012 | Brown |
| 8,116,731 B2 | 2/2012 | Buhrmann et al. |
| 8,116,751 B2 | 2/2012 | Aaron |
| 8,127,982 B1 | 3/2012 | Casey et al. |
| 8,127,986 B1 | 3/2012 | Taylor et al. |
| 8,131,777 B2 | 3/2012 | McCullouch |
| 8,144,368 B2 | 3/2012 | Rodriguez et al. |
| 8,151,327 B2 | 4/2012 | Eisen |
| 8,161,104 B2 | 4/2012 | Tomkow |
| 8,172,132 B2 | 5/2012 | Love et al. |
| 8,175,889 B1 | 5/2012 | Girulat et al. |
| 8,185,747 B2 | 5/2012 | Wood et al. |
| 8,190,513 B2 | 5/2012 | Felger |
| 8,195,549 B2 | 6/2012 | Kasower |
| 8,209,389 B2 | 6/2012 | Tomkow |
| 8,219,771 B2 | 7/2012 | Le Neel |
| 8,219,822 B2 | 7/2012 | Camaisa et al. |
| 8,224,723 B2 | 7/2012 | Bosch et al. |
| 8,224,913 B2 | 7/2012 | Tomkow |
| 8,225,395 B2 | 7/2012 | Atwood et al. |
| 8,229,810 B2 | 7/2012 | Butera et al. |
| 8,229,844 B2 | 7/2012 | Felger |
| 8,234,498 B2 | 7/2012 | Britti et al. |
| 8,239,677 B2 | 8/2012 | Colson |
| 8,239,929 B2 | 8/2012 | Kwan et al. |
| 8,241,369 B2 | 8/2012 | Stevens |
| 8,244,629 B2 | 8/2012 | Lewis et al. |
| 8,244,848 B1 | 8/2012 | Narayanan et al. |
| 8,255,452 B2 | 8/2012 | Piliouras |
| 8,255,971 B1 | 8/2012 | Webb et al. |
| 8,255,978 B2 | 8/2012 | Dick |
| 8,260,706 B2 | 9/2012 | Freishtat et al. |
| 8,261,334 B2 | 9/2012 | Hazlehurst et al. |
| 8,266,065 B2 | 9/2012 | Dilip et al. |
| 8,275,845 B2 | 9/2012 | Tomkow |
| 8,280,348 B2 | 10/2012 | Snyder et al. |
| 8,281,372 B1 | 10/2012 | Vidal |
| 8,285,613 B1 | 10/2012 | Coulter |
| 8,285,656 B1 | 10/2012 | Chang et al. |
| 8,291,218 B2 | 10/2012 | Garcia et al. |
| 8,291,477 B2 | 10/2012 | Lunt |
| 8,295,898 B2 | 10/2012 | Ashfield et al. |
| 8,296,562 B2 | 10/2012 | Williams et al. |
| 8,302,164 B2 | 10/2012 | Lunt |
| 8,312,033 B1 | 11/2012 | McMillan |
| 8,315,940 B2 | 11/2012 | Winbom et al. |
| 8,327,429 B2 | 12/2012 | Speyer et al. |
| 8,359,278 B2 | 1/2013 | Domenikos et al. |
| 8,359,393 B2 | 1/2013 | Metzger |
| 8,374,634 B2 | 2/2013 | Dankar et al. |
| 8,374,973 B2 | 2/2013 | Herbrich et al. |
| 8,406,736 B2 | 3/2013 | Das et al. |
| 8,423,648 B2 | 4/2013 | Ferguson et al. |
| 8,442,886 B1 | 5/2013 | Haggerty et al. |
| 8,442,910 B2 | 5/2013 | Morris et al. |
| 8,443,202 B2 | 5/2013 | White et al. |
| 8,447,016 B1 | 5/2013 | Kugler et al. |
| 8,456,293 B1 | 6/2013 | Trundle et al. |
| 8,464,939 B1 | 6/2013 | Taylor et al. |
| 8,468,090 B2 | 6/2013 | Lesandro et al. |
| 8,468,198 B2 | 6/2013 | Tomkow |
| 8,468,199 B2 | 6/2013 | Tomkow |
| 8,478,674 B1 | 7/2013 | Kapczynski et al. |
| 8,478,981 B2 | 7/2013 | Khan et al. |
| 8,484,186 B1 | 7/2013 | Kapczynski et al. |
| 8,484,706 B2 | 7/2013 | Tomkow |
| 8,504,628 B2 | 8/2013 | Tomkow |
| 8,515,828 B1 | 8/2013 | Wolf et al. |
| 8,515,844 B2 | 8/2013 | Kasower |
| 8,527,357 B1 | 9/2013 | Ganesan |
| 8,527,417 B2 | 9/2013 | Telle et al. |
| 8,527,773 B1 | 9/2013 | Metzger |
| 8,528,078 B2 | 9/2013 | Camaisa et al. |
| 8,533,118 B2 | 9/2013 | Weller et al. |
| 8,533,791 B2 | 9/2013 | Samuelsson et al. |
| 8,549,590 B1 | 10/2013 | de Villiers Prichard et al. |
| 8,560,381 B2 | 10/2013 | Green et al. |
| 8,572,391 B2 | 10/2013 | Golan et al. |
| 8,578,496 B1 | 11/2013 | Krishnappa |
| 8,588,748 B2 | 11/2013 | Buhrman et al. |
| 8,600,886 B2 | 12/2013 | Ramavarjula et al. |
| 8,601,602 B1 | 12/2013 | Zheng |
| 8,606,234 B2 | 12/2013 | Pei et al. |
| 8,606,694 B2 | 12/2013 | Campbell et al. |
| 8,620,942 B1 | 12/2013 | Hoffman et al. |
| 8,630,938 B2 | 1/2014 | Cheng et al. |
| 8,645,275 B2 | 2/2014 | Seifert et al. |
| 8,646,051 B2 | 2/2014 | Paden et al. |
| 8,656,504 B2 | 2/2014 | Lurey et al. |
| 8,671,115 B2 | 3/2014 | Skurtovich, Jr. et al. |
| 8,688,543 B2 | 4/2014 | Dominquez |
| 8,689,311 B2 | 4/2014 | Blinn et al. |
| 8,695,105 B2 | 4/2014 | Mahendrakar et al. |
| 8,700,515 B2 | 4/2014 | Duckworth et al. |
| 8,701,199 B1 | 4/2014 | Dotan et al. |
| 8,705,718 B2 | 4/2014 | Baniak et al. |
| 8,706,599 B1 | 4/2014 | Koenig et al. |
| 8,713,651 B1 | 4/2014 | Stibel |
| 8,725,613 B1 | 5/2014 | Celka et al. |
| 8,738,934 B2 | 5/2014 | Lurey et al. |
| 8,744,956 B1 | 6/2014 | DiChiara et al. |
| 8,751,388 B1 | 6/2014 | Chapa |
| 8,762,287 B2 | 6/2014 | Morley et al. |
| 8,768,914 B2 | 7/2014 | Scriffignano et al. |
| 8,769,614 B1 | 7/2014 | Knox et al. |
| 8,781,882 B1 | 7/2014 | Arboletti et al. |
| 8,781,953 B2 | 7/2014 | Kasower |
| 8,781,975 B2 | 7/2014 | Bennett et al. |
| 8,782,154 B2 | 7/2014 | Tomkow |
| 8,782,217 B1 | 7/2014 | Arone et al. |
| 8,782,753 B2 | 7/2014 | Lunt |
| 8,793,166 B2 | 7/2014 | Mizhen |
| 8,793,509 B1 | 7/2014 | Nelson et al. |
| 8,793,777 B2 | 7/2014 | Colson |
| 8,800,005 B2 | 8/2014 | Lunt |
| 8,806,584 B2 | 8/2014 | Lunt |
| 8,818,888 B1 | 8/2014 | Kapczynski et al. |
| 8,819,793 B2 | 8/2014 | Gottschalk, Jr. |
| 8,826,371 B2 | 9/2014 | Webb et al. |
| 8,826,393 B2 | 9/2014 | Eisen |
| 8,831,564 B2 | 9/2014 | Ferguson et al. |
| 8,839,394 B2 | 9/2014 | Dennis et al. |

(56)                References Cited

U.S. PATENT DOCUMENTS

| | | | |
|---|---|---|---|
| 8,856,894 B1 | 10/2014 | Dean et al. |
| 8,862,514 B2 | 10/2014 | Eisen |
| 8,868,932 B2 | 10/2014 | Lurey et al. |
| D717,332 S | 11/2014 | Nies et al. |
| 8,931,058 B2 | 1/2015 | DiChiara et al. |
| 8,938,399 B1 | 1/2015 | Herman |
| 8,954,459 B1 | 2/2015 | McMillan et al. |
| 8,972,400 B1 | 3/2015 | Kapczynski et al. |
| 9,010,627 B1 | 4/2015 | Prasad et al. |
| 9,043,886 B2 | 5/2015 | Srinivasan et al. |
| 9,047,473 B2 | 6/2015 | Samuelsson et al. |
| 9,100,400 B2 | 8/2015 | Lunt |
| 9,106,691 B1 | 8/2015 | Burger et al. |
| 9,124,606 B2 | 9/2015 | Metzger |
| 9,147,042 B1 | 9/2015 | Haller et al. |
| 9,147,117 B1 | 9/2015 | Madhu et al. |
| 9,154,482 B2 | 10/2015 | Dudziak et al. |
| 9,158,903 B2 | 10/2015 | Metzger |
| 9,185,123 B2 | 11/2015 | Dennis et al. |
| 9,195,984 B1 | 11/2015 | Spector et al. |
| 9,195,985 B2 | 11/2015 | Domenica et al. |
| 9,196,004 B2 | 11/2015 | Eisen |
| 9,203,819 B2 | 12/2015 | Fenton et al. |
| 9,215,223 B2 | 12/2015 | Kirsch |
| 9,235,728 B2 | 1/2016 | Gottschalk, Jr. et al. |
| 9,246,899 B1 | 1/2016 | Durney et al. |
| 9,256,624 B2 | 2/2016 | Skurtovich, Jr. et al. |
| 9,269,085 B2 | 2/2016 | Webb et al. |
| 9,294,476 B1 | 3/2016 | Lurey et al. |
| 9,344,413 B2 | 5/2016 | Kirsch |
| 9,361,597 B2 | 6/2016 | Britton et al. |
| 9,380,057 B2 | 6/2016 | Knauss |
| 9,390,384 B2 | 7/2016 | Eisen |
| 9,391,971 B2 | 7/2016 | Lunt |
| 9,412,141 B2 | 8/2016 | Prichard et al. |
| 9,420,448 B2 | 8/2016 | Dankar et al. |
| 9,462,044 B1 | 10/2016 | Preibisch et al. |
| 9,465,786 B2 | 10/2016 | Lurey et al. |
| 9,467,445 B2 | 10/2016 | Egan et al. |
| 9,491,160 B2 | 11/2016 | Livesay et al. |
| 9,578,014 B2 | 2/2017 | Sondhi et al. |
| 9,600,651 B1 | 3/2017 | Ryan et al. |
| 9,607,336 B1 | 3/2017 | Dean et al. |
| 9,626,680 B1 | 4/2017 | Ryan et al. |
| 9,633,322 B1 | 4/2017 | Burger |
| 9,641,521 B2 | 5/2017 | Egan et al. |
| 9,665,854 B1 | 5/2017 | Burger et al. |
| 9,684,905 B1 | 6/2017 | Haller et al. |
| 9,697,521 B2 | 7/2017 | Webb et al. |
| 9,706,402 B2 | 7/2017 | Kueh |
| 9,710,523 B2 | 7/2017 | Skurtovich, Jr. et al. |
| 9,721,147 B1 | 8/2017 | Kapczynski |
| 9,734,501 B2 | 8/2017 | Durney et al. |
| 9,754,256 B2 | 9/2017 | Britton et al. |
| 9,754,311 B2 | 9/2017 | Eisen |
| 9,760,885 B1 | 9/2017 | Ramalingam et al. |
| 9,779,392 B1 | 10/2017 | Prasad et al. |
| 9,818,121 B2 | 11/2017 | Snyder et al. |
| 9,843,582 B2 | 12/2017 | Mahendrakar et al. |
| 9,876,796 B2 | 1/2018 | Egan et al. |
| 9,892,389 B2 | 2/2018 | Domenica et al. |
| 10,075,446 B2 | 9/2018 | McMillan et al. |
| 10,089,679 B2 | 10/2018 | Eisen |
| 10,097,551 B2 | 10/2018 | Chan et al. |
| 10,115,079 B1 | 10/2018 | Burger et al. |
| 10,169,761 B1 | 1/2019 | Burger |
| 10,200,277 B2 | 2/2019 | Sreeramoju et al. |
| 10,277,569 B1 | 4/2019 | Barbour et al. |
| 10,284,548 B2 | 5/2019 | Williams et al. |
| 10,356,079 B2 | 7/2019 | Lurey et al. |
| 10,373,240 B1 | 8/2019 | Ross et al. |
| 10,380,565 B1 | 8/2019 | Prasad |
| 10,395,053 B2 | 8/2019 | Samid |
| 10,438,308 B2 | 10/2019 | Prichard et al. |
| 10,453,159 B2 | 10/2019 | Kapczynski |
| 10,616,196 B1 | 4/2020 | Khitrenovich et al. |
| 10,637,646 B2 | 4/2020 | Krishnamacharya et al. |
| 10,652,227 B2 | 5/2020 | Spektor et al. |
| 10,664,936 B2 | 5/2020 | Chapa et al. |
| 10,685,336 B1 | 6/2020 | Burger et al. |
| 10,719,873 B1 | 7/2020 | Dean et al. |
| 10,740,762 B2 | 8/2020 | Burger |
| 10,742,541 B2 | 8/2020 | Kim et al. |
| 10,771,463 B2 | 9/2020 | Berezin et al. |
| 10,783,542 B2 | 9/2020 | Walz et al. |
| 10,798,093 B2 | 10/2020 | Kaliski, Jr. et al. |
| 10,798,096 B2 | 10/2020 | Touati et al. |
| 10,863,359 B2 | 12/2020 | Talwar |
| 10,891,618 B2 | 1/2021 | Kinch et al. |
| 10,911,234 B2 | 2/2021 | Jain et al. |
| 10,999,298 B2 | 5/2021 | Eisen |
| 11,012,240 B1 | 5/2021 | Kirsch |
| 11,074,641 B1 | 7/2021 | Ross et al. |
| 11,095,643 B2 | 8/2021 | Huffman et al. |
| 11,115,224 B1 | 9/2021 | Scofield et al. |
| 11,120,519 B2 | 9/2021 | Kapczynski |
| 11,128,464 B1 | 9/2021 | Loladia |
| 11,146,676 B2 | 10/2021 | Sena, Jr. et al. |
| 11,157,872 B2 | 10/2021 | McMillan et al. |
| 11,164,178 B2 | 11/2021 | Anderson et al. |
| 11,164,271 B2 | 11/2021 | Chapa et al. |
| 11,178,128 B2 | 11/2021 | Poschel et al. |
| 11,206,246 B2 | 12/2021 | Krishnamacharya |
| 11,232,413 B1 | 1/2022 | Burger et al. |
| 11,277,439 B2 | 3/2022 | Knopf |
| 11,288,677 B1 | 3/2022 | Burger |
| 11,290,255 B2 | 3/2022 | Krishnamacharya et al. |
| 11,310,227 B2 | 4/2022 | Hamburg et al. |
| 11,356,460 B2 | 6/2022 | Bondugula et al. |
| 11,361,317 B2 | 6/2022 | Billman et al. |
| 11,363,015 B2 | 6/2022 | Yeddula et al. |
| 11,431,729 B2 | 8/2022 | Bloomquist et al. |
| 11,449,630 B2 | 9/2022 | Talwar |
| 11,470,069 B2 | 10/2022 | Gillespie |
| 11,526,884 B2 | 12/2022 | Chilaka et al. |
| 11,532,030 B1 | 12/2022 | Smith |
| 11,544,363 B2 | 1/2023 | Deore et al. |
| 11,551,226 B2 | 1/2023 | Kumar |
| 11,587,150 B1 | 2/2023 | Ross et al. |
| 11,588,639 B2 | 2/2023 | Jain et al. |
| 11,651,095 B2 | 5/2023 | Gupta et al. |
| 11,762,975 B2 | 9/2023 | Allen |
| 11,765,145 B2 | 9/2023 | Krishnamacharya |
| 11,769,112 B2 | 9/2023 | McMillan et al. |
| 11,775,979 B1 | 10/2023 | Burger |
| 11,784,791 B2 | 10/2023 | Krishnamacharya et al. |
| 11,790,473 B2 | 10/2023 | Chapa et al. |
| 11,803,929 B1 | 10/2023 | Kapczynski |
| 11,818,272 B2 | 11/2023 | Kirsch |
| 11,876,807 B2 | 1/2024 | Bondugula et al. |
| 11,941,065 B1 | 3/2024 | Li et al. |
| 11,954,655 B1 | 4/2024 | Burger et al. |
| 12,003,540 B1 | 6/2024 | Sharifi Mehr |
| 12,132,837 B2 | 10/2024 | Jain et al. |
| 12,190,327 B1 | 1/2025 | Burger |
| 12,205,076 B2 | 1/2025 | McMillan et al. |
| 2001/0029482 A1 | 10/2001 | Tealdi et al. |
| 2001/0039532 A1 | 11/2001 | Coleman, Jr. et al. |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0049274 A1 | 12/2001 | Degraeve |
| 2002/0002538 A1 | 1/2002 | Ling |
| 2002/0004736 A1 | 1/2002 | Roundtree et al. |
| 2002/0013827 A1 | 1/2002 | Edstrom et al. |
| 2002/0013899 A1 | 1/2002 | Faul |
| 2002/0026519 A1 | 2/2002 | Itabashi et al. |
| 2002/0026575 A1 | 2/2002 | Wheeler et al. |
| 2002/0032635 A1 | 3/2002 | Harris et al. |
| 2002/0033846 A1 | 3/2002 | Balasubramanian et al. |
| 2002/0045154 A1 | 4/2002 | Wood et al. |
| 2002/0052754 A1 | 5/2002 | Joyce et al. |
| 2002/0059201 A1 | 5/2002 | Work |
| 2002/0059521 A1 | 5/2002 | Tasler |

(56) References Cited

U.S. PATENT DOCUMENTS

| | | |
|---|---|---|
| 2002/0069122 A1 | 6/2002 | Yun et al. |
| 2002/0077964 A1 | 6/2002 | Brody et al. |
| 2002/0087460 A1 | 7/2002 | Hornung |
| 2002/0091544 A1 | 7/2002 | Middeljans et al. |
| 2002/0091635 A1 | 7/2002 | Dilip et al. |
| 2002/0099635 A1 | 7/2002 | Guiragosian |
| 2002/0103933 A1 | 8/2002 | Garon et al. |
| 2002/0111816 A1 | 8/2002 | Lortscher et al. |
| 2002/0116247 A1 | 8/2002 | Tucker et al. |
| 2002/0120537 A1 | 8/2002 | Morea et al. |
| 2002/0120757 A1 | 8/2002 | Sutherland et al. |
| 2002/0120846 A1 | 8/2002 | Stewart et al. |
| 2002/0128962 A1 | 9/2002 | Kasower |
| 2002/0133365 A1 | 9/2002 | Grey et al. |
| 2002/0133462 A1 | 9/2002 | Shteyn |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0157029 A1 | 10/2002 | French et al. |
| 2002/0164004 A1 | 11/2002 | Tamura et al. |
| 2002/0173994 A1 | 11/2002 | Ferguson, III |
| 2002/0174048 A1 | 11/2002 | Dheer et al. |
| 2002/0184509 A1 | 12/2002 | Scheidt et al. |
| 2002/0198800 A1 | 12/2002 | Shamrakov |
| 2002/0198806 A1 | 12/2002 | Blagg et al. |
| 2002/0198830 A1 | 12/2002 | Randell et al. |
| 2003/0002671 A1 | 1/2003 | Inchalik et al. |
| 2003/0009418 A1 | 1/2003 | Green et al. |
| 2003/0009426 A1 | 1/2003 | Ruiz-Sanchez |
| 2003/0023531 A1 | 1/2003 | Fergusson |
| 2003/0036995 A1 | 2/2003 | Lazerson |
| 2003/0041031 A1 | 2/2003 | Hedy |
| 2003/0046311 A1 | 3/2003 | Baidya et al. |
| 2003/0046554 A1 | 3/2003 | Leydier et al. |
| 2003/0048904 A1 | 3/2003 | Wang et al. |
| 2003/0061163 A1 | 3/2003 | Durfield |
| 2003/0069839 A1 | 4/2003 | Whittington et al. |
| 2003/0069943 A1 | 4/2003 | Bahrs et al. |
| 2003/0097342 A1 | 5/2003 | Whittingtom |
| 2003/0097380 A1 | 5/2003 | Mulhern et al. |
| 2003/0097573 A1 | 5/2003 | Wheeler et al. |
| 2003/0105710 A1 | 6/2003 | Barbara et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0115151 A1 | 6/2003 | Wheeler et al. |
| 2003/0131102 A1 | 7/2003 | Umbreit |
| 2003/0154162 A1 | 8/2003 | Danaher et al. |
| 2003/0158960 A1 | 8/2003 | Engberg |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0177028 A1 | 9/2003 | Cooper et al. |
| 2003/0182214 A1 | 9/2003 | Taylor |
| 2003/0187837 A1 | 10/2003 | Culliss |
| 2003/0188193 A1 | 10/2003 | Venkataramappa |
| 2003/0195859 A1 | 10/2003 | Lawrence |
| 2003/0200447 A1 | 10/2003 | Sjoblom |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0217094 A1 | 11/2003 | Andrews et al. |
| 2003/0220858 A1 | 11/2003 | Lam et al. |
| 2004/0002878 A1 | 1/2004 | Hinton |
| 2004/0006488 A1 | 1/2004 | Fitall et al. |
| 2004/0010458 A1 | 1/2004 | Friedman |
| 2004/0010698 A1 | 1/2004 | Rolfe |
| 2004/0015714 A1 | 1/2004 | Abraham et al. |
| 2004/0015715 A1 | 1/2004 | Brown |
| 2004/0019549 A1 | 1/2004 | Gulbrandsen |
| 2004/0019799 A1 | 1/2004 | Vering et al. |
| 2004/0024671 A1 | 2/2004 | Freund |
| 2004/0024709 A1 | 2/2004 | Yu et al. |
| 2004/0029601 A1 | 2/2004 | O'Neill et al. |
| 2004/0030649 A1 | 2/2004 | Nelson et al. |
| 2004/0039586 A1 | 2/2004 | Garvey et al. |
| 2004/0044628 A1 | 3/2004 | Mathew et al. |
| 2004/0044673 A1 | 3/2004 | Brady et al. |
| 2004/0044739 A1 | 3/2004 | Ziegler |
| 2004/0078324 A1 | 4/2004 | Lonnberg et al. |
| 2004/0083159 A1 | 4/2004 | Crosby et al. |
| 2004/0088237 A1 | 5/2004 | Moenickheim et al. |
| 2004/0088255 A1 | 5/2004 | Zielke et al. |
| 2004/0107250 A1 | 6/2004 | Marciano |
| 2004/0110119 A1 | 6/2004 | Riconda et al. |
| 2004/0111359 A1 | 6/2004 | Hudock |
| 2004/0111375 A1 | 6/2004 | Johnson |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0122720 A1 | 6/2004 | Mikalsen et al. |
| 2004/0128150 A1 | 7/2004 | Lundegren |
| 2004/0128156 A1 | 7/2004 | Beringer et al. |
| 2004/0133440 A1 | 7/2004 | Carolan et al. |
| 2004/0133441 A1 | 7/2004 | Brady et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0138994 A1 | 7/2004 | DeFrancesco et al. |
| 2004/0139009 A1 | 7/2004 | Kozee et al. |
| 2004/0139010 A1 | 7/2004 | McMichael et al. |
| 2004/0139011 A1 | 7/2004 | Kozee et al. |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153521 A1 | 8/2004 | Kogo |
| 2004/0158523 A1 | 8/2004 | Dort |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0167834 A1 | 8/2004 | Koskinen et al. |
| 2004/0193891 A1 | 9/2004 | Ollila |
| 2004/0199789 A1 | 10/2004 | Shaw et al. |
| 2004/0210661 A1 | 10/2004 | Thompson |
| 2004/0220865 A1 | 11/2004 | Lozowski et al. |
| 2004/0220918 A1 | 11/2004 | Scriffignano et al. |
| 2004/0225643 A1 | 11/2004 | Alpha et al. |
| 2004/0230527 A1 | 11/2004 | Hansen et al. |
| 2004/0243514 A1 | 12/2004 | Wankmueller |
| 2004/0243518 A1 | 12/2004 | Clifton et al. |
| 2004/0243588 A1 | 12/2004 | Tanner et al. |
| 2004/0243832 A1 | 12/2004 | Wilf et al. |
| 2004/0249789 A1 | 12/2004 | Kapoor et al. |
| 2004/0249811 A1 | 12/2004 | Shostack |
| 2004/0250085 A1 | 12/2004 | Tattan et al. |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0010513 A1 | 1/2005 | Duckworth et al. |
| 2005/0021551 A1 | 1/2005 | Silva et al. |
| 2005/0027983 A1 | 2/2005 | Klawon |
| 2005/0027995 A1 | 2/2005 | Menschik et al. |
| 2005/0055231 A1 | 3/2005 | Lee |
| 2005/0058262 A1 | 3/2005 | Timmins et al. |
| 2005/0060332 A1 | 3/2005 | Bernstein et al. |
| 2005/0071328 A1 | 3/2005 | Lawrence |
| 2005/0075985 A1 | 4/2005 | Cartmell |
| 2005/0086126 A1 | 4/2005 | Patterson |
| 2005/0086297 A1 | 4/2005 | Hinks |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger et al. |
| 2005/0114344 A1 | 5/2005 | Wesinger et al. |
| 2005/0114345 A1 | 5/2005 | Wesinger et al. |
| 2005/0117535 A1 | 6/2005 | Mahonen |
| 2005/0119978 A1 | 6/2005 | Ates |
| 2005/0125291 A1 | 6/2005 | Demkiw Grayson et al. |

(56) References Cited

U.S. PATENT DOCUMENTS

| | | |
|---|---|---|
| 2005/0125397 A1 | 6/2005 | Gross et al. |
| 2005/0125686 A1 | 6/2005 | Brandt |
| 2005/0137899 A1 | 6/2005 | Davies et al. |
| 2005/0138391 A1 | 6/2005 | Mandalia et al. |
| 2005/0138553 A1 | 6/2005 | Ballard et al. |
| 2005/0138648 A1 | 6/2005 | Ahmed et al. |
| 2005/0144133 A1 | 6/2005 | Hoffman et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0166262 A1 | 7/2005 | Beattie et al. |
| 2005/0171884 A1 | 8/2005 | Arnott |
| 2005/0181765 A1 | 8/2005 | Mark |
| 2005/0208461 A1 | 9/2005 | Krebs et al. |
| 2005/0216434 A1 | 9/2005 | Haveliwala et al. |
| 2005/0216582 A1 | 9/2005 | Toomey et al. |
| 2005/0216953 A1 | 9/2005 | Ellingson |
| 2005/0216955 A1 | 9/2005 | Wilkins et al. |
| 2005/0226224 A1 | 10/2005 | Lee et al. |
| 2005/0240578 A1 | 10/2005 | Biederman et al. |
| 2005/0256809 A1 | 11/2005 | Sadri |
| 2005/0267840 A1 | 12/2005 | Holm-Blagg et al. |
| 2005/0273431 A1 | 12/2005 | Abel et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010072 A1 | 1/2006 | Eisen |
| 2006/0010391 A1 | 1/2006 | Uemura et al. |
| 2006/0010487 A1 | 1/2006 | Fierer et al. |
| 2006/0016107 A1 | 1/2006 | Davis |
| 2006/0020559 A1 | 1/2006 | Steinmetz |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0036870 A1 | 2/2006 | Dasari et al. |
| 2006/0041464 A1 | 2/2006 | Powers et al. |
| 2006/0041670 A1 | 2/2006 | Musseleck et al. |
| 2006/0059110 A1 | 3/2006 | Madhok et al. |
| 2006/0059362 A1 | 3/2006 | Paden et al. |
| 2006/0069635 A1 | 3/2006 | Ram et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080251 A1 | 4/2006 | Fried et al. |
| 2006/0080263 A1 | 4/2006 | Willis et al. |
| 2006/0085361 A1 | 4/2006 | Hoerle et al. |
| 2006/0101508 A1 | 5/2006 | Taylor |
| 2006/0129419 A1 | 6/2006 | Flaxer et al. |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136595 A1 | 6/2006 | Satyavolu |
| 2006/0140460 A1 | 6/2006 | Coutts |
| 2006/0155573 A1 | 7/2006 | Hartunian |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0195351 A1 | 8/2006 | Bayburtian |
| 2006/0204051 A1 | 9/2006 | Holland |
| 2006/0212407 A1 | 9/2006 | Lyon |
| 2006/0218407 A1 | 9/2006 | Toms |
| 2006/0229943 A1 | 10/2006 | Mathias et al. |
| 2006/0229961 A1 | 10/2006 | Lyftogt et al. |
| 2006/0235935 A1 | 10/2006 | Ng |
| 2006/0239512 A1 | 10/2006 | Petrillo |
| 2006/0253294 A1 | 11/2006 | Martti et al. |
| 2006/0253358 A1 | 11/2006 | Delgrosso et al. |
| 2006/0256729 A1 | 11/2006 | Chen et al. |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0282429 A1 | 12/2006 | Hernandez-Sherrington et al. |
| 2006/0282660 A1 | 12/2006 | Varghese et al. |
| 2006/0282819 A1 | 12/2006 | Graham et al. |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038568 A1 | 2/2007 | Greene et al. |
| 2007/0043577 A1 | 2/2007 | Kasower |
| 2007/0047714 A1 | 3/2007 | Baniak et al. |
| 2007/0055672 A1 | 3/2007 | Stevens |
| 2007/0055785 A1 | 3/2007 | Stevens |
| 2007/0060367 A1 | 3/2007 | Heler |
| 2007/0067297 A1 | 3/2007 | Kublickis |
| 2007/0072190 A1 | 3/2007 | Aggarwal |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094142 A1 | 4/2007 | Russell et al. |
| 2007/0094230 A1 | 4/2007 | Subramaniam et al. |
| 2007/0094241 A1 | 4/2007 | M. Blackwell et al. |
| 2007/0106904 A1 | 5/2007 | Christoff et al. |
| 2007/0112667 A1 | 5/2007 | Rucker |
| 2007/0112668 A1 | 5/2007 | Celano et al. |
| 2007/0121843 A1 | 5/2007 | Atazky et al. |
| 2007/0124256 A1 | 5/2007 | Crooks et al. |
| 2007/0143825 A1 | 6/2007 | Goffin |
| 2007/0156692 A1 | 7/2007 | Rosewarne |
| 2007/0156758 A1 | 7/2007 | Adiga |
| 2007/0162307 A1 | 7/2007 | Austin et al. |
| 2007/0174186 A1 | 7/2007 | Hokland |
| 2007/0174448 A1 | 7/2007 | Ahuja et al. |
| 2007/0174903 A1 | 7/2007 | Greff |
| 2007/0192121 A1 | 8/2007 | Routson et al. |
| 2007/0192853 A1 | 8/2007 | Shraim et al. |
| 2007/0198432 A1 | 8/2007 | Pitroda et al. |
| 2007/0198433 A1 | 8/2007 | McGee et al. |
| 2007/0204338 A1 | 8/2007 | Aiello et al. |
| 2007/0205266 A1 | 9/2007 | Carr et al. |
| 2007/0206515 A1 | 9/2007 | Andreasen et al. |
| 2007/0220604 A1 | 9/2007 | Long |
| 2007/0226122 A1 | 9/2007 | Burrell et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0250459 A1 | 10/2007 | Schwarz et al. |
| 2007/0255662 A1 | 11/2007 | Tumminaro |
| 2007/0261108 A1 | 11/2007 | Lee et al. |
| 2007/0261114 A1 | 11/2007 | Pomerantsev |
| 2007/0266439 A1 | 11/2007 | Kraft |
| 2007/0282743 A1 | 12/2007 | Lovelett |
| 2007/0282959 A1 | 12/2007 | Stern |
| 2007/0288355 A1 | 12/2007 | Roland et al. |
| 2007/0288360 A1 | 12/2007 | Seeklus |
| 2007/0294195 A1 | 12/2007 | Curry et al. |
| 2008/0010203 A1 | 1/2008 | Grant |
| 2008/0010206 A1 | 1/2008 | Coleman |
| 2008/0010687 A1 | 1/2008 | Gonen et al. |
| 2008/0025208 A1 | 1/2008 | Chan |
| 2008/0028446 A1 | 1/2008 | Burgoyne |
| 2008/0033742 A1 | 2/2008 | Bernasconi |
| 2008/0033956 A1 | 2/2008 | Saha et al. |
| 2008/0040610 A1 | 2/2008 | Fergusson |

(56) References Cited

U.S. PATENT DOCUMENTS

| | | |
|---|---|---|
| 2008/0040717 A1 | 2/2008 | Hobson |
| 2008/0047017 A1 | 2/2008 | Renaud |
| 2008/0052182 A1 | 2/2008 | Marshall |
| 2008/0052244 A1 | 2/2008 | Tsuei et al. |
| 2008/0059364 A1 | 3/2008 | Tidwell et al. |
| 2008/0066188 A1 | 3/2008 | Kwak |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086431 A1 | 4/2008 | Robinson et al. |
| 2008/0091530 A1 | 4/2008 | Egnatios et al. |
| 2008/0103800 A1 | 5/2008 | Domenikos et al. |
| 2008/0103972 A1 | 5/2008 | Lanc |
| 2008/0104672 A1 | 5/2008 | Lunde et al. |
| 2008/0104674 A1 | 5/2008 | Sherkin et al. |
| 2008/0109422 A1 | 5/2008 | Dedhia |
| 2008/0109875 A1 | 5/2008 | Kraft |
| 2008/0114670 A1 | 5/2008 | Friesen |
| 2008/0115191 A1 | 5/2008 | Kim et al. |
| 2008/0115226 A1 | 5/2008 | Welingkar et al. |
| 2008/0120196 A1 | 5/2008 | Reed et al. |
| 2008/0120400 A1 | 5/2008 | Keller et al. |
| 2008/0120569 A1 | 5/2008 | Mann et al. |
| 2008/0120617 A1 | 5/2008 | Keller et al. |
| 2008/0120716 A1 | 5/2008 | Hall et al. |
| 2008/0126233 A1 | 5/2008 | Hogan |
| 2008/0141346 A1 | 6/2008 | Kay et al. |
| 2008/0148368 A1 | 6/2008 | Zurko et al. |
| 2008/0154758 A1 | 6/2008 | Schattmaier et al. |
| 2008/0155686 A1 | 6/2008 | McNair |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0175360 A1 | 7/2008 | Schwarz et al. |
| 2008/0183480 A1 | 7/2008 | Carlson et al. |
| 2008/0183585 A1 | 7/2008 | Vianello |
| 2008/0195548 A1 | 8/2008 | Chu et al. |
| 2008/0201401 A1 | 8/2008 | Pugh et al. |
| 2008/0205655 A1 | 8/2008 | Wilkins et al. |
| 2008/0208726 A1 | 8/2008 | Tsantes et al. |
| 2008/0208735 A1 | 8/2008 | Balet et al. |
| 2008/0208752 A1 | 8/2008 | Gottlieb et al. |
| 2008/0208873 A1 | 8/2008 | Boehmer |
| 2008/0212845 A1 | 9/2008 | Lund |
| 2008/0215427 A1 | 9/2008 | Kawada et al. |
| 2008/0216156 A1 | 9/2008 | Kosaka |
| 2008/0222706 A1 | 9/2008 | Renaud et al. |
| 2008/0222722 A1 | 9/2008 | Navratil et al. |
| 2008/0229415 A1 | 9/2008 | Kapoor et al. |
| 2008/0249869 A1 | 10/2008 | Angell et al. |
| 2008/0255992 A1 | 10/2008 | Lin |
| 2008/0256613 A1 | 10/2008 | Grover |
| 2008/0263058 A1 | 10/2008 | Peden |
| 2008/0270295 A1 | 10/2008 | Lent et al. |
| 2008/0270299 A1 | 10/2008 | Peng |
| 2008/0281621 A1 | 11/2008 | Shan et al. |
| 2008/0281737 A1 | 11/2008 | Fajardo |
| 2008/0288283 A1 | 11/2008 | Baldwin, Jr. et al. |
| 2008/0288299 A1 | 11/2008 | Schultz |
| 2008/0288405 A1* | 11/2008 | John .................. G06Q 20/384 |
| | | 705/44 |
| 2008/0301016 A1 | 12/2008 | Durvasula et al. |
| 2008/0306750 A1 | 12/2008 | Wunder et al. |
| 2008/0314977 A1 | 12/2008 | Domenica et al. |
| 2008/0319889 A1 | 12/2008 | Hammad |
| 2009/0006230 A1 | 1/2009 | Lyda et al. |
| 2009/0018986 A1 | 1/2009 | Alcorn et al. |
| 2009/0031426 A1 | 1/2009 | Dal Lago et al. |
| 2009/0037332 A1 | 2/2009 | Cheung et al. |
| 2009/0043691 A1 | 2/2009 | Kasower |
| 2009/0055298 A1 | 2/2009 | Foll |
| 2009/0055322 A1 | 2/2009 | Bykov et al. |
| 2009/0055894 A1 | 2/2009 | Lorsch |
| 2009/0064297 A1 | 3/2009 | Selgas et al. |
| 2009/0089128 A1 | 4/2009 | Tkatch et al. |
| 2009/0094237 A1 | 4/2009 | Churi et al. |
| 2009/0094674 A1 | 4/2009 | Schwartz et al. |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0132347 A1 | 5/2009 | Anderson et al. |
| 2009/0138335 A1 | 5/2009 | Lieberman |
| 2009/0138895 A1 | 5/2009 | Dumas et al. |
| 2009/0144166 A1 | 6/2009 | Dickelman |
| 2009/0150166 A1 | 6/2009 | Leite et al. |
| 2009/0150238 A1 | 6/2009 | Marsh et al. |
| 2009/0157564 A1 | 6/2009 | Cross |
| 2009/0157693 A1 | 6/2009 | Palahnuk |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0169019 A1 | 7/2009 | Bauchot et al. |
| 2009/0172788 A1 | 7/2009 | Veldula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0183259 A1 | 7/2009 | Rinek et al. |
| 2009/0199264 A1 | 8/2009 | Lang |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210347 A1* | 8/2009 | Sarcanin ............. G06Q 20/027 |
| | | 705/76 |
| 2009/0210807 A1 | 8/2009 | Xiao et al. |
| 2009/0215431 A1 | 8/2009 | Koraichi |
| 2009/0216640 A1 | 8/2009 | Masi |
| 2009/0222449 A1 | 9/2009 | Hom et al. |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0234876 A1 | 9/2009 | Schigel et al. |
| 2009/0240624 A1 | 9/2009 | James et al. |
| 2009/0247122 A1 | 10/2009 | Fitzgerald et al. |
| 2009/0252134 A1 | 10/2009 | Schlicht et al. |
| 2009/0254375 A1 | 10/2009 | Martinez et al. |
| 2009/0254476 A1 | 10/2009 | Sharma et al. |
| 2009/0254572 A1 | 10/2009 | Redlich et al. |
| 2009/0254656 A1 | 10/2009 | Vignisson et al. |
| 2009/0254971 A1 | 10/2009 | Herz et al. |
| 2009/0260064 A1 | 10/2009 | Mcdowell et al. |
| 2009/0271847 A1 | 10/2009 | Karjala et al. |
| 2009/0276269 A1 | 11/2009 | Yee et al. |
| 2009/0307778 A1 | 12/2009 | Mardikar |
| 2009/0313134 A1 | 12/2009 | Faith et al. |
| 2009/0313562 A1 | 12/2009 | Appleyard et al. |
| 2009/0319638 A1 | 12/2009 | Faith et al. |
| 2009/0327270 A1 | 12/2009 | Teevan et al. |
| 2009/0328173 A1 | 12/2009 | Jakobson et al. |
| 2010/0011428 A1 | 1/2010 | Atwood et al. |
| 2010/0030578 A1 | 2/2010 | Siddique et al. |
| 2010/0030677 A1 | 2/2010 | Melik-Aslanian et al. |
| 2010/0042542 A1 | 2/2010 | Rose et al. |
| 2010/0043055 A1 | 2/2010 | Baumgart |
| 2010/0049803 A1 | 2/2010 | Ogilvie et al. |
| 2010/0057560 A1 | 3/2010 | Skudlark et al. |
| 2010/0058404 A1 | 3/2010 | Rouse |
| 2010/0063942 A1 | 3/2010 | Arnott et al. |
| 2010/0063993 A1 | 3/2010 | Higgins et al. |
| 2010/0076836 A1 | 3/2010 | Giordano et al. |
| 2010/0077351 A1 | 3/2010 | Kaulgud et al. |
| 2010/0077483 A1 | 3/2010 | Stolfo et al. |
| 2010/0083371 A1 | 4/2010 | Bennetts et al. |
| 2010/0088233 A1 | 4/2010 | Tattan et al. |
| 2010/0094768 A1 | 4/2010 | Miltonberger |
| 2010/0094910 A1 | 4/2010 | Bayliss |
| 2010/0100945 A1 | 4/2010 | Ozzie et al. |
| 2010/0114744 A1 | 5/2010 | Gonen |
| 2010/0114776 A1 | 5/2010 | Weller et al. |

(56)　　　References Cited

U.S. PATENT DOCUMENTS

| | | |
|---|---|---|
| 2010/0121767 A1 | 5/2010 | Coulter et al. |
| 2010/0122305 A1 | 5/2010 | Moloney |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0138298 A1 | 6/2010 | Fitzherald et al. |
| 2010/0145836 A1 | 6/2010 | Baker et al. |
| 2010/0153278 A1 | 6/2010 | Farsedakis |
| 2010/0153290 A1 | 6/2010 | Duggan |
| 2010/0161816 A1 | 6/2010 | Kraft et al. |
| 2010/0169159 A1 | 7/2010 | Rose et al. |
| 2010/0174638 A1 | 7/2010 | Debie et al. |
| 2010/0174813 A1 | 7/2010 | Hildreth et al. |
| 2010/0175119 A1 | 7/2010 | Vitaletti |
| 2010/0179906 A1 | 7/2010 | Hawkes |
| 2010/0185546 A1 | 7/2010 | Pollard |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0212004 A1 | 8/2010 | Fu |
| 2010/0217837 A1 | 8/2010 | Ansari et al. |
| 2010/0217969 A1 | 8/2010 | Tomkow |
| 2010/0223192 A1 | 9/2010 | Levine et al. |
| 2010/0229245 A1 | 9/2010 | Singhal |
| 2010/0241493 A1 | 9/2010 | Onischuk |
| 2010/0241535 A1 | 9/2010 | Nightengale et al. |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250955 A1 | 9/2010 | Trevithick et al. |
| 2010/0257102 A1 | 10/2010 | Perlman |
| 2010/0258623 A1 | 10/2010 | Beemer et al. |
| 2010/0262932 A1 | 10/2010 | Pan |
| 2010/0280914 A1 | 11/2010 | Carlson |
| 2010/0281020 A1 | 11/2010 | Drubner |
| 2010/0287541 A1 | 11/2010 | Saunders et al. |
| 2010/0293049 A1 | 11/2010 | Maher et al. |
| 2010/0293050 A1 | 11/2010 | Maher et al. |
| 2010/0293058 A1 | 11/2010 | Maher et al. |
| 2010/0293090 A1 | 11/2010 | Domenikos et al. |
| 2010/0299262 A1 | 11/2010 | Handler |
| 2010/0325442 A1 | 12/2010 | Petrone et al. |
| 2010/0325694 A1 | 12/2010 | Bhagavatula et al. |
| 2010/0332393 A1 | 12/2010 | Weller et al. |
| 2011/0004498 A1 | 1/2011 | Readshaw |
| 2011/0016533 A1 | 1/2011 | Zeigler et al. |
| 2011/0023115 A1 | 1/2011 | Wright |
| 2011/0029388 A1 | 2/2011 | Kendall et al. |
| 2011/0040736 A1 | 2/2011 | Kalaboukis |
| 2011/0071950 A1 | 3/2011 | Ivanovic |
| 2011/0083181 A1 | 4/2011 | Nazarov |
| 2011/0113084 A1 | 5/2011 | Ramnani |
| 2011/0119155 A1 | 5/2011 | Hammad et al. |
| 2011/0126024 A1 | 5/2011 | Beatson et al. |
| 2011/0126275 A1 | 5/2011 | Anderson et al. |
| 2011/0131096 A1 | 6/2011 | Frew et al. |
| 2011/0131123 A1 | 6/2011 | Griffin et al. |
| 2011/0137760 A1 | 6/2011 | Rudie et al. |
| 2011/0142213 A1 | 6/2011 | Baniak et al. |
| 2011/0145899 A1 | 6/2011 | Cao et al. |
| 2011/0148625 A1 | 6/2011 | Velusamy |
| 2011/0161218 A1 | 6/2011 | Swift |
| 2011/0166988 A1 | 7/2011 | Coulter |
| 2011/0167011 A1 | 7/2011 | Paltenghe et al. |
| 2011/0173681 A1 | 7/2011 | Qureshi et al. |
| 2011/0179139 A1 | 7/2011 | Starkenburg et al. |
| 2011/0184780 A1 | 7/2011 | Alderson et al. |
| 2011/0184838 A1 | 7/2011 | Winters et al. |
| 2011/0188387 A1 | 8/2011 | Das et al. |
| 2011/0196791 A1 | 8/2011 | Dominguez |
| 2011/0208601 A1 | 8/2011 | Ferguson et al. |
| 2011/0211445 A1 | 9/2011 | Chen |
| 2011/0260832 A1 | 10/2011 | Ross et al. |
| 2011/0264566 A1 | 10/2011 | Brown |
| 2011/0270754 A1 | 11/2011 | Kelly et al. |
| 2011/0289094 A1 | 11/2011 | Fisher |
| 2011/0307397 A1 | 12/2011 | Benmbarek |
| 2011/0307957 A1 | 12/2011 | Barcelo et al. |
| 2012/0011158 A1 | 1/2012 | Avner et al. |
| 2012/0016948 A1 | 1/2012 | Sinha |
| 2012/0018506 A1 | 1/2012 | Hammad et al. |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0047423 A1 | 2/2012 | Tomkow |
| 2012/0054592 A1 | 3/2012 | Jaffe et al. |
| 2012/0072382 A1 | 3/2012 | Pearson et al. |
| 2012/0079585 A1 | 3/2012 | Chan et al. |
| 2012/0084866 A1 | 4/2012 | Stolfo |
| 2012/0089438 A1 | 4/2012 | Tavares et al. |
| 2012/0108274 A1 | 5/2012 | Acebo Ruiz et al. |
| 2012/0110467 A1 | 5/2012 | Blake et al. |
| 2012/0110677 A1 | 5/2012 | Abendroth et al. |
| 2012/0117629 A1 | 5/2012 | Miyazawa et al. |
| 2012/0124498 A1 | 5/2012 | Santoro et al. |
| 2012/0130898 A1 | 5/2012 | Snyder et al. |
| 2012/0136763 A1 | 5/2012 | Megdal et al. |
| 2012/0151045 A1 | 6/2012 | Anakata et al. |
| 2012/0173339 A1 | 7/2012 | Flynt et al. |
| 2012/0173563 A1 | 7/2012 | Griffin et al. |
| 2012/0191610 A1 | 7/2012 | Prasad |
| 2012/0215682 A1 | 8/2012 | Lent et al. |
| 2012/0215719 A1 | 8/2012 | Verlander |
| 2012/0216125 A1 | 8/2012 | Pierce |
| 2012/0235897 A1 | 9/2012 | Hirota |
| 2012/0239497 A1 | 9/2012 | Nuzzi |
| 2012/0246060 A1 | 9/2012 | Conyack, Jr. et al. |
| 2012/0246730 A1 | 9/2012 | Raad |
| 2012/0253852 A1 | 10/2012 | Pourfallah et al. |
| 2012/0290660 A1 | 11/2012 | Rao et al. |
| 2012/0297484 A1 | 11/2012 | Srivastava |
| 2012/0323717 A1 | 12/2012 | Kirsch |
| 2012/0331557 A1 | 12/2012 | Washington |
| 2013/0004033 A1 | 1/2013 | Trugenberger et al. |
| 2013/0006843 A1 | 1/2013 | Tralvex |
| 2013/0018811 A1 | 1/2013 | Britti et al. |
| 2013/0031109 A1 | 1/2013 | Roulson et al. |
| 2013/0031624 A1 | 1/2013 | Britti et al. |
| 2013/0041701 A1 | 2/2013 | Roth |
| 2013/0066775 A1 | 3/2013 | Milam |
| 2013/0080467 A1 | 3/2013 | Carson et al. |
| 2013/0085804 A1 | 4/2013 | Leff et al. |
| 2013/0085939 A1 | 4/2013 | Colak et al. |
| 2013/0086186 A1 | 4/2013 | Tomkow |
| 2013/0086654 A1 | 4/2013 | Tomkow |
| 2013/0110678 A1 | 5/2013 | Vigier et al. |
| 2013/0117087 A1 | 5/2013 | Coppinger |
| 2013/0117387 A1 | 5/2013 | Tomkow |
| 2013/0125010 A1 | 5/2013 | Strandell |
| 2013/0132151 A1 | 5/2013 | Stibel et al. |
| 2013/0139229 A1 | 5/2013 | Fried et al. |
| 2013/0173449 A1 | 7/2013 | Ng et al. |
| 2013/0179955 A1 | 7/2013 | Bekker et al. |
| 2013/0198525 A1 | 8/2013 | Spies et al. |
| 2013/0205135 A1 | 8/2013 | Lutz |
| 2013/0212661 A1 | 8/2013 | Neafsey et al. |
| 2013/0246150 A1 | 9/2013 | Ovick et al. |
| 2013/0246273 A1 | 9/2013 | Ovick et al. |
| 2013/0246528 A1 | 9/2013 | Ogura |
| 2013/0254008 A1 | 9/2013 | Ovick et al. |
| 2013/0254096 A1 | 9/2013 | Serio et al. |
| 2013/0268333 A1 | 10/2013 | Ovick et al. |
| 2013/0271272 A1 | 10/2013 | Dhesi et al. |
| 2013/0275762 A1 | 10/2013 | Tomkow |
| 2013/0279676 A1 | 10/2013 | Baniak et al. |
| 2013/0282461 A1 | 10/2013 | Ovick et al. |
| 2013/0290097 A1 | 10/2013 | Balestrieri et al. |
| 2013/0293363 A1 | 11/2013 | Plymouth |
| 2013/0298238 A1 | 11/2013 | Shah et al. |
| 2013/0318569 A1 | 11/2013 | Canning et al. |
| 2013/0332342 A1 | 12/2013 | Kasower |
| 2013/0339217 A1 | 12/2013 | Breslow et al. |

(56)  References Cited

U.S. PATENT DOCUMENTS

| | | |
|---|---|---|
| 2013/0339249 A1 | 12/2013 | Weller et al. |
| 2013/0346331 A1 | 12/2013 | Giovannetti et al. |
| 2014/0012733 A1 | 1/2014 | Vidal |
| 2014/0013396 A1 | 1/2014 | Field-Eliot et al. |
| 2014/0025475 A1 | 1/2014 | Burke |
| 2014/0032723 A1 | 1/2014 | Nema |
| 2014/0033280 A1 | 1/2014 | Nimashakavi et al. |
| 2014/0040051 A1 | 2/2014 | Ovick et al. |
| 2014/0040135 A1 | 2/2014 | Ovick et al. |
| 2014/0046872 A1 | 2/2014 | Arnott et al. |
| 2014/0051464 A1 | 2/2014 | Ryan et al. |
| 2014/0061302 A1 | 3/2014 | Hammad |
| 2014/0074637 A1 | 3/2014 | Hammad |
| 2014/0089167 A1 | 3/2014 | Kasower |
| 2014/0110477 A1 | 4/2014 | Hammad |
| 2014/0162611 A1 | 6/2014 | Mezhibovsky et al. |
| 2014/0164112 A1 | 6/2014 | Kala |
| 2014/0164398 A1 | 6/2014 | Smith et al. |
| 2014/0164519 A1 | 6/2014 | Shah |
| 2014/0201100 A1 | 7/2014 | Rellas et al. |
| 2014/0258083 A1 | 9/2014 | Achanta et al. |
| 2014/0279467 A1 | 9/2014 | Chapa et al. |
| 2014/0280945 A1 | 9/2014 | Lunt |
| 2014/0283123 A1 | 9/2014 | Lonstein et al. |
| 2014/0289812 A1 | 9/2014 | Wang et al. |
| 2014/0298485 A1 | 10/2014 | Gardner |
| 2014/0317023 A1 | 10/2014 | Kim |
| 2014/0317716 A1 | 10/2014 | Chao et al. |
| 2014/0331282 A1 | 11/2014 | Tkachev |
| 2014/0365653 A1 | 12/2014 | Matoba |
| 2015/0067341 A1 | 3/2015 | Deen et al. |
| 2015/0089569 A1 | 3/2015 | Sondhi et al. |
| 2015/0128237 A1 | 5/2015 | Lund et al. |
| 2015/0142595 A1 | 5/2015 | Acuña-Rohter |
| 2015/0150106 A1 | 5/2015 | Lund et al. |
| 2015/0161228 A1 | 6/2015 | Davies |
| 2015/0180870 A1 | 6/2015 | Zhang et al. |
| 2015/0199667 A1 | 7/2015 | Fernando et al. |
| 2015/0199668 A1 | 7/2015 | Fernando et al. |
| 2015/0229512 A1 | 8/2015 | Dutti et al. |
| 2015/0249655 A1 | 9/2015 | Lunt |
| 2015/0254658 A1 | 9/2015 | Bondesen et al. |
| 2015/0278277 A1 | 10/2015 | Agrawal et al. |
| 2015/0350186 A1 | 12/2015 | Chan et al. |
| 2016/0005020 A1 | 1/2016 | Fernando et al. |
| 2016/0027008 A1 | 1/2016 | John |
| 2016/0050198 A1 | 2/2016 | Thibadeau Sr et al. |
| 2016/0065563 A1 | 3/2016 | Broadbent et al. |
| 2016/0070758 A1 | 3/2016 | Thomson et al. |
| 2016/0087957 A1 | 3/2016 | Shah et al. |
| 2016/0088465 A1 | 3/2016 | Golla |
| 2016/0142532 A1 | 5/2016 | Bostick |
| 2016/0164878 A1 | 6/2016 | Nakano |
| 2016/0217444 A1 | 7/2016 | Martin |
| 2016/0217445 A1 | 7/2016 | Martin |
| 2016/0226879 A1 | 8/2016 | Chan et al. |
| 2016/0275476 A1 | 9/2016 | Artman et al. |
| 2016/0283740 A1 | 9/2016 | Roundtree |
| 2016/0294612 A1 | 10/2016 | Ravinoothala et al. |
| 2016/0337369 A1 | 11/2016 | Sanso |
| 2017/0061436 A1 | 3/2017 | Liu et al. |
| 2017/0111336 A1 | 4/2017 | Davis et al. |
| 2017/0140386 A1* | 5/2017 | Kolkowitz ............. G06Q 50/01 |
| 2017/0163532 A1 | 6/2017 | Tubaltsev et al. |
| 2017/0186012 A1 | 6/2017 | McNeal |
| 2017/0200223 A1 | 7/2017 | Kasower |
| 2017/0324749 A1 | 11/2017 | Bhargava et al. |
| 2017/0331832 A1 | 11/2017 | Lander et al. |
| 2017/0337549 A1 | 11/2017 | Wong |
| 2017/0337557 A1 | 11/2017 | Durney et al. |
| 2017/0357971 A1 | 12/2017 | Pitz et al. |
| 2018/0041336 A1 | 2/2018 | Keshava et al. |
| 2018/0077142 A1 | 3/2018 | Thakkar |
| 2018/0083915 A1 | 3/2018 | Medam et al. |
| 2018/0097828 A1 | 4/2018 | Coskun |
| 2018/0145967 A1 | 5/2018 | Matsugashita |
| 2018/0184288 A1 | 6/2018 | De Lorenzo et al. |
| 2018/0227292 A1 | 8/2018 | Golshan et al. |
| 2018/0232433 A1 | 8/2018 | Kanvinde |
| 2018/0285549 A1 | 10/2018 | Sonkar et al. |
| 2018/0336471 A1 | 11/2018 | Rezagholizadeh |
| 2018/0337914 A1 | 11/2018 | Mohamad Abdul et al. |
| 2018/0343265 A1 | 11/2018 | McMillan et al. |
| 2018/0351852 A1 | 12/2018 | Boucadair et al. |
| 2018/0365690 A1 | 12/2018 | Ovick et al. |
| 2018/0375791 A1 | 12/2018 | Kaladgi et al. |
| 2019/0073676 A1 | 3/2019 | Wang |
| 2019/0095516 A1 | 3/2019 | Srinivasan et al. |
| 2019/0164173 A1 | 5/2019 | Liu et al. |
| 2019/0205905 A1 | 7/2019 | Raghunathan |
| 2019/0208040 A1 | 7/2019 | Boucadair et al. |
| 2019/0228173 A1 | 7/2019 | Gupta et al. |
| 2019/0228178 A1 | 7/2019 | Sharma et al. |
| 2019/0260594 A1 | 8/2019 | Singhal et al. |
| 2019/0268797 A1 | 8/2019 | Pang et al. |
| 2019/0273809 A1 | 9/2019 | Boucadair et al. |
| 2019/0306157 A1 | 10/2019 | Lores et al. |
| 2019/0349360 A1 | 11/2019 | Yeddula et al. |
| 2019/0378010 A1 | 12/2019 | Morris |
| 2020/0104834 A1 | 4/2020 | Pontious et al. |
| 2020/0118127 A1 | 4/2020 | Miller et al. |
| 2020/0120004 A1 | 4/2020 | Kohout et al. |
| 2020/0120015 A1 | 4/2020 | Boucadair et al. |
| 2020/0137080 A1 | 4/2020 | Bloomquist et al. |
| 2020/0145324 A1 | 5/2020 | Wei et al. |
| 2020/0162443 A1 | 5/2020 | Poschel et al. |
| 2020/0205002 A1 | 6/2020 | Talwar |
| 2020/0210466 A1 | 7/2020 | Yin et al. |
| 2020/0228321 A1 | 7/2020 | Krishnamacharya et al. |
| 2020/0293684 A1 | 9/2020 | Harris et al. |
| 2020/0304501 A1 | 9/2020 | Fan |
| 2020/0314088 A1 | 10/2020 | Feijoo et al. |
| 2020/0320511 A1 | 10/2020 | Anderson et al. |
| 2020/0334349 A1 | 10/2020 | Billman et al. |
| 2020/0372535 A1 | 11/2020 | Walz et al. |
| 2020/0380112 A1 | 12/2020 | Allen |
| 2020/0380509 A1 | 12/2020 | Billman et al. |
| 2020/0394331 A1 | 12/2020 | Talwar |
| 2020/0403992 A1 | 12/2020 | Huffman et al. |
| 2021/0012312 A1 | 1/2021 | Bradstreet |
| 2021/0092115 A1 | 3/2021 | Bhattacharyya et al. |
| 2021/0096530 A1 | 4/2021 | MarapaReddy |
| 2021/0097370 A1 | 4/2021 | Agnihotram |
| 2021/0117969 A1 | 4/2021 | Chilaka et al. |
| 2021/0144131 A1 | 5/2021 | Krishnamacharya |
| 2021/0203667 A1 | 7/2021 | Bondugula et al. |
| 2021/0240808 A1 | 8/2021 | Sadhwani et al. |
| 2021/0241120 A1 | 8/2021 | Chen et al. |
| 2021/0273805 A1 | 9/2021 | Jain et al. |
| 2021/0282018 A1 | 9/2021 | Talwar et al. |
| 2021/0288948 A1 | 9/2021 | Joffe et al. |
| 2022/0027853 A1 | 1/2022 | McMillan et al. |
| 2022/0027891 A1 | 1/2022 | Anderson et al. |
| 2022/0044343 A1 | 2/2022 | Chapa et al. |
| 2022/0070169 A1 | 3/2022 | Cano et al. |
| 2022/0109578 A1 | 4/2022 | Kirsch |
| 2022/0114466 A1 | 4/2022 | Blumenfeld |
| 2022/0173887 A1 | 6/2022 | Krishnamacharya et al. |
| 2022/0182487 A1 | 6/2022 | Sharma et al. |
| 2022/0239665 A1 | 7/2022 | Bondugula et al. |
| 2022/0261461 A1 | 8/2022 | Bondugula et al. |
| 2022/0279067 A1 | 9/2022 | Sena, Jr. et al. |
| 2022/0335348 A1 | 10/2022 | Miller et al. |
| 2022/0345460 A1 | 10/2022 | Alden et al. |
| 2023/0239295 A1 | 7/2023 | Cano et al. |
| 2023/0254404 A1 | 8/2023 | Sharma et al. |
| 2023/0259648 A1 | 8/2023 | Gupta et al. |
| 2023/0319036 A1 | 10/2023 | Singh et al. |
| 2023/0376585 A1 | 11/2023 | Allen |
| 2023/0421376 A1 | 12/2023 | Jain et al. |
| 2024/0022431 A1 | 1/2024 | Kirsch |

(56)  References Cited

U.S. PATENT DOCUMENTS

| | | | |
|---|---|---|---|
| 2024/0169314 A1 | 5/2024 | McMillan et al. |
| 2024/0212084 A1 | 6/2024 | Chapa et al. |

FOREIGN PATENT DOCUMENTS

| | | |
|---|---|---|
| AU | 2023223007 | 9/2023 |
| AU | 2023258421 | 11/2023 |
| CA | 3 076 931 | 10/2020 |
| CA | 3 052 415 | 7/2021 |
| CA | 2 896 503 | 8/2021 |
| EP | 1 028 401 | 8/2000 |
| EP | 1 239 378 | 9/2002 |
| EP | 1 301 887 | 4/2003 |
| EP | 1 850 278 | 10/2007 |
| EP | 2 425 583 | 3/2012 |
| EP | 2 074 513 | 2/2016 |
| EP | 2 939 364 | 6/2020 |
| EP | 3 577 850 | 7/2021 |
| EP | 3 862 897 | 8/2021 |
| EP | 4 060 941 | 9/2022 |
| ES | 2 811 070 | 3/2021 |
| GB | 2 518 099 | 3/2015 |
| IN | 201917040928 | 11/2019 |
| JP | 2005-135431 | 5/2005 |
| JP | 2005-208945 | 8/2005 |
| JP | 4202314 | 12/2008 |
| JP | 2012-113696 | 6/2012 |
| KR | 10-2000-0063313 | 11/2000 |
| KR | 10-2002-0039203 | 5/2002 |
| KR | 10-2007-0081504 | 8/2007 |
| TW | 1256569 | 6/2006 |
| WO | WO 99/054803 | 10/1999 |
| WO | WO 99/060481 | 11/1999 |
| WO | WO 00/030045 | 5/2000 |
| WO | WO 01/009752 | 2/2001 |
| WO | WO 01/009792 | 2/2001 |
| WO | WO 01/010090 | 2/2001 |
| WO | WO 01/084281 | 11/2001 |
| WO | WO 02/011025 | 2/2002 |
| WO | WO 02/029636 | 4/2002 |
| WO | WO 03/073711 | 9/2003 |
| WO | WO 2004/031986 | 4/2004 |
| WO | WO 2004/049654 | 6/2004 |
| WO | WO 2005/033979 | 4/2005 |
| WO | WO 2006/019752 | 2/2006 |
| WO | WO 2006/050278 | 5/2006 |
| WO | WO 2006/069199 | 6/2006 |
| WO | WO 2006/099081 | 9/2006 |
| WO | WO 2007/001394 | 1/2007 |
| WO | WO 2007/050156 | 5/2007 |
| WO | WO 2008/042614 | 4/2008 |
| WO | WO 2008/054849 | 5/2008 |
| WO | WO 2009/064694 | 5/2009 |
| WO | WO 2009/102391 | 8/2009 |
| WO | WO 2009/108901 | 9/2009 |
| WO | WO 2009/117468 | 9/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |
| WO | WO 2011/014878 | 2/2011 |
| WO | WO 2012/054646 | 4/2012 |
| WO | WO 2013/126281 | 8/2013 |
| WO | WO 2013/140410 | 9/2013 |
| WO | WO 2014/008079 | 1/2014 |
| WO | WO 2014/150987 | 9/2014 |
| WO | WO 2015/038520 | 3/2015 |
| WO | WO 2018/129373 | 7/2018 |
| WO | WO 2018/191638 | 10/2018 |
| WO | WO 2018/199992 | 11/2018 |
| WO | WO 2019/006144 | 1/2019 |
| WO | WO 2019/152592 | 8/2019 |
| WO | WO 2019/209857 | 10/2019 |
| WO | WO 2019/245998 | 12/2019 |
| WO | WO 2020/206305 | 10/2020 |
| WO | WO 2021/011308 | 1/2021 |
| WO | WO 2021/067446 | 4/2021 |
| WO | WO 2021/097090 | 5/2021 |
| WO | WO 2021/138263 | 7/2021 |
| WO | WO 2021/155053 | 8/2021 |
| WO | WO 2023/192175 | 10/2023 |

OTHER PUBLICATIONS

U.S. Appl. No. 12/705,511, filed Feb. 12, 2010, Bargoli et al.

Aad et al., "NRC Data Collection and the Privacy by Design Principles", IEEE, Nov. 2010, pp. 5.

Actuate, "Delivering Enterprise Information for Corporate Portals", White Paper, 2004, pp. 1-7.

"Aggregate and Analyze Social Media Content: Gain Faster and Broader Insight to Market Sentiment," SAP Partner, Mantis Technology Group, Apr. 2011, pp. 4.

Aharony et al., "Social Area Networks: Data Networking of the People, by the People, for the People," 2009 International Conference on Computational Science and Engineering, May 2009, pp. 1148-1155.

Aktas et al., "Personalizing PageRank Based on Domain Profiles", WEBKDD workshop: Webmining and Web Usage Analysis, Aug. 22, 2004, pp. 83-90.

Aktas et al., "Using Hyperlink Features to Personalize Web Search", WEBKDD workshop: Webmining and Web Usage Analysis, Aug. 2004.

"Arizona Company Has Found Key in Stopping ID Theft," PR Newswire, New York, Aug. 10, 2005 http://proquest.umi.com/pqdweb?did=880104711&SID=1&Fmt=3&clientId=19649&RQT=309&Vname=PQD.

ABC News Now:Money Matters, as broadcasted Nov. 15, 2005 with guest Todd Davis (CEO of Lifelock), pp. 6.

Anonymous, "Credit-Report Disputes Await Electronic Resolution," Credit Card News, Chicago, Jan. 15, 1993, vol. 5, No. 19, p. 5.

Anonymous, "MBNA Offers Resolution of Credit Card Disputes," Hempstead, Feb. 2002, vol. 68, No. 2, p. 47.

Anonymous, "Feedback", Credit Management, ABI/INFORM Global, Sep. 2006, p. 6.

Bacon, Chris, "OAuth id_token missing information on refresh #1141", https://github.com/googleapis/google-api-dotnet-client/issues/1141, Jan. 1, 2018, pp. 9.

Bielski, Lauren, "Will you Spend to Thwart ID Theft?" ABA Banking Journal, Apr. 2005, pp. 54, 56-57, 60.

Bluecava, "What We Do", http://www.bluecava.com/what-we-do/, printed Nov. 5, 2012 in 3 pages.

Buxfer, http://www.buxfer.com/ printed Feb. 5, 2014 in 1 page.

Check, http://check.me/ printed Feb. 5, 2014 in 3 pages.

Cheng, Fred, "Security Attack Safe Mobile and Cloud-based One-time Password Tokens Using Rubbing Encryption Algorithm", MONET, 2011, vol. 16, pp. 304-336.

Chores & Allowances, "Do Kids Have Credit Reports?" Oct. 15, 2007, http://choresandallowances.blogspot.com/2007/10/do-kids-have-credit-reports.html, pp. 5.

Comlounge.net, "plonesocial.auth.rpx" http://web.archive.org/web/20101026041841/http://comlounge.net/rpx as captured Oct. 26, 2010 in 9 pages.

"Consumers Gain Immediate and Full Access to Credit Score Used by Majority of U.S. Lenders", PR Newswire, ProQuest Copy, Mar. 19, 2001, p. 1.

"CreditCheck Monitoring Services," Dec. 11, 2000, pp. 1, lines 21-23.

Cullen, Terri; "The Wall Street Journal Complete Identity Theft Guidebook:How to Protect Yourself from the Most Pervasive Crime in America"; Chapter 3, pp. 59-79; Jul. 10, 2007.

"D&B Corporate Family Linkage", D&B Internet Access for U.S. Contract Customers, https://www.dnb.com/ecomp/help/linkage.htm as printed Dec. 17, 2009, pp. 1.

Day, Jo and Kevin; "ID-ology: A Planner's Guide to Identity Theft"; Journal of Financial Planning:Tech Talk; pp. 36-38; Sep. 2004.

(56)        References Cited

OTHER PUBLICATIONS

Equifax, "InstaTouch ID: Separate Fact from Friction." http://equifax. uberflip.com/i/791148-mobile-consumer-identity-service-product-sheet/1, 2016, pp. 2.

Equifax; "Equifax Credit Watch"; https://web.archive.org/web/20070627135447/https://www.econsumer.equifax.co.uk/consumer/uk/sitepage.ehtml?forward=gb_esn_detail, dated Jun. 27, 2007 on www.archive.org in 2 pages.

Ettorre, "Paul Kahn on Exceptional Marketing," Management Review, vol. 83, No. 11, Nov. 1994, pp. 48-51.

Facebook, "Facebook helps you connect and share with the people in your life," www.facebook.com printed Nov. 16, 2010 in 1 page.

Familysecure.com, "Frequently Asked Questions", http://www.familysecure.com/FAQ.aspx as archived Jul. 15, 2007 in 3 pages.

FamilySecure.com; "Identity Theft Protection for the Whole Family | FamilySecure.com" http://www.familysecure.com/, as retrieved on Nov. 5, 2009.

Fenner, Peter, "Mobile Address Management and Billing for Personal Communications", 1st International Conference on Universal Personal Communications, 1992, ICUPC '92 Proceedings, pp. 253-257.

"Fictitious Business Name Records", Westlaw Database Directory, http://directory.westlaw.com/scope/default.asp?db=FBN-ALL &RS-W . . . &VR=2.0 as printed Dec. 17, 2009, pp. 5.

Fisher, Joseph, "Access to Fair Credit Reports: Current Practices and Proposed Legislation," American Business Law Journal, Fall 1981, vol. 19, No. 3, p. 319.

Franks et al., "HTTP Authentication: Basic and Digest Access Authentication", Network Working Group, Standards Track, Jun. 1999, pp. 34.

"Fraud Alert | Learn How". Fight Identity Theft. http://www.fightidentitytheft.com/flag.html, accessed on Nov. 5, 2009.

Gibbs, Adrienne; "Protecting Your Children from Identity Theft," Nov. 25, 2008, http://www.creditcards.com/credit-card-news/identity-ID-theft-and-kids-children-1282.php, p. 4.

Gordon et al., "Identity Fraud: A Critical National and Global Threat," LexisNexis, Oct. 28, 2003, pp. 1-48.

Gordon et al., "Using Identity Authentication and Eligibility Assessment to Mitigate the Risk of Improper Payments", LexisNexis, Jan. 28, 2008, pp. 18. https://risk.lexisnexis.com/-/media/files/government/white-paper/identity_authentication-pdf.pdf.

Haglund, Christoffer, "Two-Factor Authentication with a Mobile Phone", Fox Technologies, Uppsala, Department of Information Technology, Nov. 2, 2007, pp. 62.

Harrington et al., "iOS 4 In Action", Chapter 17, Local and Push Notification Services, Manning Publications Co., Jun. 2011, pp. 347-353.

Herzberg, Amir, "Payments and Banking with Mobile Personal Devices," Communications of the ACM, May 2003, vol. 46, No. 5, pp. 53-58.

Hoofnagle, Chris Jay, "Identity Theft: Making the Known Unknowns Known," Harvard Journal of Law & Technology, Fall 2007, vol. 21, No. 1, pp. 98-122.

ID Analytics, "ID Analytics® Consumer Notification Service" printed Apr. 16, 2013 in 2 pages.

ID Theft Assist, "Do You Know Where Your Child's Credit Is?", Nov. 26, 2007, http://www.idtheftassist.com/pages/story14, pp. 3.

"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.

Identity Theft Resource Center; Fact Sheet 120 A—To Order a Credit Report for a Child; Fact Sheets, Victim Resources; Apr. 30, 2007.

"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&SID=1&Fmt=3&clientId=19649&RQT=309&Vname=PQD.

Ideon, Credit-Card Registry that Bellyflopped this Year, Is Drawing some Bottom-Fishers, The Wall Street Journal, August 21, 1995, pp. C2.

Information Brokers of America, "Information Brokers of America Child Identity Theft Protection" http://web.archive.org/web/20080706135451/http://iboainfo.com/child-order.html as archived Jul. 6, 2008 in 1 page.

Information Brokers of America, "Safeguard Your Child's Credit", http://web.archive.org/web/20071215210406/http://www.iboainfo.com/child-id-protect.html as archived Dec. 15, 2007 in 1 page.

Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.

Iovation, Device Identification & Device Fingerprinting, http://www.iovation.com/risk-management/device-identification printed Nov. 5, 2012 in 6 pages.

Jones et al., "JSON Web Signature (JWS)", Internet Engineering Task Force (IETF), ISSN: 2070-1721, Standards Track, May 2015, pp. 59.

Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.

Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

Lee, W.A.; "Experian, on Deal Hunt, Nets Identity Theft Insurer", American Banker: The Financial Services Daily, Jun. 4, 2003, New York, NY, 1 page.

Lefebvre et al., "A Robust Soft Hash Algorithm for Digital Image Signature", International Conference on Image Processing 2:11 (ICIP), vol. 3, Oct. 2003, pp. 495-498.

Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.

Letter to Donald A. Robert from Carolyn B. Maloney, dated Oct. 31, 2007, pp. 2.

Letter to Donald A. Robert from Senator Charles E. Schumer, dated Oct. 11, 2007, pp. 2.

Letter to Harry C. Gambill from Carolyn B. Maloney, dated Oct. 31, 2007, p. 2.

Letter to Harry C. Gambill from Senator Charles E. Schumer, dated Oct. 11, 2007, p. 2.

Letter to Richard F. Smith from Carolyn B. Maloney, dated Oct. 31, 2007, pp. 2.

Letter to Richard F. Smith from Senator Charles E. Schumer, dated Oct. 11, 2007, pp. 2.

Li et al., "Automatic Verbal Information Verification for User Authentication", IEEE Transactions on Speech and Audio Processing, vol. 8, No. 5, Sep. 2000, pp. 585-596.

LifeLock, "How LifeLock Works," http://www.lifelock.com/lifelock-for-people printed Mar. 14, 2008 in 1 page.

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.

LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.

Lifelock, "Personal Identity Theft Protection & Identity Theft Products," http://www.lifelock.com/lifelock-for-people, accessed Nov. 5, 2007.

Lifelock, Various Pages, www.lifelock.com/, Jan. 9, 2007, pp. 49.

Lobo, Jude, "MySAP.com Enterprise Portal Cookbook," SAP Technical Delivery, Feb. 2002, vol. 1, pp. 1-13.

Lodderstedt et al., "OAuth 2.0 token Revocation", Internet Engineering Task Force (IETF), Standards Track, Aug. 2013, pp. 11.

(56) References Cited

OTHER PUBLICATIONS

Magid, Lawrence, J., Business Tools: When Selecting an ASP Ensure Data Mobility, Los Angeles Times, Los Angeles, CA, Feb. 26, 2001, vol. C, Issue 4, pp. 3.

Manilla, http://www.manilla.com/how-it-works/ printed Feb. 5, 2014 in 1 page.

Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.

Micarelli et al., "Personalized Search on the World Wide Web," The Adaptive Web, LNCS 4321, 2007, pp. 195-230.

Microsoft, "Expand the Reach of Your Business," Microsoft Business Solutions, 2004, in 16 pages.

Mint.com, http://www.mint.com/how-it-works/ printed Feb. 5, 2013 in 2 pages.

Mvelopes, http://www.mvelopes.com/ printed Feb. 5, 2014 in 2 pages.

My Call Credit http://www.mycallcredit.com/products.asp?product=ALR dated Dec. 10, 2005 on www.archive.org.

My Call Credit http://www.mycallcredit.com/rewrite.asp?display=faq dated Dec. 10, 2005 on www.archive.org.

My ID Alerts, "Why ID Alerts" http://www.myidalerts.com/why-id-alerts.jsps printed Apr. 3, 2012 in 2 pages.

My ID Alerts, "How it Works" http://www.myidalerts.com/how-it-works.jsps printed Apr. 3, 2012 in 3 pages.

"Name Availability Records", Westlaw Database Directory, http://directory.westlaw.com/scope/default.asp?db=NA-ALL&RS=W . . . &VR=2.0 as printed Dec. 17, 2009, pp. 5.

National Alert Registry Launches RegisteredOffendersList.org to Provide Information on Registered Sex Offenders, May 16, 2005, pp. 2, http://www.prweb.com/printer/240437.htm accessed on Oct. 18, 2011.

National Alert Registry Offers Free Child Safety "Safe From Harm" DVD and Child Identification Kit, Oct. 24, 2006. pp. 2, http://www.prleap.com/pr/53170 accessed on Oct. 18, 2011.

National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.

Next Card: About Us, http://web.cba.neu.edu/~awatson/NextCardCase/NextCardAboutUs.htm printed Oct. 23, 2009 in 10 pages.

Ogg, Erica, "Apple Cracks Down on UDID Use", http://gigaom.com/apple/apple-cracks-down-on-udid-use/ printed Nov. 5, 2012 in 5 Pages.

Pagano, et al., "Information Sharing in Credit Markets," Dec. 1993, The Journal of Finance, vol. 48, No. 5, pp. 1693-1718.

Partnoy, Frank, Rethinking Regulation of Credit Rating Agencies: An Institutional Investor Perspective, Council of Institutional Investors, Apr. 2009, pp. 21.

Paustian, Chuck, "Every Cardholder a King Customers get the Full Treatment at Issuers' Web Sites," Card Marketing, New York, Mar. 2001, vol. 5, No. 3, pp. 4.

People Finders, http://www.peoplefinders.com/?CMP=Google&utm_source=google&utm_medium=cpc printed Nov. 16, 2010 in 1 page.

People Lookup, "Your Source for Locating Anyone!" www.peoplelookup.com/people-search.html printed Nov. 16, 2010 in 1 page.

People Search, "The Leading Premium People Search Site on the Web," http://www.peoplesearch.com printed Nov. 16, 2010 in 2 pages.

PersonalCapital.com, http://www.personalcapital.com/how-it-works printed Feb. 5, 2014 in 5 pages.

Phinisee, Tamarind, "Banks, FTC Step Up Efforts to Address Identity Theft", San Antonio Business Journal; San Antonio, Jul. 5, 2002, vol. 16, No. 24, pp. 5.

Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.

Privacy Rights Clearinghouse, "Identity Theft: What to do if it Happens to You," http://web.archive.org/web/19990218180542/http://privacyrights.org/fs/fs17a.htm printed Feb. 18, 1999.

Ramaswamy, Vinita M., Identity-Theft Toolkit, The CPA Journal, Oct. 1, 2006, vol. 76, Issue 10, pp. 66-70.

Rawe, Julie; "Identity Thieves", Time Bonus Section, Inside Business, Feb. 2002, pp. 2.

Roth, Andrew, "CheckFree to Introduce E-Mail Billing Serving," American Banker, New York, Mar. 13, 2001, vol. 166, No. 49, pp. 3.

Sakimura et al., "OpenID Connect Core 1.0 Incorporating Errata Set 1", https://openid.net/specs/openid-connect-core-1_0.html, Nov. 8, 2014, pp. 78.

SAS, "SAS® Information Delivery Portal", Fact Sheet, 2008, in 4 pages.

Scholastic Inc.:Parent's Request for Information http://web.archive.org/web/20070210091055/http://www.scholastic.com/inforequest/index.htm as archived Feb. 10, 2007 in 1 page.

Scholastic Inc.:Privacy Policy http://web.archive.org/web/20070127214753/http://www.scholastic.com/privacy.htm as archived Jan. 27, 2007 in 3 pages.

Securities and Futures Commission, "Guideline on Anti-Money Laundering and Counter-Terrorist Financing", Jul. 2012, pp. 135.

Singletary, Michelle, "The Littlest Victims of ID Theft", The Washington Post, The Color of Money, Oct. 4, 2007.

Sun, Hung-Min, "An Efficient Remote Use Authentication Scheme Using Smart Cards", IEEE Transactions on Consumer Electronics, Nov. 2000, vol. 46, No. 4, pp. 958-961.

Target, "Free Credit Monitoring and Identity Theft Protection with Experian's ProtectMyID Now Available", Jan. 13, 2014, pp. 2. http://corporate.target.com.

TheMorningCall.com, "Cheap Ways to Foil Identity Theft," www.mcall.com/business/columnists/all-karp.5920748jul01,0 . . . , published Jul. 1, 2007.

"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.

Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.

US Legal, Description, http://www.uslegalforms.com/us/US-00708-LTR.htm printed Sep. 4, 2007 in 2 pages.

Vamosi, Robert, "How to Handle ID Fraud's Youngest Victims," Nov. 21, 2008, http://news.cnet.com/8301-10789_3-10105303-57.html.

Waggoner, Darren J., "Having a Global Identity Crisis," Collections & Credit Risk, Aug. 2001, vol. vol. 6, No. 8, pp. 6.

Wang et al., "User Identification Based on Finger-vein Patterns for Consumer Electronics Devices", IEEE Transactions on Consumer Electronics, May 2010, vol. 56, No. 2, pp. 799-804.

Weaver et al., "Federated, Secure Trust Networks for Distributed Healthcare IT Services", IEEE International Conference on Industrial Informatics, 2003. INDIN 2003. Proceedings, 2003, pp. 162-169.

Whatls.com, "Risk-Based Authentication (RBA)", https://web.archive.org/web/20121025033106/http://whatis.techtarget.com/definition/risk-based-authentication-RBA, Oct. 23, 2012, pp. 1.

Willems et al., "On the Security and Privacy of Interac e-Transfers", School of Electrical Engineering and Computer Science, Faculty of Engineering, University of Ottawa, Extended Version, Dec. 10, 2019, pp. 47.

Yahoo! Search, "People Search," http://people.yahoo/com printed Nov. 16, 2010 in 1 page.

YODLEE | Money Center, https://yodleemoneycenter.com/ printed Feb. 5, 2014 in 2 pages.

You Need a Budget, http://www.youneedabudget.com/features printed Feb. 5, 2014 in 3 pages.

Official Communication in Australian Patent Application No. 2014318966, dated Apr. 6, 2019.

(56) References Cited

OTHER PUBLICATIONS

Official Communication in Australian Patent Application No. 2019261724, dated Sep. 1, 2020.
Official Communication in Canadian Patent Application No. 2,923,697, dated Oct. 9, 2019.
Extended European Search Report for Application No. EP14843372. 5, dated May 2, 2017.
Official Communication in European Application No. EP14843372.5 dated Nov. 29, 2018.
Extended European Search Report for Application No. EP19203040. 1, dated Jan. 29, 2020.
Extended European Search Report for Application No. EP21183630. 9, dated Oct. 15, 2021.
International Search Report and Written Opinion for Application No. PCT/US2014/054713, dated Dec. 15, 2014.
International Preliminary Report on Patentability in Application No. PCT/US2014/054713, dated Mar. 24, 2016.
Official Communication in Australian Patent Application No. 2006306790, dated Apr. 29, 2010.
Official Communication in Australian Patent Application No. 2006306790, dated May 19, 2011.
International Search Report and Written Opinion for Application No. PCT/US2006/028006, dated Jul. 27, 2007.
International Preliminary Report on Patentability in Application No. PCT/US2006/028006, dated Apr. 23, 2008.
International Search Report and Written Opinion for Application No. PCT/US2019/037547, dated Oct. 4, 2019.
International Preliminary Report on Patentability in Application No. PCT/US2019/037547, dated Dec. 30, 2020.
International Search Report and Written Opinion for Application No. PCT/US2021/015566, dated May 11, 2021.
International Preliminary Report on Patentability in Application No. PCT/US2021/015566, dated Aug. 11, 2022.
Official Communication in Australian Patent Application No. 2021204354, dated Jun. 29, 2022.
Dekleva, Sasha, "Electronic Commerce: A Half-Empty Glass?" Communications of the Association for Information Systems, Jun. 2000, vol. 3, Article 18, pp. 101.
Official Communication in Australian Patent Application No. 2023226759, dated Sep. 21, 2023.

* cited by examiner

300B

320

Linkage System

User Interface — 321

Response Code Package Generator — 322

Rules Engine — 323

Database — 324

Network Interface Security System — 325

500

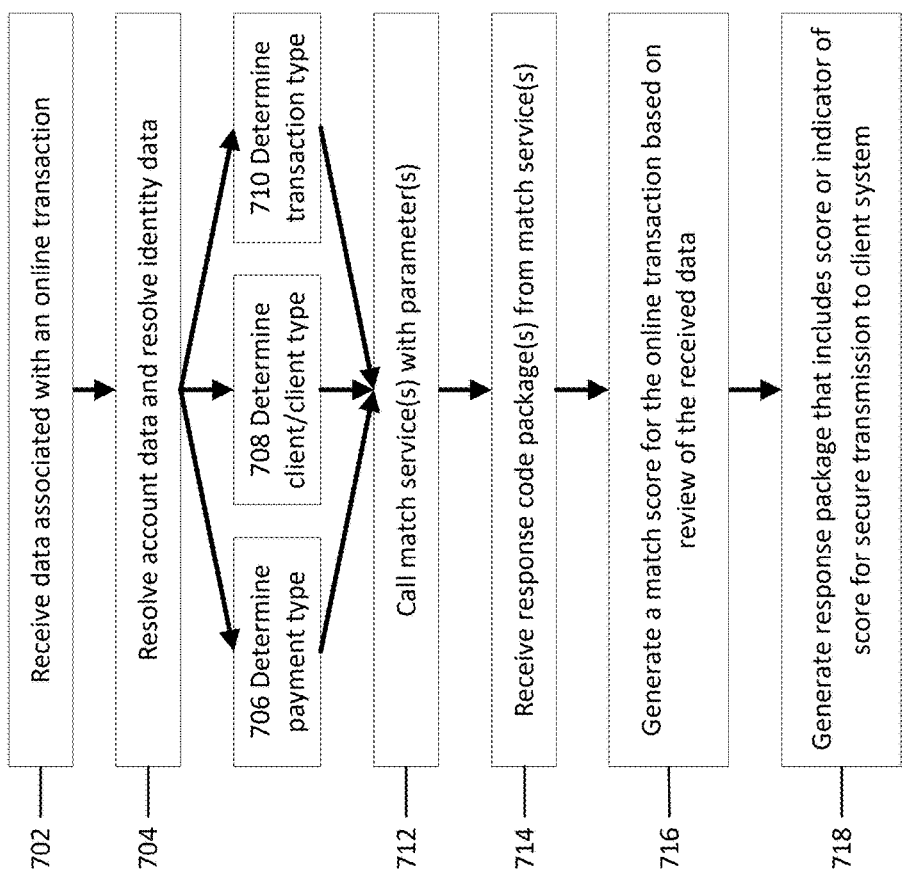

702 Receive data associated with an online transaction

704 Resolve account data and resolve identity data

706 Determine payment type

708 Determine client/client type

710 Determine transaction type

712 Call match service(s) with parameter(s)

714 Receive response code package(s) from match service(s)

716 Generate a match score for the online transaction based on review of the received data 718 Generate response package that includes score or indicator of score for secure transmission to client system

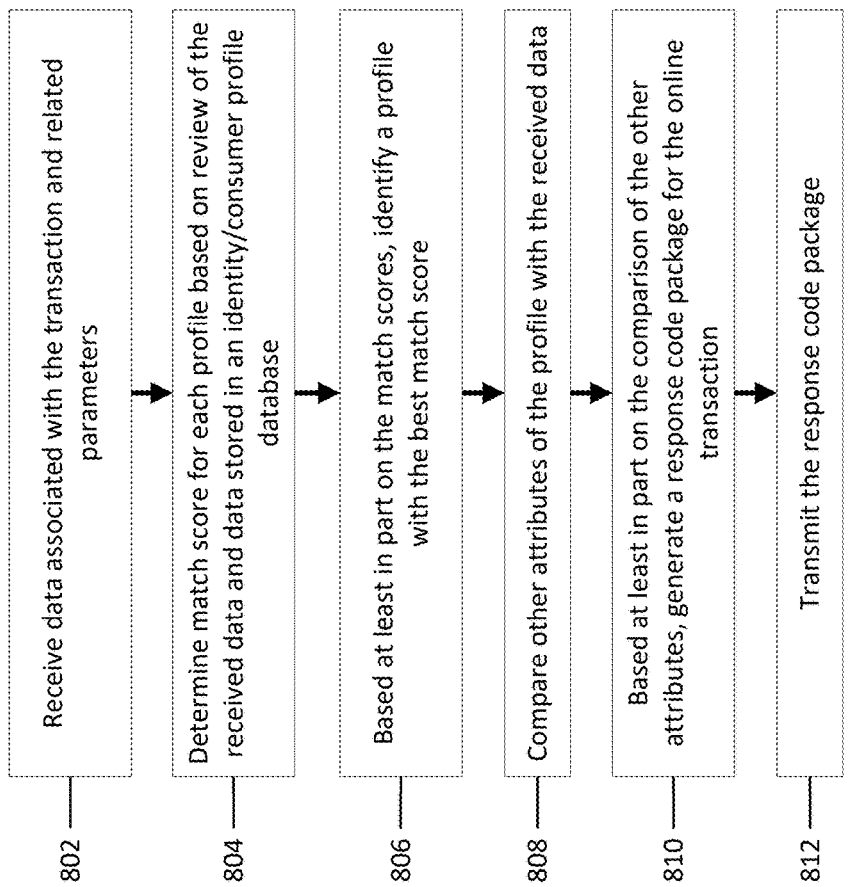

802 — Receive data associated with the transaction and related parameters

804 — Determine match score for each profile based on review of the received data and data stored in an identity/consumer profile database 806 — Based at least in part on the match scores, identify a profile with the best match score 808 — Compare other attributes of the profile with the received data 810 — Based at least in part on the comparison of the other attributes, generate a response code package for the online transaction 812 — Transmit the response code package

IDENTITY LINKAGE SYSTEMS AND METHODS FOR FRAUD DETECTION

INCORPORATION BY REFERENCE TO ANY PRIORITY APPLICATIONS

This application claims priority to U.S. Provisional Patent Application No. 63/136,591 filed on Jan. 12, 2021 and titled "IDENTITY LINKAGE SYSTEMS AND METHODS FOR FRAUD DETECTION" The entire content of the above-referenced application is hereby expressly incorporated herein by reference in its entirety for all purposes.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

FIELD OF EMBODIMENTS

The disclosure relates to providing online fraud detection to identity fraudulent or potentially fraudulent transactions.

SUMMARY OF EMBODIMENTS

Various systems, methods, and devices are disclosed for providing an identity linkage system to link a consumer's identity attributes and payment methods with stored consumer identity data. The systems, methods, and devices of the disclosure each have several innovative aspects, no single one of which is solely responsible for the desirable attributes disclosed herein.

Many identity attribute verification methods use data sources based on non-authoritative sources such as marketing databases. However, such data sources can be noisy, and verification methods using such data sources can return high false positives. Verification methods that exclude the inter-relationships between consumer identity attributes and payment methods may not adequately prevent fraudsters from using stolen identities and credit cards.

By directly linking a consumer's identity attributes and payment methods (for example, credit card numbers) with stored consumer identity data, the systems and methods described herein can provide improved online fraud detection, identity proofing, and authentication. Tying (or linking or correlating) an account number (for example, credit card number) to verified identity attributes like name, address, and/or phone number can prevent fraudsters from using stolen cards online, while ensuring legitimate customers are served without worrying about friction and declines.

In one embodiment, a system for online transaction fraud detection is disclosed. The system may include: one or more processors; a network communications interface; a memory; and computer code stored in the memory, wherein the computer code, when retrieved from the memory and executed by the one or more processors causes the one or more processors to: access a first set of payment instrument data associated with an online transaction in an active session and an account delivered via a first application programming interface of a client system; access a second set of identity attribute data associated with the online transaction in the active session and an identity; determine a client identifier associated with the online transaction in progress; apply client-specific parameters associated with the client identifier; using the client-specific parameters resolve the account automatically resolve the account using the client-specific parameters and the first set of payment instrument data to generate a resolved account; automatically resolve the identity using the client-specific parameters and the second set of identity attribute data to generate a resolved identity; select a match process based on the client-specific parameters and the payment instrument data; execute the selected match process to generate an encrypted data package storing a response code score based on the resolved account and the resolved identity, where the response code score is based on historical account data and historical identity data; and deploy the encrypted data package for automated delivery to a second application programming interface of the client system while the online transaction is still in the active session.

In another embodiment, a computer-implemented method of online transaction fraud detection is disclosed. The computer-implemented method may include, as implemented by one or more computing devices configured with specific executable instructions to at least: access a first set of payment instrument data associated with an online transaction in an active session and an account delivered via a first application programming interface of a client system; access a second set of identity attribute data associated with the online transaction in the active session and an identity; determine a client identifier associated with the online transaction in progress; apply client-specific parameters associated with the client identifier; using the client-specific parameters resolve the account automatically resolve the account using the client-specific parameters and the first set of payment instrument data to generate a resolved account; automatically resolve the identity using the client-specific parameters and the second set of identity attribute data to generate a resolved identity; select a match process based on the client-specific parameters and the payment instrument data; execute the selected match process to generate an encrypted data package storing a response code score based on the resolved account and the resolved identity, where the response code score is based on historical account data and historical identity data; and deploy the encrypted data package for automated delivery to a second application programming interface of the client system while the online transaction is still in the active session.

In a further embodiment, a non-transitory computer storage medium storing computer-executable instructions is disclosed. The non-transitory computer storage medium may store computer-executable instructions that, when executed by a processor, cause the processor to at least: access a first set of payment instrument data associated with an online transaction in an active session and an account delivered via a first application programming interface of a client system; access a second set of identity attribute data associated with the online transaction in the active session and an identity; determine a client identifier associated with the online transaction in progress; apply client-specific parameters associated with the client identifier; using the client-specific parameters resolve the account automatically resolve the account using the client-specific parameters and the first set of payment instrument data to generate a resolved account; automatically resolve the identity using the client-specific parameters and the second set of identity attribute data to generate a resolved identity; select a match process based on the client-specific parameters and the payment instrument data; execute the selected match process to generate an encrypted data package storing a response code score based on the resolved account and the resolved identity, where the response code score is based on historical account data and historical identity data; and deploy the encrypted data package for automated delivery to a second application programming interface of the client system while the online transaction is still in the active session.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings. The accompanying drawings, which are incorporated in, and constitute a part of, this specification, illustrate embodiments of the disclosure.

Throughout the drawings, reference numbers are re-used to indicate correspondence between referenced elements. The drawings are provided to illustrate embodiments of the subject matter described herein and not to limit the scope thereof. Specific embodiments will be described with reference to the following drawings.

FIG. 7 illustrates an embodiment of a process for generating a match score for an online transaction.

FIG. 8 illustrates an embodiment of a process for generating a response code package for an online transaction.

DETAILED DESCRIPTION OF EMBODIMENTS

Figure 1:
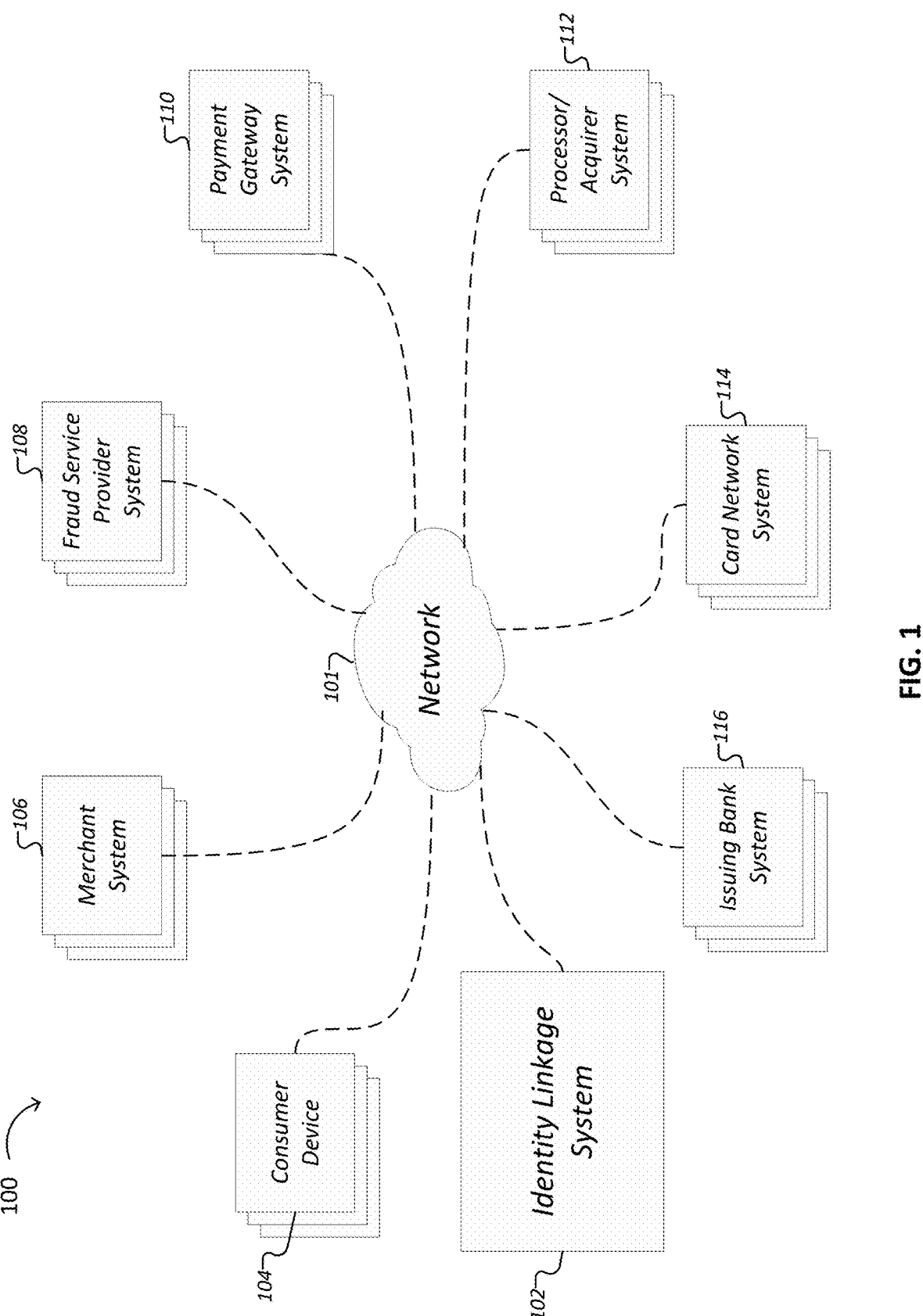
FIG. 1 is an overall system diagram illustrating an embodiment of an identity linkage environment when processing a transaction using an identity linkage system.

Embodiments of the disclosure will now be described with reference to the accompanying figures. The terminology used in the description presented herein is not intended to be interpreted in any limited or restrictive manner, simply because it is being utilized in conjunction with a detailed description of embodiments of the disclosure. Furthermore, embodiments of the disclosure may include several novel features, no single one of which is solely responsible for its desirable attributes or which is essential to practicing the embodiments of the disclosure herein described. For purposes of this disclosure, certain aspects, advantages, and novel features of various embodiments are described herein. It is to be understood that not necessarily all such advantages may be achieved in accordance with any particular embodiment. Thus, for example, those skilled in the art will recognize that one embodiment may be carried out in a manner that achieves one advantage or group of advantages as taught herein without necessarily achieving other advantages as may be taught or suggested herein.

Merchants who evaluate each element of a transaction separately for risk decisioning-consumer identity, payment instrument validity, and the transaction behavior-often do not have a holistic and integrated view of the overall risk. The fact that a given payment instrument is valid may not tell the complete story on the identity attached to it. For example, the fact that a given payment instrument is valid may not indicate whether there are any anomalous activities (for example, fraudulent activities that would normally make a merchant pause before processing an online purchase) associated with a consumer using the valid payment instrument. Similarly, the fact that an online purchase is made by a legitimate consumer may not inform the merchant whether the legitimate consumer is authorized to use the payment instrument in a transaction. Together, using a combination of consumer identity information, payment instrument information, and transaction data can improve the likelihood of detecting fraudulent, or potentially fraudulent transactions.

Existing card authentication measures often suffer from high false positives, friction, and lack of card issuer support. Card networks provided by companies like Visa and MasterCard do not possess consumer personally identifiable information (PII), but can connect transactions to credit cards. Card networks can verify a card's validity, but cannot verify a user. On the other hand, issuing banks possess consumer PII and transactional data on consumers. However, issuing banks cannot link consumer PII to cards, and do not share consumer PII with card networks (or other card issuers) so they cannot link cards and PII at scale. On the other hand, by implementing a system that allows access to both consumer PII and credit account information (for example, link between credit card number and consumer transactional data), embodiments of the system described herein can provide a system that directly links a consumer with the consumer's credit cards (for example, regardless of card network).

Further, because not all transactions involve credit cards, merchants who accept transactions by other payment methods, such as by debit card or via direct deposit accounts have limited option to verify that the consumer behind the transaction (for example, the information presented) owns or is authorized to transact with the payment method presented. Merchants have further difficulty evaluating these alternate payment transactions because debit card data is not widely available and direct deposit data is hard to obtain.

Embodiments of the system can provide an augmented payment instrument authentication process by adding the ability of verifying the linkage of the payment instrument with the consumer identity authorized to use the payment instrument. This system may also search for attribute linkages across the system's network of credit and identity inquiries to understand risk holistically.

In some embodiments, a merchant can query the system with a payment instrument number in the buy flow, the name of the customer, and, optionally, some or all of the shipping address and/or phone number through an application programming interface (API) call or other electronic communication channel. The system may, in real-time, match the payment instrument number to a corresponding identity and validate additional inputs, such as address and phone number against card issuer data. The card issuer data may be provided to the system on a periodic basis, such as for example, every month, biweekly, daily, or hourly. The system can then analyze the identity connected to the payment account (for example, credit card number), and automatically generate a risk assessment based on the identity and credit inquiries associated with the identity, or its attributes.

In some embodiments, an identity linkage system can verify the link between a payment instrument and a set of consumer identity attributes and, in real-time, create a new and differentiated asset to assess risk on a consumer-initiated online transaction involving use of a payment instrument (such as a credit card, debit card, and/or the like). The identity linkage system can receive consumer identity information and payment instrument information to generate accurate linkages (or profiles) associating the consumer identity information and the payment instrument information. After linkages are generated, they can be compared to incoming transaction data associated with online transactions to determine whether an online transaction may be fraudulent. The assessment may then be used by the various systems to approve, block, or flag for additional review an online transaction.

In some embodiments, the system is referred to as an identity linkage system and can, for example, reduce fraud losses from chargebacks and stolen credit cards, reduce friction in consumer onboarding and payment, improve decline rates at moment of transacting, reduce cart abandonment, and allow for refunds and/or credit disbursements to be funded to the correct consumer account or credit card.

In some embodiments, where data for specific payment methods (such as debit cards and direct deposit accounts) may be unavailable or difficult to access, the identity linkage system can assess risk for these types of transactions by providing proxy check on the identity as it relates to the payment method. In some embodiments, an inquiry proxy can be used, which may involve a method for determining payment risk and identity risk in payments by utilizing identity proofing inquiries in account openings as a proxy to determine the risk of a payment transaction by determining the correlation between successful and unsuccessful identity proofing events and payment transactions for a specific consumer identity. In some embodiments, a relationship proxy can be used, which may involve a method for determining payment risk and identity risk in payments by comparing known account relationships (for example, known to a credit bureau) to information provided during payment provisioning to determine the risk of a payment transaction by determining a correlation between successful and unsuccessful identity proofing events and payment transactions for a specific consumer identity.

In some embodiments, the identity linkage system can be used for various on-line or e-commerce fraud use cases including account opening, account take over, or chargebacks. In some embodiments, the system may only require a limited set of information, such as a first and last name, of a consumer for linking credit card to consumer identity. Additionally, the system may request other information such as, but not limited to, address, phone number, email address, and/or date of birth. It is also recognized that in some embodiments, portions of those data elements may be used in a variety of combinations, such as, for example, first initial with last name, street name with city and state, last name with zip code along with month and date of birth. Compared to existing credit account verification methods, the system may not post any inquiry on a consumer's credit report. As such, the system may be utilized for higher volumes and real-time on-line and e-commerce transactions.

Identity Linkage System Environment

FIG. 1 is an overall system diagram illustrating an embodiment of an identity linkage environment 100 for processing a transaction using an identity linkage system. The environment 100 can include consumer devices 104, issuing bank systems 116, and card network systems 114 in communication with a network 101 and an identity linkage system 102 in communication over network 101 with client systems, such as merchant systems 106, fraud service provider systems 108, payment gateway systems 110, and process/acquirer systems 112. While multiple systems are included in FIG. 1, it is recognized that in other embodiments there may only be a single system. Embodiments of the identity linkage system 102 will be further described with reference to FIGS. 3A and 3B.

The consumer device 104 may be a personal computer, a laptop computer, a smart phone, a tablet, and/or the like, that can be used to access a merchant system 106 over network 101, such as for online shopping. The merchant system 106 may be any system used by a merchant involved in online commerce conducting online transactions with consumer(s). The fraud service provider system 108 may be any system used by a fraud service provider that provides online fraud solutions. The payment gateway system 110 may be any payment gateway system that provides payment gateway services to merchants. The processor/acquirer system 112 may be any processor/acquirer system that provides payment processing services to merchants. The card network system 114 may be any system provided by a card issuer (such as companies like Visa, Mastercard, American Express, and Discover) that can verify card validity and connect transactions to credit cards. The issuing bank system 116 may be any financial or banking system that provides cards and credit limits to consumers or business and manage features of credit cards, including, for example, terms and benefits.

While FIG. 1 shows an example number of systems in communication with network 101, it is recognized that in some embodiments, multiple consumer devices 104, issuing bank systems 116, and card network systems 114 may be in communication with network 101 and the identity linkage system 102 may be in communication over network 101 with multiple client systems, such a multiple merchant systems 106, fraud service provider systems 108, payment gateway systems 110, and process/acquirer systems 112. Further, "multiple" can include, for example, tens, hundreds, thousands, or millions, of systems in communication with the identity linkage system 102.

The client systems (for example, client systems 106, 108, 110, and 112) can each include a transaction database and client parameters. The transaction databases can include transaction data associated with transactions conducted by a consumer or a set of consumers, such consumer devices 104. For example, the transactions data can represent transactions (for example, online transactions) conducted by consumer devices 104 with merchant systems 106.

Some examples of the transaction data associated with a transaction can include, but are not limited to, payment methods (for example, credit cards, debit cards, and Automated Clearing House (ACH) payments), payment term length (for example, one-time payment, 2 months, 3 months, 6 months, 12 months, 24 months, 60 months, and so forth), amount of credit history (for example, less than 5 years, greater than 5 years and less than 10 years, greater than 10 years, and so forth), device information (for example, device brand, IP address, operating system, user agent, and so forth), product type (for example, electronics, clothes, cars, books, and so forth), purchase dollar amount (for example, exact amount, less than $25, greater than $25 and less than $50, greater than $50 and less than $100, greater than $100 and less than $500, and so forth), Internet service provider (for example, Cox Communications, Charter Communications, AT&T Internet Services, and so forth), consumer credit history, and so forth. The system may utilize historical transaction data and historical fraud determinations and/or truth-marked data indicating whether or not a specific transaction was fraudulent or not.

In some embodiments, the transaction data may be collected by the client systems and stored in the corresponding transaction databases. It is recognized that the database may be stored in whole or in part on site in a client facility or in one or more cloud storage locations controlled or managed by the client. In some embodiments, the transaction data may be collected at different stages of corresponding transactions (for example, during log-in, before purchase, after purchase, and so forth). The transaction data may be stored individually or in batches.

The network 101 can comprise one or more networks, including, for example, a local area network (LAN), wide area network (WAN), and/or the Internet, for example, via a wired, wireless, or combination of wired and wireless, communication links. The network 101 can facilitate communication between the client systems 106, 108, 110, and 112 and the identity linkage system 102. The client systems 106, 108, 110, and 112 can transmit (for example, wirelessly) or make electronically available consumer transaction information stored in the corresponding transaction databases to the identity linkage system 102 via the network 101. Additionally, the client systems 106, 108, 110, and 112 can transmit (for example, wirelessly) or make electronically available client parameters stored in the corresponding transaction databases to the identity linkage system 102 via the network 101. In some embodiments, the identity linkage system 102 includes a user interface portal that allows the client parameters to be submitted and stored in the identity linkage system 102. Embodiments of the user interface portal will be discussed further with reference to FIG. 9. In some embodiments, the network 101 can be associated with (for example, operated by) the one or more of the clients 106, 108, 110, and 112 or the identity linkage system 102 (for an entity associated with the identity linkage system 102).

Embodiments of data flow and example transactions is described below for the different client systems 106, 108, 110, and 112 with reference to FIGS. 2A, 2B, 2C, and 2D.

Merchant Client System

Figure 2A:
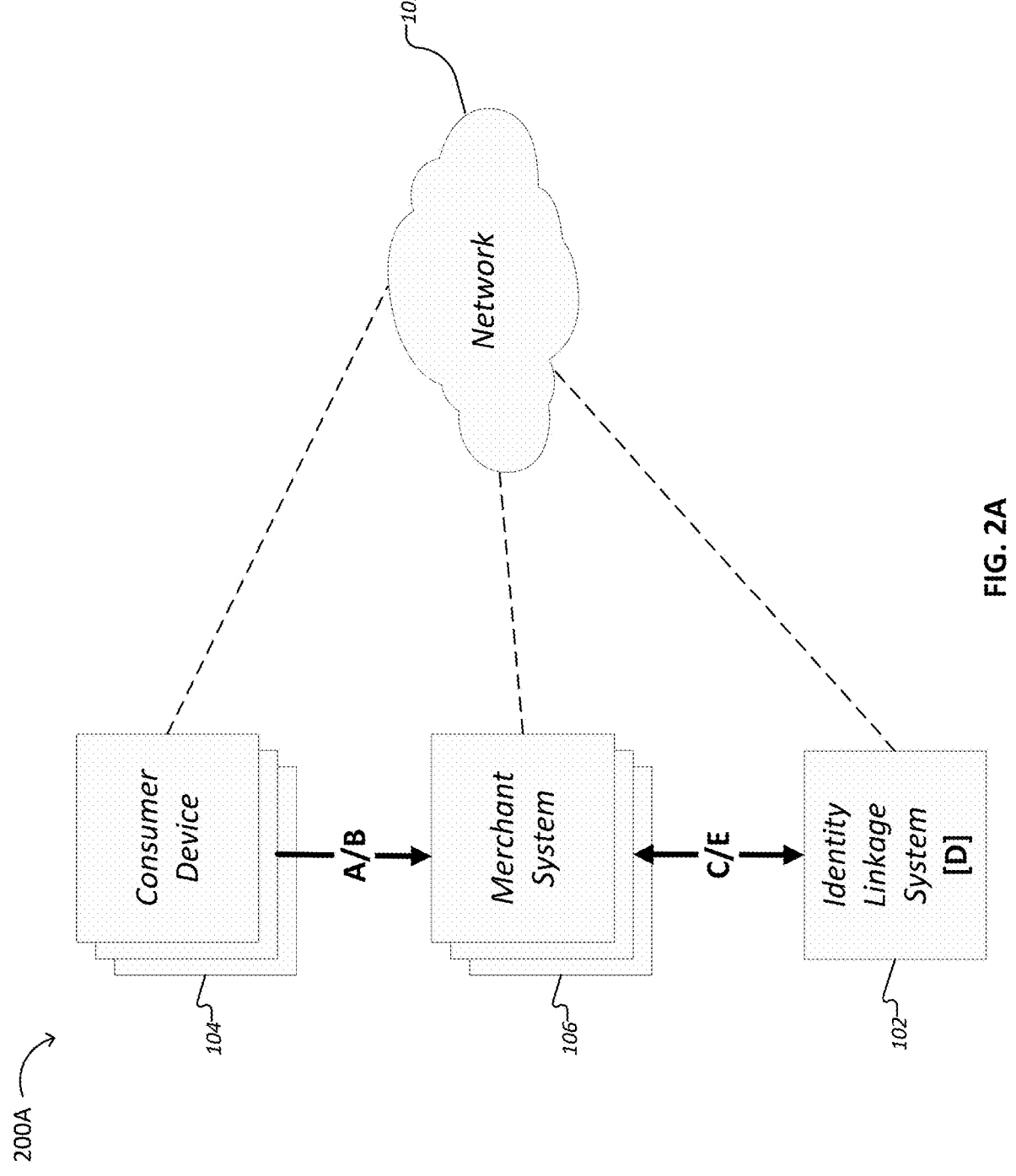
FIG. 2A is an embodiment of a system diagram illustrating a transaction using an identity linkage system in conjunction with a merchant system.

FIG. 2A is an embodiment of a system diagram illustrating a transaction using the identity linkage system 102 where the merchant system 106 is the client system that receives the fraud analysis. A merchant using merchant system 106 may be any type of merchant who is involved in online commerce conducting online or e-commerce transactions with consumer(s). The identity linkage system 102 may be used by merchants whose merchant systems 106 include in-house fraud tools that can ingest the identity linkage system match codes, scores, and/or signals. In some embodiments, the identity linkage system 102 is configured to directly communicate with the in-house fraud tools and may provide merchants with up-front decisioning and intelligence before finalizing or approving an online or e-commerce transaction.

With continued reference to FIG. 2A, the process begins at block A after a consumer, using consumer device 104, accesses the merchant system 106 such as by a merchant app or via the merchant's website over network 101. The consumers, whether legitimate or not, may conduct online transactions with the merchant system 106 using a payment instrument, for example, a credit card or debit card. It is recognized that the authorized users of payment instruments may be individuals who have the credit/debit card account or persons who are authorized to use the credit/debit card account of other persons or of entities, such as an employee with authority to use the company credit card or an authorized user or joint owner of a credit card account. The use of the term "consumer" is meant to apply to any person using the payment instrument.

At block B, the consumer device 104 initiates an online transaction with the merchant system 106 through network 101. The consumer device 104 may provide some consumer PII along with payment instrument information (for example, credit card number, debit card number, routing number, direct deposit account number, and/or the like). The online transaction may be transmitted from the merchant app or website to the merchant system 106 via an API call or other electronic communication channel. The merchant system 106 may then wish to verify whether the payment instrument information provided by the consumer device 104 is valid (for example, whether the payment instrument information received has been previously associated with the consumer using consumer device 104). Since some merchants (such as ride hailing providers) assume a certain amount of risk upfront before receiving payment, it is important to some of those merchants to be able to confirm that the payment instrument information received is valid prior to providing the service. Additionally, for electronic commerce transactions where changes are made to an account, merchants may want to verify that the payment instrument is tied to a consumer before finalizing a transaction on the website. Further, for guest checkout, where very limited information and fraud signals are detected from a consumer, it can be important to verify the payer's identity and the payer's linkage to the instrument before transacting.

At block C, the merchant system 106 may provide the consumer PII and the payment instrument information from the consumer device 104 to the identity linkage system 102 through network 101, such as, via an API call or other electronic communication channel.

At block D, the identity linkage system 102 ingests the data, performs analytics, and generates a response package. The identity linkage system 102 may use existing linkages (or profiles) between consumer identity information and payment instrument information to determine whether the information provided by the consumer device 104 to the merchant system 106 is potentially fraudulent. Embodiment of this identity linkage system 102 analytics and response package generation will be described further with reference to FIGS. 3A, 3B.

At block E, the identity linkage system 102 sends or makes available a response package to the merchant system 106, such as, via an API call or other electronic communication channel. In some embodiments, the response package is fed directly into an in-house fraud tool executing within or in conjunction with the merchant system 106. Based on the response package, the merchant system 106 can make an informed decision, in real-time, to accept or decline the transaction. Embodiments of the response package and decisioning process will be described further with reference to FIGS. 7 and 8.

Fraud Service Provider Client System

Figure 2B:
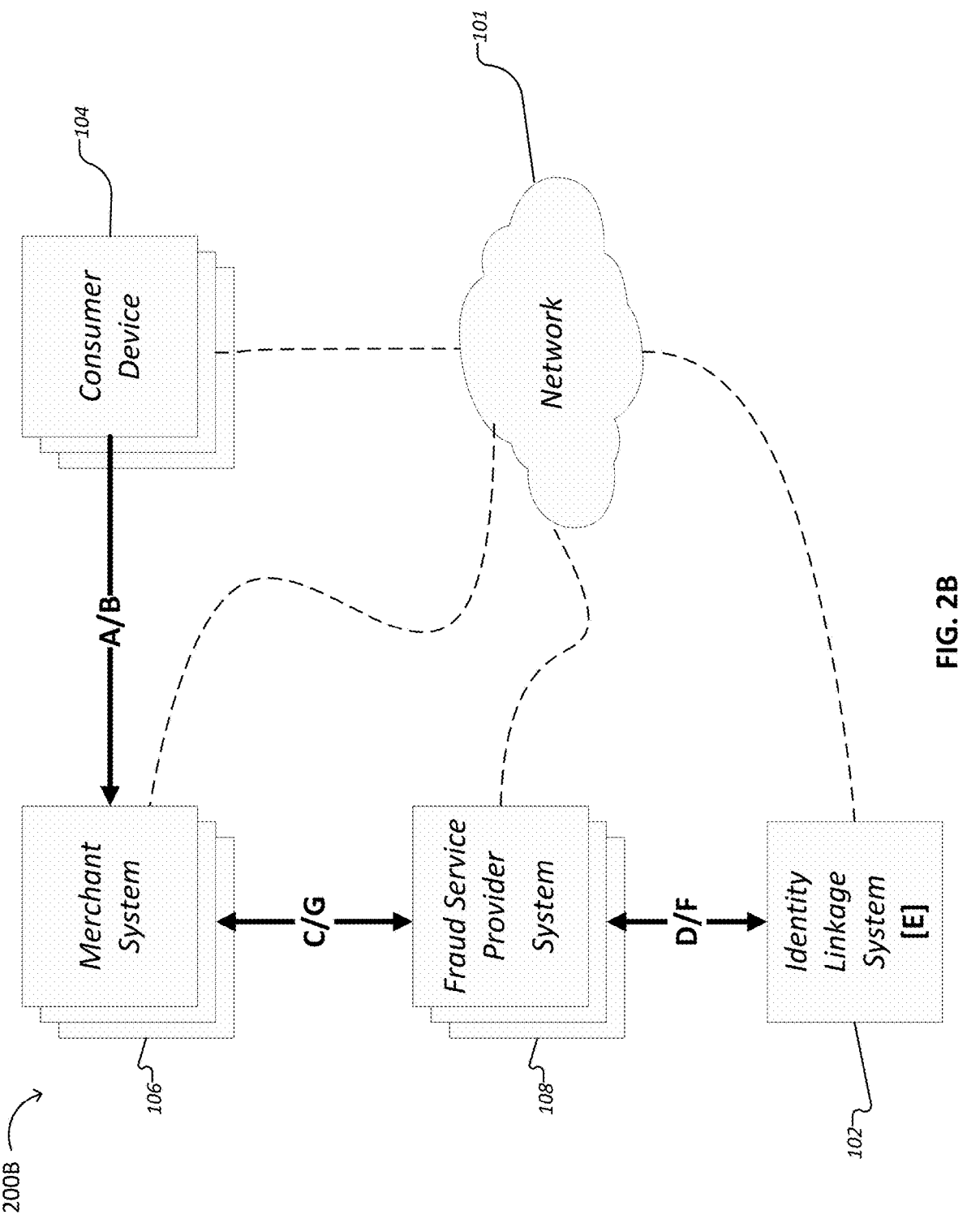
FIG. 2B is an embodiment of a system diagram illustrating a transaction using an identity linkage system in conjunction with a fraud service provider system.

FIG. 2B is an embodiment of a system diagram illustrating a transaction using the identity linkage system 102 where fraud service providers using fraud service providers system 108 is the client system that receives the fraud analysis. A fraud service provider using fraud service provider system 108 may be any of type of service provider that provides various fraud services and includes, for example, behavioral biometrics, device identification verification, identity verification, historical transaction monitoring, account take over, account opening, and/or the like. The identity linkage system 102 may be used by fraud service providers to improve fraud capabilities with preventive signals before transactions are processed in order to provide a value-add to existing e-commerce fraud solutions. In some embodiments, the identity linkage system 102 is configured to directly communicate with existing e-commerce fraud solutions and may provide fraud service providers with decisioning and intelligence that the fraud service providers may then deliver to the corresponding merchants. Further, the identity linkage system 102 may benefit merchants using merchant systems 106 that do not include in-house fraud tools that can ingest the identity linkage system, but instead rely on fraud service provider systems 108 for decisioning and intelligence before finalizing or approving an online or e-commerce transaction.

With continued reference to FIG. 2B, the process begins at block A after a consumer, using consumer device 104, accesses the merchant system 106 such as by a merchant app or via the merchant's website over network 101.

At block B, the consumer device 104 initiates an online transaction with the merchant system 106 through network 101. The consumer device 104 may provide some consumer PII along with payment instrument information (for example, credit card number, debit card number, routing number, direct deposit account number, and/or the like). The online transaction may be transmitted from the merchant app or website to the merchant system 106 via an API call or other electronic communication channel.

At block C, the merchant system 106 may provide the consumer PII and the payment instrument information from the consumer device 104 to the fraud service provider system 108 through network 101, such as, via an API call or other electronic communication channel.

At block D, the fraud service provider system 108 sends the consumer PII and the payment instrument information from the merchant system 106 to the identity linkage system 102 through network 101, such as, via an API call or other electronic communication channel.

At block E, the identity linkage system 102 ingests the data, performs analytics, and generates a response package.

At block F, the identity linkage system 102 sends or makes available a response package to the fraud service provider system 108 through network 101, such as, via an API call or other electronic communication channel. In some embodiments, the response package is fed directly into existing e-commerce fraud solutions executing within or in conjunction with the fraud service provider system 108. Based on the response package, the fraud service provider system 108 can make an informed decision as to whether the transaction appears fraudulent. A fraud service provider system 108 may provide further analysis and/or regression on the response package provided by the identity linkage system 102.

At block G, the fraud service provider system 108 sends a respond package to the merchant system 106 through network 101, such as, via an API call or other electronic communication channel. The response package sent to the merchant system 106 may be the same as or different from the response package sent to the fraud service provider system 108 from the identity linkage system 102. For example, for some merchant systems 106, a response package may be a simple indicator of whether the transaction meets a predetermined threshold of reliability determined by the fraud service provider system 108. For other merchants, a more complex response package may be provided by the fraud service provider system 108. Based on the response package, the merchant system 106 can make an informed decision, in real-time, to accept, decline, or further review the transaction.

Payment Gateway Client System

Figure 2C:
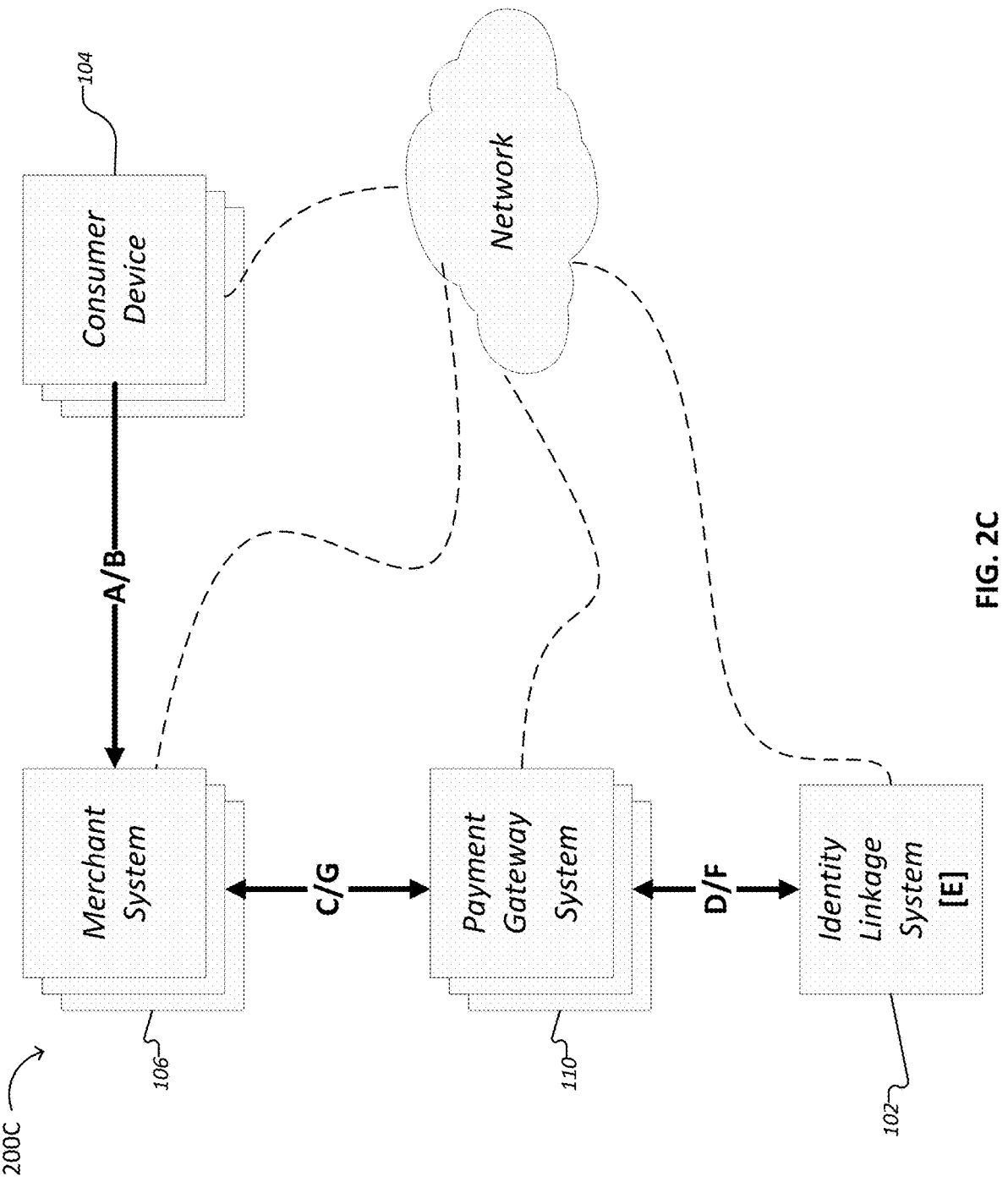
FIG. 2C is an embodiment of a system diagram illustrating a transaction using an identity linkage system in conjunction with a payment gateway system.

FIG. 2C is an embodiment of a system diagram illustrating a transaction using the identity linkage system 102 where a payment gateway using payment gateway system 110 is the client system that receives the fraud analysis. A payment gateway provider using payment gateway provider system 110 may be any of type of service provider that authorizes and/or directs payments for processing. Like fraud service providers, a payment gateway system 110 can use the identity linkage system 102 to provide merchants using the payment gateway system 110 with increased confidence in processing transactions. In some embodiments, the identity linkage system 102 is configured to directly communicate with existing fraud solutions within the payment gateway system 110 and may provide payment gateway providers with decisioning and intelligence that the payment gateway providers may then deliver to the corresponding merchants. An additional benefit may also be reduced costs up-front for the payment gateway providers. Further, the identity linkage system 102 may benefit merchants using merchant systems 106 that do not include in-house fraud tools that can ingest the identity linkage system and rely on payment gateway systems 110 for decisioning and intelligence before finalizing or approving an online or e-commerce transaction.

With continued reference to FIG. 2C, the process begins at block A after a consumer, using consumer device 104, accesses the merchant system 106 such as by a merchant app or via the merchant's website over network 101.

At block B, the consumer device 104 initiates an online transaction with the merchant system 106 through network 101. The consumer device 104 may provide some consumer PII along with payment instrument information (for example, credit card number, debit card number, routing number, direct deposit account number, and/or the like). The online transaction may be transmitted from the merchant app or website to the merchant system 106 via an API call or other electronic communication channel.

At block C, the merchant system 106 may provide the consumer PII and the payment instrument information from the consumer device 104 to the payment gateway system 110 through network 101, such as, via an API call or other electronic communication channel.

At block D, the payment gateway system 110 sends the consumer PII and the payment instrument information from the merchant system 106 to the identity linkage system 102 through network 101, such as, via an API call or other electronic communication channel.

At block E, the identity linkage system 102 ingests the data, performs analytics, and generates a response package.

At block F, the identity linkage system 102 sends or makes available a response package to the payment gateway system 110 through network 101, such as, via an API call or other electronic communication channel. In some embodiments, the response package is fed directly into existing fraud solutions executing within or in conjunction with the payment gateway system 110. Based on the response package, the payment gateway system 110 can make an informed decision as to whether the transaction appears fraudulent. A payment gateway system 110 may provide further analysis and/or regression on the response package provided by the identity linkage system 102.

At block G, the payment gateway system 110 sends a respond package to the merchant system 106 through network 101, such as, via an API call or other electronic communication channel. The response package sent to the merchant system 106 may be the same as or different from the response package sent to the payment gateway system 110 from the identity linkage system 102. For example, for some merchant systems 106, a response package may be a simple indicator of whether the transaction meets a predetermined threshold of reliability determined by the payment gateway system 110. For other merchants, a more complex response package may be provided by the payment gateway system 110. Based on the response package, the merchant system 106 can make an informed decision, in real-time to accept, decline, or further review the transaction.

Payment Processor/Acquirer Client System

Figure 2D:
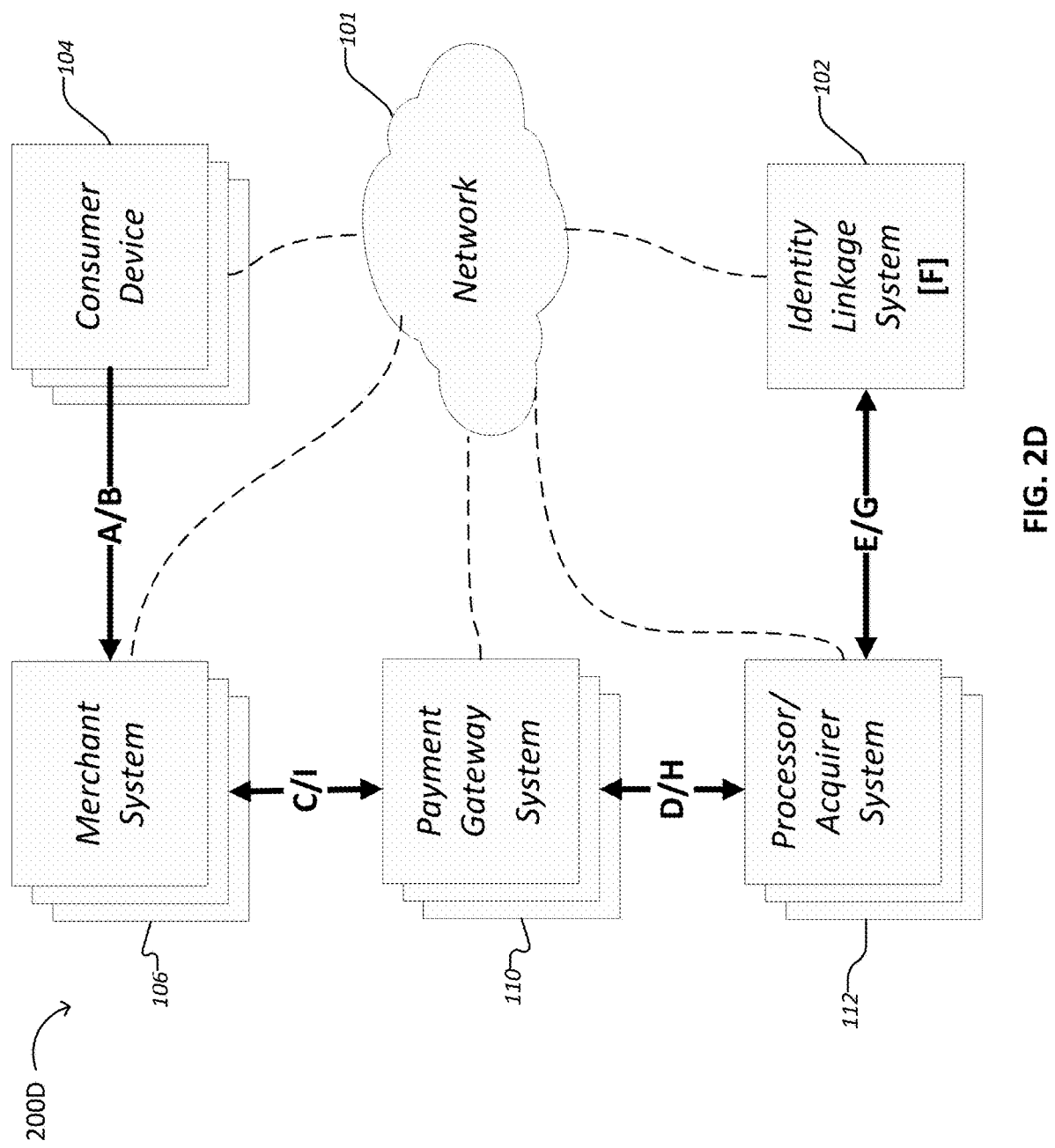
FIG. 2D is an embodiment of a system diagram illustrating a transaction using an identity linkage system in conjunction with a processor/acquirer system.

FIG. 2D is an embodiment of a system diagram illustrating a transaction using the identity linkage system 102 where a payment processor/acquirer using processor/acquirer system 112 is the client system that receives the fraud analysis. A payment processor/acquirer using payment processor/acquirer system 112 may be any of type of service provider that authorizes and/or directs payments for processing. A payment processor/acquirer can use the identity linkage system 102 to provide additional information and eliminate additional steps for more informed decision making. In some embodiments, the identity linkage system 102 is configured to directly communicate with existing fraud solutions within the payment processor/acquirer system 112 and may provide payment processors/acquirers with decisioning and intelligence that the payment processors may then deliver to the corresponding merchants. Further, the identity linkage system 102 may benefit merchants using merchant systems 106 that do not include in-house fraud tools that can ingest the identity linkage system and rely on processor/acquirer systems 112 for decisioning and intelligence before finalizing or approving an online or e-commerce transaction.

With continued reference to FIG. 2D, the process begins at block A after a consumer, using consumer device 104, accesses the merchant system 106 such as by a merchant app or via the merchant's website over network 101.

At block B, the consumer device 104 initiates an online transaction with the merchant system 106 through network 101. The consumer device 104 may provide some consumer PII along with payment instrument information (for example, credit card number). The online transaction may be transmitted from the merchant app or website to the merchant system 106 via an API call or other electronic communication channel.

At block C, the merchant system 106 may provide the consumer PII and the payment instrument information from the consumer device 104 to the payment gateway system 110 through network 101, such as, via an API call or other electronic communication channel.

At block D, the merchant system 106 may provide the consumer PII and the payment instrument information from the consumer device 104 to the processor/acquirer system 112 through network 101, such as, via an API call or other electronic communication channel.

At block E, the processor/acquirer system 112 sends the consumer PII and the payment instrument information from the merchant system 106 to the identity linkage system 102 through network 101.

At block F, the identity linkage system 102 ingests the data, performs analytics, and generates a response package.

At block G, the identity linkage system 102 sends or makes available a response package to the processor/acquirer system 112 through network 101.

At block H, the processor/acquirer system 112 sends a response package to the payment gateway system 110 through network 101, such as, via an API call or other electronic communication channel. In some embodiments, the response package is fed directly into existing fraud solutions executing within or in conjunction with the payment processor/acquirer system 112. Based on the response package, the payment processor/acquirer system 112 can make an informed decision as to whether the transaction appears fraudulent. A payment processor/acquirer system 112 may provide further analysis and/or regression on the response package provided by the identity linkage system 102.

At block I, the payment processor/acquirer system 112 sends a response package to the merchant system 106 and/or the payment gateway system 110, through network 101. The response package sent to the merchant system 106 or the payment gateway system 110 may be the same as or different from the response package sent to the payment processor/acquirer system 112 from the identity linkage system 102. For example, for some merchant systems 106 or the payment gateway systems 110, a response package may be a simple indicator of whether the transaction meets a predetermined threshold of reliability determined by the payment processor/acquirer system 112. For other merchants or payment gateway providers, a more complex response package may be provided by the payment processor/acquirer system 112. Based on the response package, the merchant system 106 or the payment gateway system 110 can make an informed decision, in real-time, to accept, decline, or further review the transaction.

Identity Linkage System

Figure 3A:
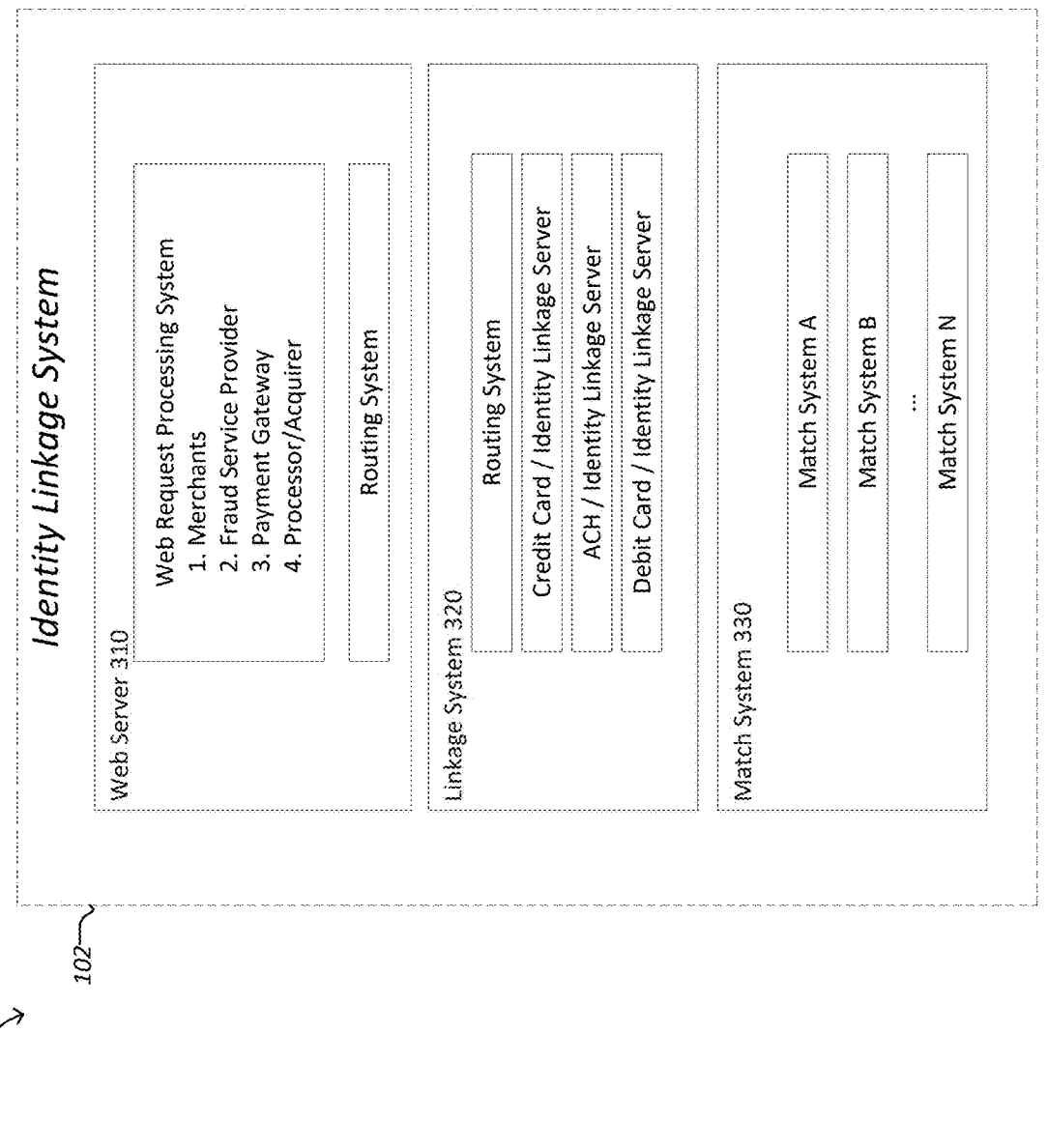
FIG. 3A illustrates an embodiment of an identity linkage system and system subcomponents.

FIG. 3A illustrates an embodiment of the identity linkage system 102 and system subcomponents. Identity linkage system 102 may include one of more of the following subsystems: web server 310, linkage system 320, and match system 330. Web server 310 may include further subsystems such as, for example, a web request processing system, a routing system, and/or the like. Linkage system 320 may include further subsystems such as, for example, a routing system and a single identity linkage server or different identity linkage servers, such as, based on the payment method (for example, credit card, ACH, or debit card payment). Match system 330 may include a single match system or further subsystems such as, for example, different match systems (match system A, B, . . . . N) for different payment methods, clients, client types, and/or the like.

With reference to the example transaction processes described in FIGS. 2A, 2B, 2C, and 2D, after a client system (for example, merchant system 106, fraud service provider system 108, payment gateway system 110, or processor/acquirer system 112) sends a request to the identity linkage system 102 over network 101 (for example through an API call or other electronic communication channel), the routing system may forward the request to the appropriate server on the network. Depending on which type of client is sending the request, a different processing system may be used. For example, the routing system may direct the request to a different server for each type of client such that each client is directed to the correct web request processing system for their client type. The request may also be directed to a different server in linkage system 320 depending on the payment method. Additionally, based on the request, a different match system from match system 330 may be used. The match system may be selected based on payment method, client type, and/or specific client. In some embodiments, the identify linkage system is configured to handle requests from merchant systems 106, fraud service provider systems 108, payment gateway systems 110, and processor/acquirer systems 112, but in other embodiments, the identify linkage system is configured to handle requests from a subset of those systems.

With reference to FIG. 1 and the transaction processes described in FIGS. 2A, 2B, 2C, and 2D, the identity linkage system 102 can communicate with card network system(s) 114 and issuing bank system(s) 116. After the identity linkage system 102 receives a request, the client system may provide the consumer PII and the payment instrument information from the consumer device 104 to the identity linkage system 102 through network 101. The identity linkage system 102 may then perform analytics. For example, the identity linkage system 102 may receive a first set of data from the client system (for example, client systems 106, 108, 110, and 112). The first set of data can include, for example, transaction information, credit card number, expiration date, name of a consumer, billing address, and/or the like associated with a given payment instrument. The identity linkage system 102 may also access a second set of data on file with an entity, such as, for example, a credit bureau or credit reporting agency. The second set of data may have been received by the entity storing the information periodically provided by reporting entities for credit bureau operations, such as reporting information from creditors. The second set of data can include, for example, consumer PII, such as consumer name, billing address, and/or the like, payment instrument information associated with a corresponding issuing bank (for example, Chase bank or Bank of America) and/or card network (for example, Visa, Mastercard), transaction data associated with a corresponding issuing bank and/or card network and its payment instruments, and the like. After the identity linkage system 102 receives the first set of data and accesses the second set of data, it can generate a linkage between the first set of data and the second set of data. For example, the linkage between the first set of data and the second set of data may provide a set of payment instruments and associated transaction data (for example, purchase data, billing address, shipping address, associated phone number, and the like) for a given consumer. In some embodiments, the linkage may be represented as a score where the value of the score relative to other potential scores indicates the strength of the linkage. In some embodiments, identity linkage system 102 may provide a confidence level that indicates the confidence of the linkage or linkage score. It is recognized that communication may include indirect communications via one or more other systems.

In some embodiments, the identity linkage system may rely on an exact match of consumer's payment method for one or more of the data elements (for example an exact credit card number match. In other embodiments, the identity linkage system may rely on a fuzzy match and confidence levels for some data elements (for example, home address). For example, the identity linkage system 102 may compare the full 16-digit credit card number and consumer identity attributes including consumer full name, address, and phone number. If there is no match for all of the consumer identity attributes, the identity linkage system 102 may determine that there is no match between the credit card and the consumer identity. On the other hand, if there is match for all of the consumer identity attributes, the identity linkage system 102 may determine that there is a match between the credit card and the consumer identity (that is, the credit card belong to the consumer). In some cases, there may be a no match for one of the attributes (for example, phone number), a partial match for one of the attributes (for example, address), and an exact match for one of the attributes (for example, full name). The identity linkage system 102 may then determine a match code or a score that, for example, indicates a likelihood of match between the credit card and the consumer. In some embodiments, the rules, fuzzy matching, and/or confidence levels may be different for different merchants and/or requests, as described further herein. Some parameters may be adjusted for certain transactions (perhaps transaction involving more expensive services or goods) to request stronger matches and confidence levels generally or for a specific purchase (if the services/goods are above a specific threshold). In some embodiments, the client systems (for example, client systems 106, 108, 110, and 112) may set parameters for the type of linkage, matching, scoring, and so forth that should be used for the analysis. The parameters may also be configured to apply in certain timeframes (for example, from 1-4 am Pacific or 3 weeks prior to December 25$^{th}$).

In some embodiments, merchants may not store all 16 digits of a consumer's credit card number or other received information. As such, the identity linkage system 102 may ingest and utilize partial credit card numbers (for example, first 6 digits or last 4 digits), partial birthdate information, or other truncated or partial data elements, to conduct matching between the credit card numbers and consumer PII.

In some embodiments, the identity linkage system 102 can include preventive mechanisms such as real-time flags on compromised cards and identity elements as well as ongoing monitoring. For example, during account opening or checkout process, online merchants may wish to reduce third party fraud by ensuring information and credit card provided by purchasers are not stolen or compromised. The identity linkage system 102 may initiate a scan of the dark web to search for compromised credit cards, debit cards, email, or other identity information. Additionally or optionally, the identity linkage system 102 may provide insights into how many times or how long ago this information (for example, comprised credit card number) has been seen in the dark web. In some embodiments, the identity linkage system 102 may send data packages to the client systems 106, 108, 110, and 112, may generate alerts or send notifications based on certain triggers, or may generate instructions to block a transaction (for example, if a client has configured the parameters to do so).

In some embodiments, linkages to multiple identity elements can increase the likelihood of successfully matching payment methods to consumer information, resulting in reduced fraud rates and false positives (for example, approving purchases based on fraudulent payment method number). Moreover, the identity linkage system 102 may utilize passive checking identity connections that can enable accurate risk decisions leading to increased transactional approval and consumer retention.

Linkage System

Figure 3B:
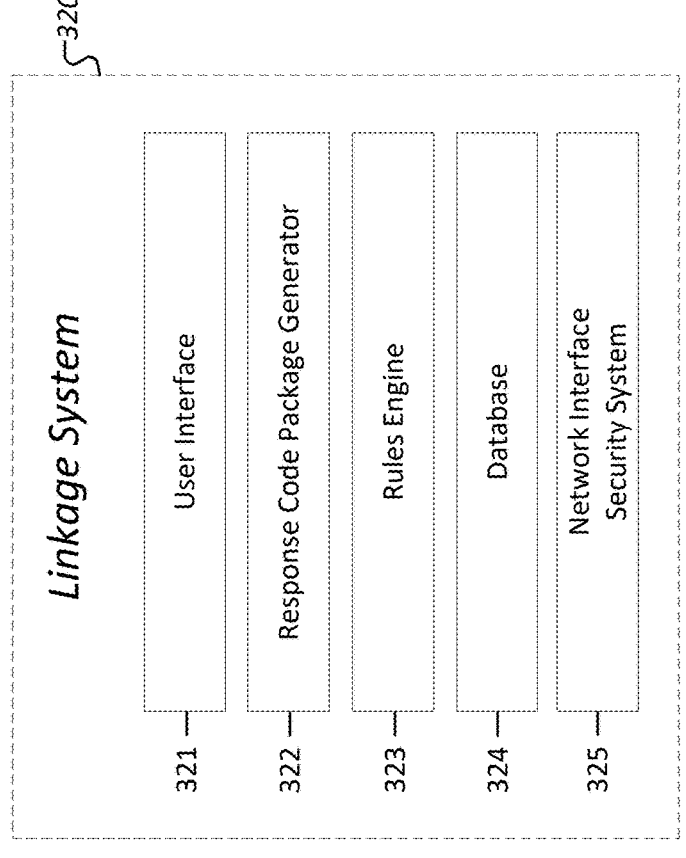
FIG. 3B illustrates an embodiment of a linkage system of an identity linkage system.

FIG. 3B illustrates an embodiment of the linkage system 320 of the identity linkage system 102. In some embodiments, the linkage system 320 may include a user interface 321, a response code package generator 322, a rules engine, 323, a database 324, and a network interface security system 325.

The user interface 321 may be implemented as a system that allows client parameters to be stored, response requests to be submitted, and different match services to be selected from the identity linkage system 102. Embodiments of the user interface 321 will be described further with reference to FIG. 9. The response code package generator 322 may be implemented as a system that enables the linkage system 320 to generate different response code packages as defined herein, where the identity linkage system 102 provides different clients with different response code packages. Embodiments of the response code package generator 322 will be described further with reference to FIGS. 7 and 8.

The rules engine 323 may be implemented as a system that stores and implements production and reaction rule capabilities and may be used in conjunction with other elements of the linkage system 320 and identity linkage system 102. The rules engine 323 may be configured to enable the registration, definition, classification, and management of the rules for the identity linkage system 102. For example, the rules engine 323 may operate in conjunction with other elements of the identity linkage system 102 to define and enable specific response code packages to be generated for different clients, client types, payment methods, and/or the like. In some embodiments, the rules engine 323 may be used to define the level of confidence associated with the different matches and partial matches, such as, at the data element level or at the transaction level. For example, some merchants may have rules requiring stronger matches and confidence levels generally or for a specific purchase. In some embodiments, the rules engine 323 may be configured to select and execute which parameters are evaluated for a specific merchant, merchant type, client, client type, payment method, and/or the like.

The database 324 may comprise one database or multiple databases. For example, there may be a separate database corresponding to each client or data from multiple clients may be stored using virtual partitions or access privileges to prevent the sharing of data among clients. The database 324 may be controlled by a database management system. The database 324 may be configured to store client data associated with the response code package generator 322, rules engine 323, and/or other elements of the identity linkage system 102. The database 324 may store permanently or temporally consumer PII along with payment instrument information provided by the clients to the identity linkage system 102, and the database 324 may also store sets of data from the card network system(s) 114 and sets of data from the issuing banks 116. The data stored can include, but is not limited to, full or partial credit card numbers, debit card numbers, and ACH routing numbers, demand deposit account numbers, registered identification numbers, payment instrument transaction data and expiration dates, consumer: names, billing addresses, shipping addresses, phone numbers, emails, dates of birth, full or partial social security numbers, driver's license numbers, and/or the like. In some embodiments, the data stored can include credit card numbers, debit card numbers, and/or ACH routing numbers that are hashed and encrypted for security and privacy preservation.

The network interface security system 325 may be implemented as a system that protects the network and data of the identity linkage system 102 from being breached or threatened. The network interface security system 325 may comprise a set of rules and configuration that is designed to protect the confidentiality and data of the identity linkage system 102. In some embodiments, the network interface security system 325 may include antivirus and antimalware software, firewall protection, and/or the like. In some embodiments, the network interface security system 325 may use mutual authentication of services using client certificate and/or message level encryption and digital signatures using elliptical curves. In some embodiments, the network interface security system 325 may use a standards-based approach to security using JavaScript object signing and encryption. In some embodiments, the network interface security system 325 may be deployed on premise and/or in the cloud and include multiple availability zones. In some embodiments, the network interface security system 325 may operate 24/7 and include automated deployments. In some embodiments, in the network interface security system 325, payment instrument numbers may be hashed prior to matching and then dropped for security protection.

High Level Workflow

Figure 4:
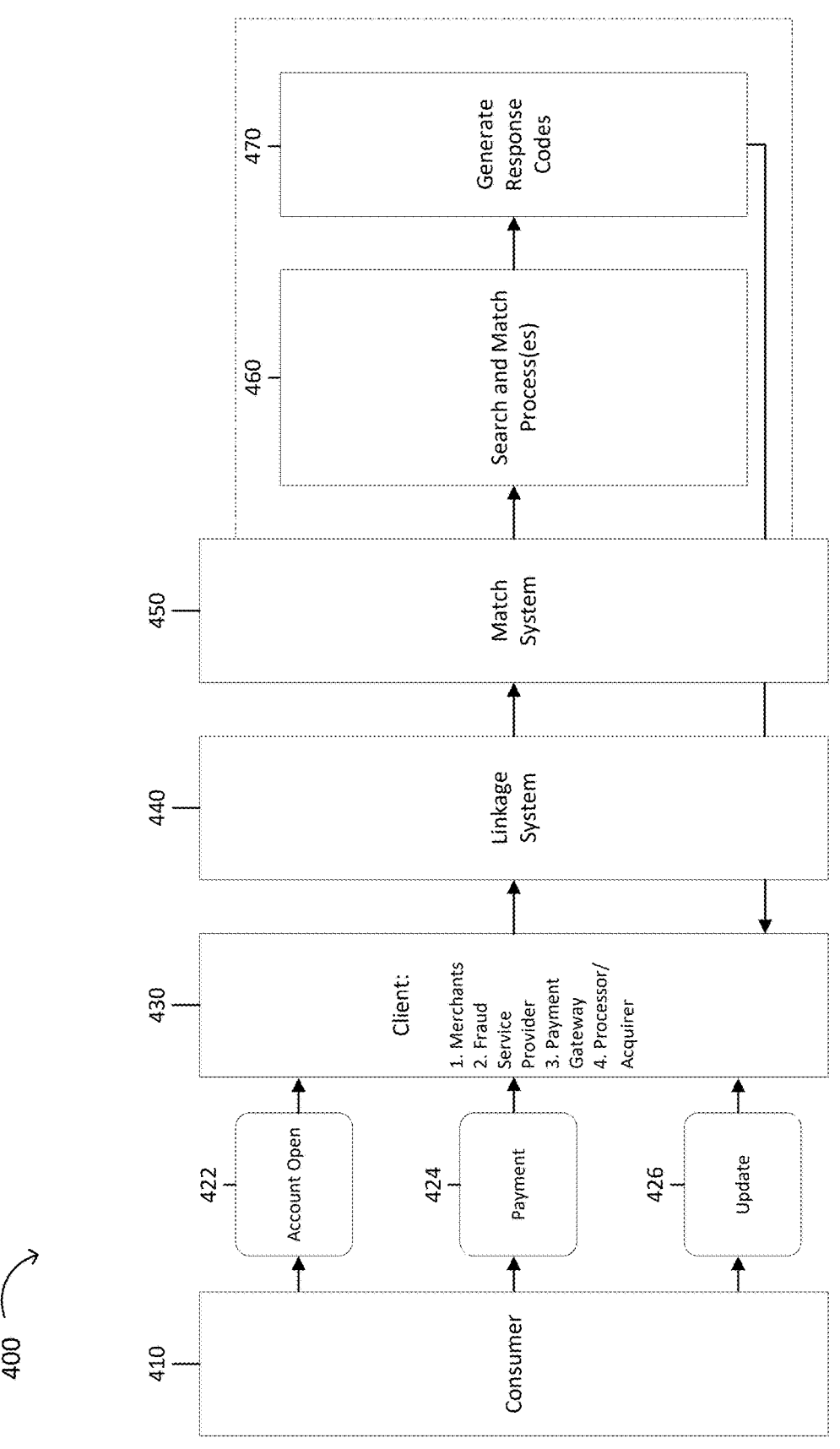
FIG. 4 illustrates an embodiment of a high-level workflow of an identity linkage system.

FIG. 4 illustrates an embodiment of a high-level workflow of the identity linkage system 102. FIG. 4 shows various embodiment in which different client systems may utilize the identity linkage system 102 based on different consumer actions.

As illustrated in FIG. 4, a consumer 410 (such as, via a consumer device 104) can take a number of actions or electronic requests wherein a client 430 may want to conduct fraud checks using the identity linkage system 102 to increase the client's confidence in the consumer action. For example, a consumer 410 may initiate an electronic request to open an account 422 with a client 430, where a client may be for example, merchant system 106, fraud service provider system 108, payment gateway system 110, or processor/acquirer system 112. The account opening process 422 may involve the consumer 410 providing the client 430 with consumer PII and a payment method by sending data to the client's system. Another action may be the submission of an electronic payment 424, such as an online purchase with a merchant system or a payment to a merchant account. As discussed herein, this process also involves a consumer 410 providing the client 430 with consumer PII and a payment method by sending data to the client's system. As another example, a consumer action may be consumer 410 making an update 426 to the consumer's electronic information stored in a client 430's system. For example, a consumer 410 may have an account with client 430 and may send an electronic request to update their consumer PII or payment methods or provide additional payment methods to the client 430's system. With all of these consumer 410 actions, a client 430 may benefit by using identity linkage system 102 to confirm or increase their confidence that the actions taken were not fraudulent.

After a consumer 410 has taken an action with respect to client 430, the client 430 then has received at the client's system at least some consumer PII and a payment or account information. The client 430 may then send this information from the client's system to the identity linkage system 102, such as over network 101. As shown in FIG. 4, the client sends the information to a subsystem linkage system 440 of the identity linkage system 102. Linkage system 440 resolves the account and identity data, where embodiments are discussed with reference to FIG. 7 below. The resolved information is then sent to match system 450. As discussed with reference to embodiments of FIG. 8 below, match system 450 conducts a search and match process(es) 460 and generates response code package at 470. The response code package is then sent back to the linkage system 440 and a match score is generated for the specific action. Based on the match score, a response package is sent to client 430. The processes of generating match scores and response packages are discussed below with reference to FIGS. 7 and 8.

Inquiry Proxy and Relationship Proxy

As described above in FIGS. 2A, 2B, 2C, and 2D, at block B, after the consumer device 104 initiates an online transaction with the merchant system 106, the consumer may provide some consumer PII along with payment instrument information. The payment instrument can be a credit card, a debit card, a link to the consumer's direct deposit accounts, or other options. At this specific block there may be limited options for the merchant to verify that the consumer behind the transaction (for example, the information presented) owns/is authorized to transact with the payment method presented. Because not all transactions involve a credit card, the identity linkage system 102 may be used to verify the linkage between a credit card and an identity, as well as the linkage to other payment instruments including debit cards and direct deposit accounts. Because debit card data is not widely available and direct deposit data is hard to get, an embodiment of the identity linkage system 102 includes alternative ways on assessing risk for these types of transactions by providing "proxy" checks on the identity as it relates to debit cards and direct deposit accounts.

In some embodiments, one or both payment to identity proxies may be used by the identity linkage system 102. The first proxy check illustrated is an inquiry proxy, which is a method for determining payment risk and identity risk in payments by utilizing identity proofing inquiries in account opening as a proxy to determine the risk of a payment transaction by determining the correlation between successful and unsuccessful identity proofing events and payment transactions for a specific consumer identity. Embodiments of an inquiry proxy will be described further with reference to FIG. 5. The second proxy check illustrated is a relationship proxy, which is a method for determining payment risk and identity risk in payments by comparing account relationships known to an entity, such as a credit bureau, to information provided during payment provisioning to determine the risk of a payment transaction by understanding the correlation between successful and unsuccessful identity proofing events and payment transactions for a specific consumer identity. Embodiments of a relationship proxy will be described further with reference to FIG. 6.

Inquiry Proxy

Figure 5:
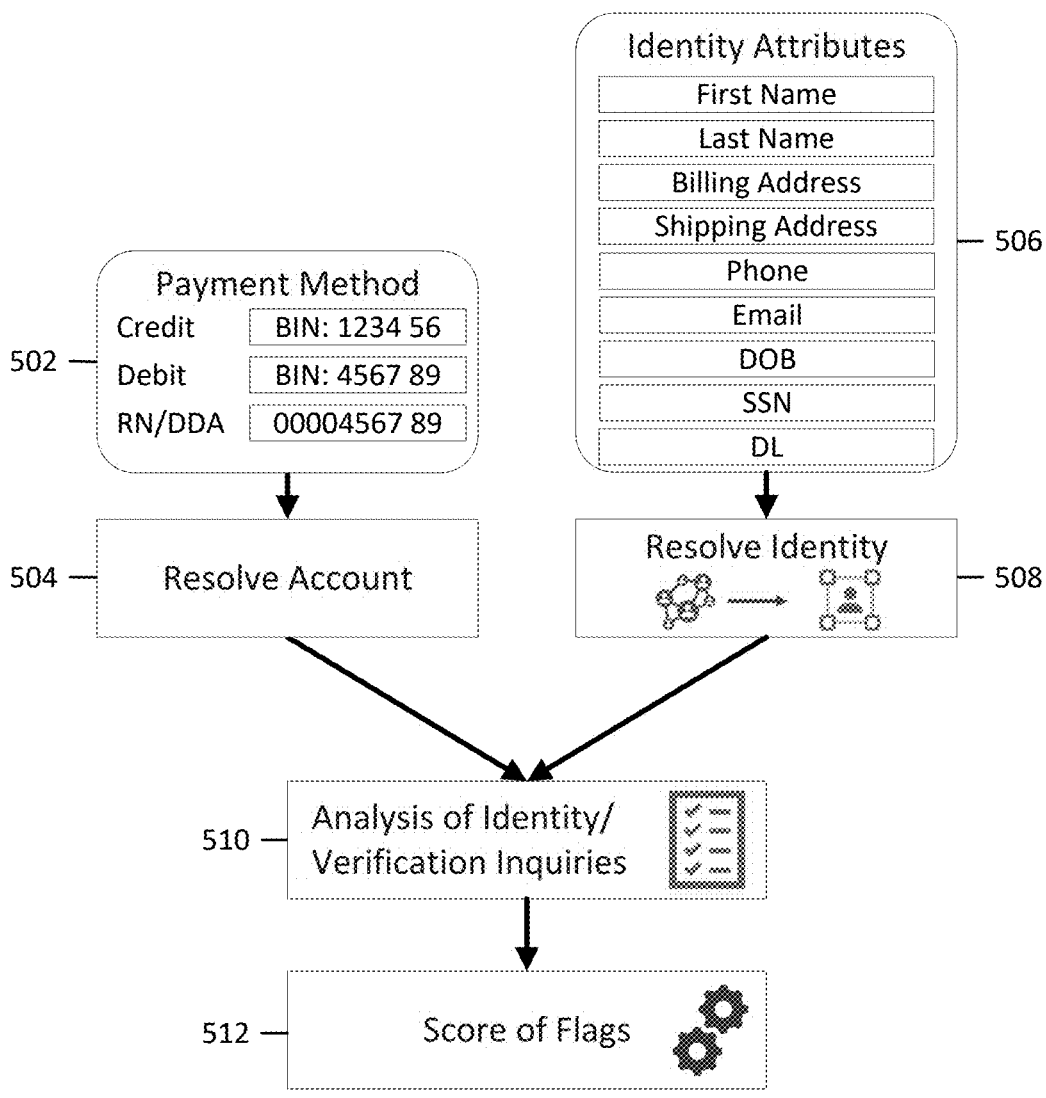
FIG. 5 illustrates an embodiment of an inquiry proxy which may be used by an identity linkage system.

FIG. 5 illustrates an embodiment of the inquiry proxy 500 which may be used by the identity linkage system 102. The inquiry proxy 500 relies on some stored historical knowledge of a consumer's prior financial actions. During the lifetime of a consumer, the consumer may open different bank accounts and credit instruments within the financial services ecosystem in a country, such as, the United States of America (US). As part of that account opening process, a bank or financial institution may perform a Know Your Customer (KYC) procedure and other checks to verify a consumer's identity. Banks and financial institutions may use a variety of products to facilitate the account opening process, and the usage of these products for identity verification leaves behind inquiry traces indicating the attempt (successful or not) by a consumer to open an account at one of these institutions. The identity linkage system 102 can access historical records of these inquiries or attempts as a proxy relationship between the bank and the consumer and extract insights on this that can be useful for de-risking online transactions.

With continued reference to FIG. 5, after the consumer device 104 initiates an online transaction with a merchant system 106, the consumer provides some identity attributes at 506 and payment information at 502. The identity attributes 506 may include consumer PII and may include some or all of: a consumer first name, last name, billing address, shipping address, phone number, email address, date of birth, social security number, and/or driver's license number. The payment information 502 may include some or all of a credit card number, debit card number, registered identification number, demand deposit account number, or other payment method information. For example, a first consumer may be online shopping and visit first merchant's website www.firstmerchant.com to purchase a first product. The first consumer wants to pay via debit card and inputs a card with the number 4247-20XX-XX11-1111 along with some of the consumer's PII. As shown in the embodiment of FIG. 2A, all or some of this information as well as additional information may be sent to the identity linkage system 102 by a merchant system 106. For example, the first merchant system 106 gathers the first consumer's information along with payment details and calls the identity linkage system 102, such as, via REST API, to verify if there is a linkage between the first consumer's payment method and the first consumer. In some embodiments, the online transaction may be initiated via an API request from an online payment provisioning touchpoint with the consumer's device.

Next at 504, the identity linkage system 102 resolves the account, which may include identifying the payment method issuer, bank, entity, country, type of instrument and/or the like. For example, the first six digits of the first consumer's card number (BIN number) can be used to identify the issuing bank, the type of card, the network scheme, and the issuing country (among other data points). For the first consumer, the identity linkage system 102 could determine from the BIN number (424720) that the card presented is a Visa traditional (not prepaid) debit card, issued by Wells Fargo Bank, in the US. Separate from 504, at 508, the identity linkage system 102 resolves the consumer identity using the provided consumer PII. For example, the first consumer may have opened an account with Wells Fargo Bank, five years ago. An identification product was used and indicates that a successful ID check was performed for first consumer after the KYC process executed. Using the identity data presented by the first consumer at the time the consumer provisioned the debit card (usually including, for example, a name and billing address), the identity linkage system 102 can resolve the first consumer's identity on the consumers on file with an entity storing the identity information, such as, for example, a credit bureau. It is recognized that 504 and 508 may be executed in parallel such that some or all of the processing time overlaps.

Next, at 510, the identity linkage system 102 performs an analysis of identity and/or verification inquiries. The analysis may include comparing the resolved account with other account inquiries related to a consumer through previous identity proofing inquiries. For example, the identity linkage system 102 may determine whether the consumer has applied for an account (for example, credit card accounts, debit card accounts, direct deposits accounts, and/or the like) in the past with the issuer/bank from the resolved account at 504. For example, after the first consumer has been identified, the identity linkage system 102 proceeds to take the card data-specifically the issuer name and match it against information on file to identify if this identity performed inquiries with this bank in the past.

Next, at 512, the identity linkage system 102 determines a score of flags, such as a measure of how confident the system is that the consumer and payment method are related, how risky the transaction is, and/or the like. Based on the score of flags, a response will be generated. For example, there may be an API response that sends a confidence score or code that indicates how close the relationship is between the consumer in question and the payment method used. For example, the identity linkage system 102 may provide a response package to the first merchant's system with a confirmation that the first consumer has a relationship with Wells Fargo which can be used as a proxy to indicate that the debit card could be tied to the first consumer and increase trust on this transaction. Additionally, the identity linkage system 102 may perform checks against the identity velocity and consistency and determine whether the first consumer's identity has been compromised.

Relationship Proxy

Figure 6:
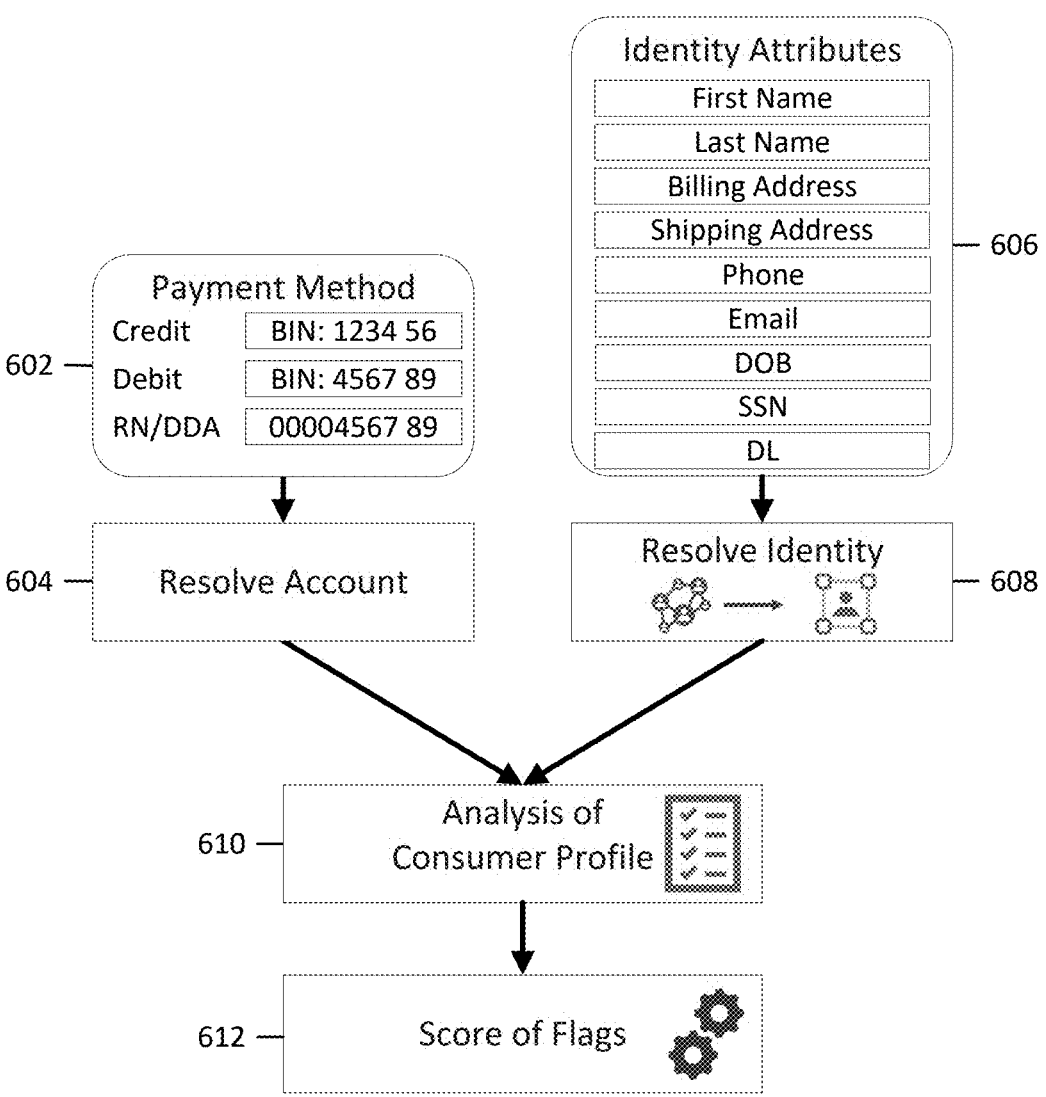
FIG. 6 illustrates an embodiment of a relationship proxy which may be used by an identity linkage system.

FIG. 6 illustrates an embodiment of the relationship proxy 600 which may be used by the identity linkage system 102. The relationship proxy 600 relies on some stored historical knowledge of a consumer's prior financial actions. During the lifetime of a consumer, the consumer may open different bank accounts and credit instruments within the financial services ecosystem in a country, such as the US. Credit related transactions are reported to entities, such as, credit reporting agencies and used to provide consumers and creditors with information on credit scores and credit worthiness. The identity linkage system 102 can view this information as a proxy relationship between the bank and the consumer and extract insights on this that can be useful for de-risking online payment transactions.

With continued reference to FIG. 6, after the consumer device 104 initiates an online transaction with a merchant system 106, the consumer provides some identity attributes at 606 and payment information at 602. The identity attributes 606 may be consumer PII and may include some or all of: a consumer first name, last name, billing address, shipping address, phone number, email address, date of birth, social security number, and/or driver's license number. The payment information 602 may include some or all of a credit card number, debit card number, registered identification number, demand deposit account number, or other payment method information. For example, a second consumer may be online shopping and visit second merchant's website www.secondmerchant.com to purchase a second product. The second consumer chooses to pay via direct deposit and enters his routing number (RTN or ABA) and direct deposit account (DDA) numbers RTN #322271627 and DDA #345XXXXXX along with some of the consumer's PII. The routing number is a nine-digit code that identifies banks in the U.S. As shown in FIG. 2A all or some of this information as well as additional information may be sent to the identity linkage system 102 by a merchant system 106. For example, the second merchant system 106 gathers the second consumer's information alongside payment details and calls the identity linkage system 102, such as, via REST API, to verify if there is a linkage between the second consumer's payment method and the second consumer. In some embodiments, the online transaction may be initiated via an API request from an online payment provisioning touchpoint with the consumer's device.

Next at 604, the identity linkage system 102 resolves the account, which may include identifying the payment method issuer, bank, entity, country, type of instrument and/or the like. For example, the second consumer's RTN number can be used to identify which bank the account is related to, among other data points. For the second consumer, the identity linkage system 102 could determine from the RTN number (322271627) that the account presented is a JPMorgan Chase account.

Separate from 604, at 608, the identity linkage system 102 resolves the consumer identity using the provided consumer PII. For example, the second consumer may have applied for a credit card with Chase Bank, one year ago. This credit relationship was reported to an entity, such as a credit bureau, and appears on the second consumer's credit report. Using the identity data presented by the second consumer at the time the consumer provisioned the account number (usually including, for example, beneficiary name and address), the identity linkage system 102 can resolve the second consumer's identity on the consumers on file with an entity storing the identity information, such as, for example, a credit bureau. It is recognized that 604 and 608 may be executed in parallel such that some or all of the processing time overlaps.

Next, at 610, the identity linkage system 102 performs an analysis of the consumer's profile. The analysis may include comparing the resolved account with other accounts on the consumer's file and determining if the relationship exists, the potential standing, and the longevity of the relationship. For example, the identity linkage system 102 may determine whether the consumer (for example, the resolved identity) has a relationship with the issuer or bank in questions from the debit, credit, bank, or entity determined from the resolved account at 604. For example, after the second consumer has been identified, the identity linkage system 102 proceeds to take RTN data-specifically the bank name and match it against information on file to identify if this identity has a relationship with the bank on the account.

Next, at 612, the identity linkage system 102 determines a score of flags, such as a measure of how confident the system is that the consumer and payment method are related, how risky the transaction is, and/or the like. Based on the score of flags, a response will be generated. For example, there may be an API response that sends a confidence score or code that indicates how close the relationship is between the consumer in question and the payment method used. For example, the identity linkage system 102 may provide a response package to the second merchant's system with a confirmation that the second consumer has a relationship with JPMorgan Chase which can be used by the second merchant as a proxy to indicate that the RTN/DDA could be tied to the second consumer and increase trust on this transaction. Additionally, the identity linkage system 102 may perform checks against the identity velocity and consistency and determine whether the second consumer's identity has been compromised.

Score Generation Process

FIG. 7 illustrates an embodiment of a process 700 for generating a match score for an online transaction.

At block 702, the identity linkage system 102 can receive transaction data associated with an online transaction. The transaction data may be provided by a client system such as, for example, a merchant conducting business in online commerce, such as, via an API call or other electronic communication channel. The transaction data can include, but is not limited to, consumer PII and payment instrument information. The transaction data may also include merchant data or identifiers.

At block 704, the linkage system 320 can use the transaction data to resolve the account data, such as in block 504 in FIG. 5 and block 604 in FIG. 6, and the linkage system 320 can resolve the identity data, such as block 508 in FIG. 5 and block 608 in FIG. 6.

At block 706, the linkage system 320 can determine the payment type from the transaction data. For example, the linkage system 320 may determine that the online transaction was initiated with a credit card.

At block 708, simultaneously in whole or in part with block 706, the linkage system 320 can determine the client and/or client type. For example, the linkage system 320 may determine that a specific client (such as first merchant) is providing the transaction data. Additionally, the linkage system 320 may determine the client type (such as determining that first merchant is a merchant system 106).

At block 710, simultaneously in whole or in part with blocks 708 and 706, the linkage system 320 can determine the transaction type. For example, whether the online transaction was a credit transaction.

At block 712, the linkage system 320 calls match service(s), such as match system 330, with the resolved parameter(s). The call may be an API call or other electronic communication channel. Embodiments of the match service(s) process will be described further with reference to FIG. 8.

At block 714, the linkage system 320 receives response code package(s) from match service(s).

At block 716, the linkage system 320 generates a match score for the online transaction based on a review of the received response package from match service(s), as discussed in FIG. 8. In some embodiments, the match score can be an alphanumerical value or graphical indicator. For example, the match score can be between 0 and 999 or between A and Z, where higher score indicates lower likelihood of fraud, and lower score indicates higher likelihood of fraud. As another example, the match score may be coded as a red, yellow, or green icon or graphic. However, it is recognized that the scoring can be made using a variety of indicators.

At block 718, the linkage system 320 generates a response package that includes an encrypted data package storing a score or indicator of score for secured transmission to the client system. In some embodiments, the linkage system 320 may also include a recommended action, or some execute other instructions such as, for example, to block transmission, report a fraudulent event, contact authorities, and so forth. The communication may be over an API, via system alert, a text message, and/or the like.

Response Code Package Generation Process

FIG. 8 illustrates an embodiment of a process 800 for generating a response code package for the online transaction.

At block 802, the match service(s) system, such as match system 330 can receive transaction data (resolved account and identity data) associated with an online transaction from the linkage system 320, as discussed with reference to block 712 of FIG. 7, such as, via an API call or other electronic communication channel.

At block 804, match system 330 can determine a match score for each of profile based on a review of the received data and data stored in an associated identity or consumer database, such as database 342 in linkage system 320. In some embodiments, the match score is determined based at least in part on the comparison between corresponding attributes or data elements of the initial list of profiles and the consumer identity information. Such corresponding attributes can include, but are not limited to, consumer PII, such as name, address, phone number, and/or the like. For example, match system 330 may review the transaction data along with data stored in an identity database (such as database 342 in linkage system 320) to generate a match score for the online transaction. In some embodiments the identity database may be a credit bureau database, a marketing database, a database comprised of data received from issuing banks, a database comprised of data received from card networks, a database comprised of data received from merchants, other data sets, and/or a combination of data sets.

In some embodiments, the match score can be generated based at least in part on comparisons between the profiles generated or stored by the identity linkage system 102 (that associate payment instrument information and consumer identity information) and attributes of the transaction data. For example, match system 330 can compare attributes (such as name, address, and phone number) of the transaction data to that of the profiles generated or stored by the identity linkage system 102. In some embodiments, the match score can be a numerical value. For example, the match score can be between 0 and 999 or between A and Z, where higher score indicates lower likelihood of fraud, and lower score indicates higher likelihood of fraud. As another example, the match score may be coded as a red, yellow, or green icon or graphic. However, it is recognized that the scoring can be made using a variety of indicators.

At block 806, match system, 330 can, based at least in part on the match scores, identify a profile with the best match score(s). The best match score(s) may be the highest match score(s) among the match scores for the initial list of profiles.

At block 808, the match system 330 can compare attributes of the profile with the best match score(s) with that of the transaction data.

At block 810, match system 330 can, based at least in part on the comparison between the attributes of the profile with the best match score(s) with that of the transaction data, generate a response code package(s) for the online transaction. In some embodiments, the response code package(s) can include an encrypted data package storing an indication of a likelihood of fraud for the online transaction. Additionally or optionally, the response code package(s) can include a recommended action (for example, deny transaction, request additional authenticating information, allow transaction, and the like) to the merchant.

At block 812, match system 330 can transmit the response code package(s) to the linkage system 320, such as, via an API call or other electronic communication channel.

Additional Identity Linkage Features

In some embodiments, the identity linkage system 102 can provide flags for compromised payment instruments and/or consumer identity information. For example, a merchant may receive payment instrument information (for example, credit card number and expiration date) and consumer PII (for example, consumer name, billing address, and shipping address). The identity linkage system 102 may receive the payment instrument information and the consumer identity information from the merchant and compare them with information that can be found in the dark web. For example, the identity linkage system 102 may scan the dark web to see if the payment instrument information received from the merchant (for example, credit card number and expiration date) can be found in the dark web. If so, the identity linkage system 102 may generate and send an alert or an electronic notification to the merchant's system or other client system indicating that the payment instrument information have been found on the dark web. In some examples, the alert may include a fraud score indicating the degree of likelihood that an online purchase associated with the payment instrument information is fraudulent. In other examples, the alert may include a recommended action or instruction (for example, to deny the online transaction) for the merchant or client.

In some embodiments, the identity linkage system 102 can reduce friendly fraud. For example, the identity linkage system 102 can determine, for example, if a shipping address of a potentially fraudulent transaction is related to someone in the household or someone a consumer knows. For example, if Person A uses a credit card information of Person B to purchase a good and have the good delivered to Person A's address, the identity linkage system 102 may recommend a merchant or client to approve (or not deny) Person A's purchase if (1) Person A and Person B are members of the same household, or (2) Person A is someone who Person B knows. In some embodiments, the identity linkage system 102 may use a persistent or consistent identifier that may be assigned to a household. In other embodiments, the identity linkage system 102 may use social web data collection or obtain data via APIs to determine whether a given person is related to (or an acquaintance of) another person. Alternatively or optionally, the identity linkage system 102 may use other third party sources to determine relationship of between a shipping address of an online purchase to a purported buyer (for example, a person whose payment instrument is being used to make an online purchase).

In some embodiments, historical data on verified (or fraudulent) linkages between payment instruments and consumer identity information for multiple merchants or service providers may consolidated to generate a consortium of identity inquiries. The identity linkage system 102 may use the consortium of identity inquiries to determine, for example, whether a certain combination of payment instrument information and consumer identity information have been seen before in potentially fraudulent (or verifiable) transactions. Additionally or optionally, the identity linkage system 102 may use historical data to determine a consortium score for an identity inquiry. For example, the consortium score for a given identity inquiry may be calculated based at least in part on historical transaction data associated with, for example, a combination of a certain payment instrument information (for example, credit card number) and consumer identity information (for example, a full name of a consumer) from more than one source. By comparing transaction data of a given identity inquiry to historical transaction data with similar or same payment instrument information and consumer identity information, the identity linkage system 102 may determine whether the given identity inquiry is normal or abnormal.

In some embodiments, the identity linkage system 102 may utilize real-time APIs and batch processes to target a wide range of uses including, but not limited to, protecting user account opening, account management functions (for example, identify and prevent account take over), order checkout (for example, assist good customers quickly sign-up and checkout by increasing trust while spotting potential fraud), disbursements and deposits (for example, verifying credit card account ownership or authorization before accepting or releasing funds) and other trust driven interactions in a business's payments flow such as consumer disbursements.

In some embodiments, the identity linkage system 102 may generate linkages between a given payment instrument and multiple identity elements. Such linkages may increase may allow users (for example, merchants) to have higher confidence is identity and payment instrument verification, which can result in reduced fraud rates and false positives.

Additionally, passive verification of identity to payment instrument linkage may enable accurate risk decisions that can lead to increased transaction approvals and customer retention for merchants and service providers.

Client User Interface

Figure 9:
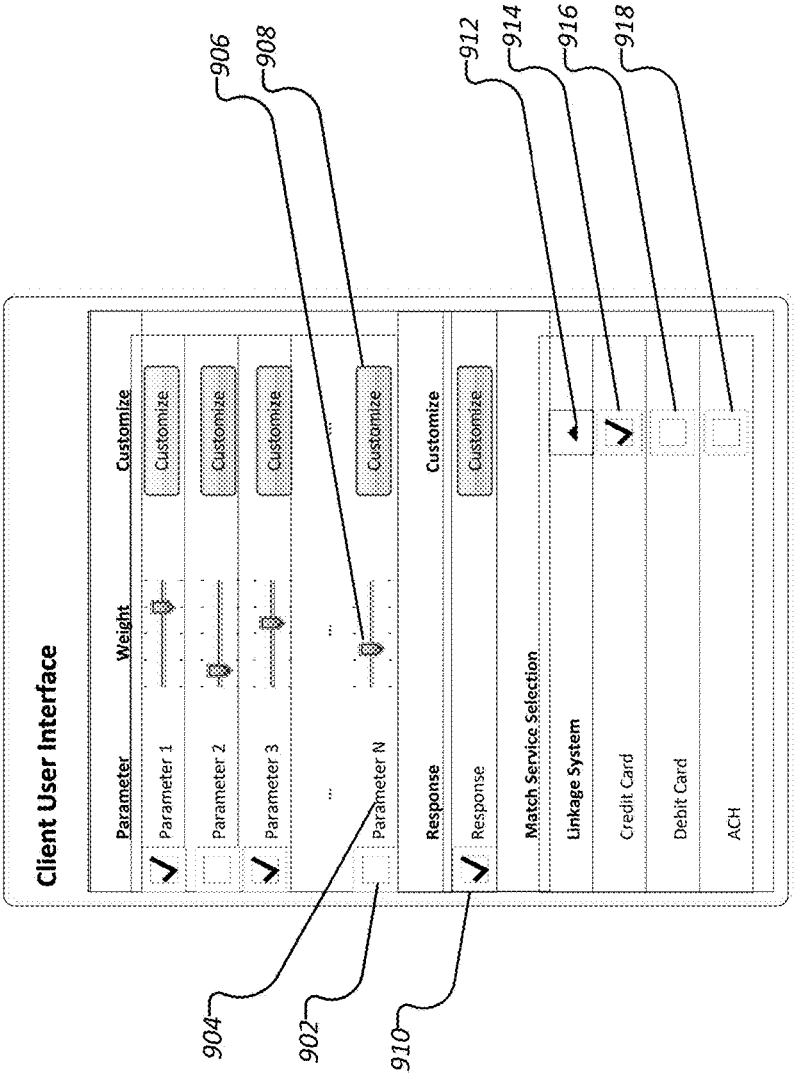
FIG. 9 illustrates an embodiment of a client user interface for providing user interface elements to allow a client user to submit configuration parameters or criteria for an identity linkage system.

FIG. 9 illustrates an embodiment of a client user interface 900 for providing user interface elements to allow a client user to submit configuration parameters or criteria for the identity linkage system 102. Clients may include any clients identified herein, such as merchant system 106, fraud service provider system 108, payment gateway system 110, and/or process/acquirer system 112. In the example interface depicted, client users may, using the checkboxes 902, enable or disable one or more parameters or criteria 904. In some embodiments, clients may wish to adjust the relative importance of one or more parameters or criteria by adjusting one or more weights 906. In some embodiments, clients may wish to perform additional parameter customizations which may, for example, be accomplished by clicking the buttons 908 or other user interface elements which may cause the system to show additional configuration options to the user. In some embodiments, parameters may be, for example, specific parameters of interest such as which consumer PII the identity linkage system 102 can use to evaluate the transaction. For example, clients may wish to prioritize some elements of consumer PII while deprioritizing other elements of consumer PII. Client users may also wish to not include specific consumer PII in the data that is sent to the identity linkage system 102. In some embodiments, the client user may designate that the configuration parameters or criteria may apply to all of the consumers associated with the client system, whereas in other embodiments, the client user may designate different configuration parameters or criteria for different consumers, for different products, for different time periods, for different methods by which a consumer device 104 accesses the merchant system 106 (such as via app or website), for different procedure criteria, and/or the like.

In some embodiments, the client user interface 900 may also include a response checkbox 910 or other user interface element which can enable a client user to select whether they receive a response package from the identity linkage system 102 as well as how the response package will be configured. In some embodiments, client users may wish to perform response customization, which may, for example, be accomplished by clicking the button 908 or other user interface element which may cause the system to show additional response configuration options to the client user. For example, the client user may be able to select whether they receive an identity score, a simple response indicator, such as a yes/no, red/green and/or the like indicator, a more expansive report, and so forth.

In some embodiments, the client user may be able to choose which linkage system to use by clicking the drop-down menu 912 or other user interface element. For example, the client user may choose a credit card linkage system for a credit card payment by clicking checkbox 914, a debit card linkage system for a debit card payment by clicking checkbox 916, an ACH linkage system for an ACH payment by clicking checkbox 918, and/or the like. In some embodiments, the linkage system will be automatically selected based on the data send to the identity linkage system.

The identity linkage system 102 may store the parameters in a data store of the identity linkage system 102, such as the database 324. It is recognized that different clients may have different parameters. In addition, as noted above, a single client user may have different parameters for different consumers, for different products, for different methods by which a consumer device 104 accesses the merchant system 106 (such as via app or website), for different procedure criteria, and/or the like. It is also recognized that a variety of data input mechanisms may be used including graphical user interface elements as well as voice command features.

Computer Systems

Figure 10:
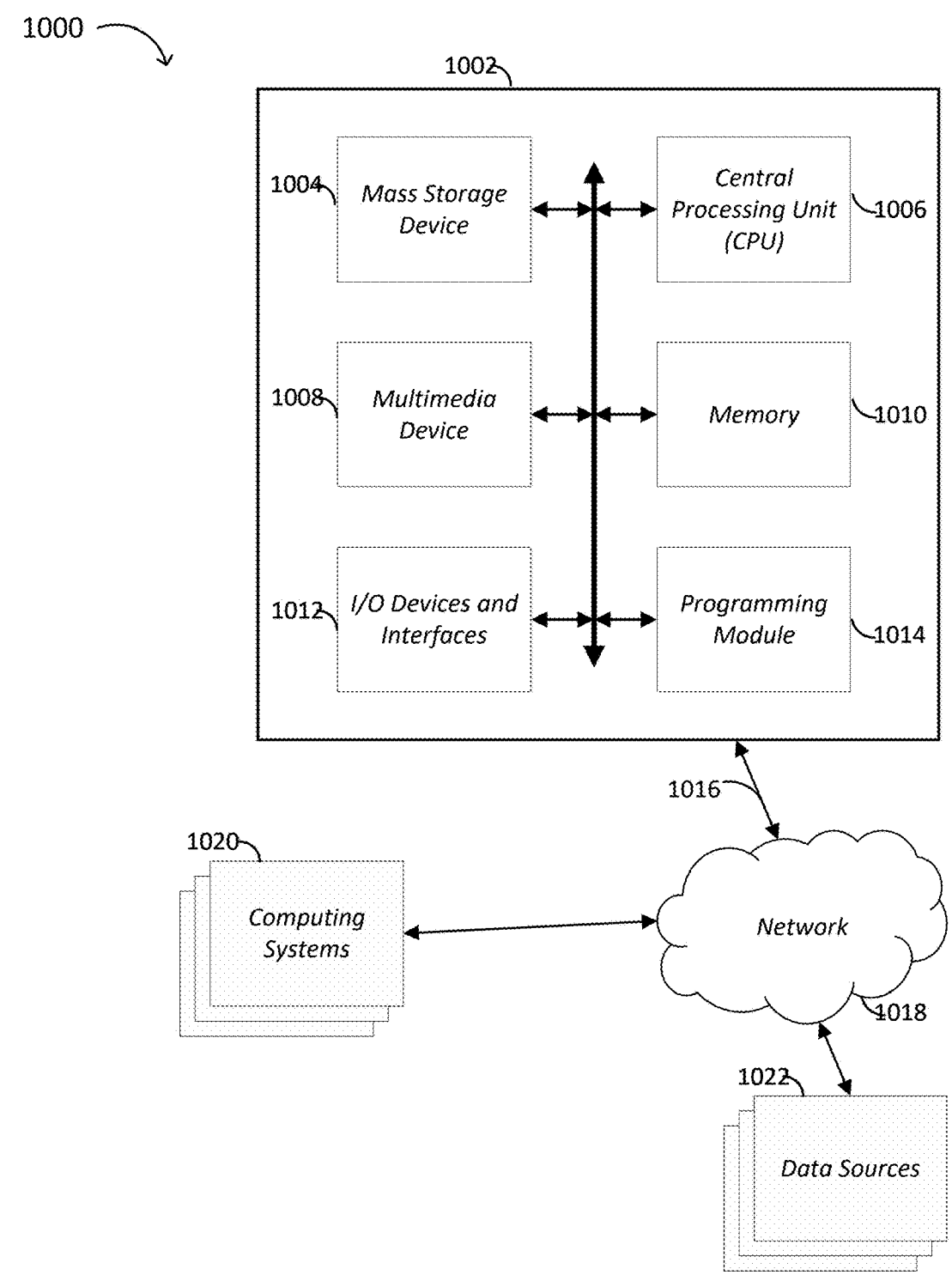
FIG. 10 is a block diagram depicting an embodiment of a computer hardware system configured to run software for implementing one or more embodiments disclosed herein.

FIG. 10 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 10. The example computer system 1002 is in communication with one or more computing systems 1020 and/or one or more data sources 1022 via one or more networks 1018. While FIG. 10 illustrates an embodiment of a computing system 1002, it is recognized that the functionality provided for in the components and modules of computer system 1002 may be combined into fewer components and modules, or further separated into additional components and modules.

The computer system 1002 can comprise a programming module 1014 that carries out the functions, methods, acts, and/or processes described herein. The programming module 1014 is executed on the computer system 1002 by a central processing unit 1006 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 1002 includes one or more processing units (CPU) 1006, which may comprise a microprocessor. The computer system 1002 further includes a physical memory 1010, such as random-access memory (RAM) for temporary storage of information, a read only memory (ROM) for permanent storage of information, and a mass storage device 1004, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 1002 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1002 includes one or more input/output (I/O) devices and interfaces 1012, such as a keyboard, mouse, touch pad, and printer. The I/O devices and interfaces 1012 can include one or more display devices, such as a monitor, that allows the visual presentation of data to a user. More particularly, a display device provides for the presentation of GUIs as application software data, and multi-media presentations, for example. The I/O devices and interfaces 1012 can also provide a communications interface to various external devices. The computer system 1002 may comprise one or more multi-media devices 1008, such as speakers, video cards, graphics accelerators, and microphones, for example.

The computer system 1002 may run on a variety of computing devices, such as a server, a Windows server, a Structure Query Language server, a Unix Server, a personal computer, a laptop computer, a smart phone, a personal digital assistant, a tablet, and so forth. Servers may include a variety of servers such as database servers (for example, Oracle, DB2, Informix, Microsoft SQL Server, MySQL, or Ingres), application servers, data loader servers, or web servers. In addition, the servers may run a variety of software for data visualization, distributed file systems, distributed processing, web portals, enterprise workflow, form management, and so forth. In other embodiments, the computer system 1002 may run on a cluster computer system, a mainframe computer system and/or other computing system suitable for controlling and/or communicating with large databases, performing high volume transaction processing, and generating reports from large databases. The computing system 1002 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 1002 illustrated in FIG. 10 is coupled to a network 1018, such as a LAN, WAN, or the Internet via a communication link 1016 (wired, wireless, or a combination thereof). Network 1018 communicates with various computing devices and/or other electronic devices. Network 1018 is communicating with one or more computing systems 1020 and one or more data sources 1022. The programming module 1014 may access or may be accessed by computing systems 1020 and/or data sources 1022 through a web-enabled user access point. Connections may be a direct physical connection, a virtual connection, and other connection type. The web-enabled user access point may comprise a browser module that uses text, graphics, audio, video, and other media to present data and to allow interaction with data via the network 1018.

Access to the programming module 1014 of the computer system 1002 by computing systems 1020 and/or by data sources 1022 may be through a web-enabled user access point such as the computing systems' 1020 or data source's 1022 personal computer, cellular phone, smartphone, laptop, tablet computer, e-reader device, audio player, or another device capable of connecting to the network 1018. Such a device may have a browser module that is implemented as a module that uses text, graphics, audio, video, and other media to present data and to allow interaction with data via the network 1018.

The output module may be implemented as a combination of an all-points addressable display such as a cathode ray tube (CRT), a liquid crystal display (LCD), a plasma display, or other types and/or combinations of displays. The output module may be implemented to communicate with input devices 1012 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 1002 may comprise a physical or logical connection established between a remote microprocessor and a mainframe host computer for the express purpose of uploading, downloading, or viewing interactive data and databases on-line in real time. The remote microprocessor may be operated by an entity operating the computer system 1002, including the client server systems or the main server system, an/or may be operated by one or more of the data sources 1022 and/or one or more of the computing systems 1020. In some embodiments, terminal emulation software may be used on the microprocessor for participating in the micro-mainframe link.

In some embodiments, computing systems 1020 who are internal to an entity operating the computer system 1002 may access the programming module 1014 internally as an application or process run by the CPU 1006.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 1002 may include one or more internal and/or external data sources (for example, data sources 1022). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Caché), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MogoDB Atlas, Amazon Aurora, Amazon DynamoDB, Amazon Redshift, Amazon ElastiCache, Amazon MemoryDB for Redis, Amazon DocumentDB, Amazon Keyspaces, Amazon EKS, Amazon Neptune, Amazon Timestream, or Amazon QLDB), a non-relational database, or a record-based database.

The computer system 1002 may also access one or more databases 1022. The databases 1022 may be stored in a database or data repository. The computer system 1002 may access the one or more databases 1022 through a network 1018 or may directly access the database or data repository through I/O devices and interfaces 1012. The data repository storing the one or more databases 1022 may reside within the computer system 1002.

Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein, the terms "determine" or "determining" encompass a wide variety of actions. For example, "determining" may include calculating, computing, processing, deriving, generating, obtaining, looking up (for example, looking up in a table, a database, or another data structure), ascertaining and the like via a hardware element without user intervention. Also, "determining" may include receiving (for example, receiving information), accessing (for example, accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (for example, transmitting or receiving) information. A message may include a machine-readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine-readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. After obtained, the generating may include combining the input information. The combination may be performed through specific circuitry configured to provide an output indicating the result of the generating. The combination may be dynamically performed such as through dynamic selection of execution paths based on, for example, the input information, device operational characteristics (for example, hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electro-mechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A system for online transaction fraud detection, the system comprising:
   one or more processors;
   a network communications interface;
   a memory; and
   computer code stored in the memory, wherein the computer code, when retrieved from the memory and executed by the one or more processors causes the one or more processors to:
      receive, from a client system, via a graphical user interface (GUI), a set of client-specific parameters for use in detecting online fraudulent transactions, wherein the GUI comprises a plurality of sets of input elements to enable a client to make selections about one or more client-specific parameters, wherein the one or more client-specific parameters include at least one of: a date, a range of dates, a time of day, a type of transaction, a monetary value of a transaction, and a type of personal identifiable information, and wherein the set of client-specific parameters are associated with a first client identifier;
   receive, from the client system, a first request to determine a likelihood of fraud for an online transaction associated with a first user account;
   route the first request to a first identity linkage server of a plurality of linkage servers, wherein the first identity linkage server is determined based on a first client type associated with the client system, and wherein the first identity linkage server is configured to resolve an account and an identity by:
      accessing, via a first application programming interface of the client system, a first set of payment instrument data associated with the online transaction in an active session and the account;
      accessing, via the first application programming interface of the client system, a first set of identity attribute data associated with the online transaction in the active session and an identity, wherein the first set of identity attribute data is generated at a consumer device;
      based on the first set of payment instrument data, determining a client identifier associated with the online transaction in progress;
      in response to a determination that the first client identifier is associated with the online transaction, applying the set of client-specific parameters associated with the first client identifier while the online transaction is active;
      automatically resolving the account using the set of client-specific parameters and the first set of payment instrument data to generate a resolved account that indicates that the first set of payment instrument data is identified;
      automatically resolving the identity using the set of client-specific parameters and the first set of identity attribute data to generate a resolved identity that indicates that the first set of identity attribute data is identified;
   route the first resolved account and the resolved identity to a match system, wherein the match system is configured to generate a response code score indicating a likelihood of fraud by:
      accessing, from a datastore, historical account data corresponding to the first user account and historical identity data corresponding to the first user account;
      comparing the resolved identity against the historical account data to identify a first set of matches between the resolved account and the resolved identity, wherein the historical account data comprises one or more account inquiries;
      comparing the resolved account against the historical identity data to identify a second set of matches between the resolved account and the resolved identity, wherein the historical identity data comprises existing account data;
      based on the first set of matches and the second set of matches, determining, by applying a rules engine configured with preconfigured rules, a response code score, wherein the preconfigured rules comprise fuzzy match parameters, confidence thresholds, or transaction-type criteria that dynamically adjust confidence levels for different types of transactions, wherein the response code score is based on one or more of the set of client-specific parameters, and wherein the response code score is further based on household data corresponding to the client identifier, wherein the household data comprises an indication of members likely to be associated with a household for the client identifier; and route the response code score to the first identity linkage server, wherein the first identity linkage server is further configured to:

generate a recommended action based on the response code score, wherein the recommended action includes one or more of:

denying or blocking the online transaction;

requesting additional authenticating information with respect to the first user account;

approve the online transaction;

transmit a fraud event alert comprising a summary or indication of a detected fraudulent event to the client system; or contact one or more enforcement authorities regarding the detected fraudulent event;

generate an encrypted and digitally signed data package comprising the response code score and executable instructions that are configured, when executed, to:

display, via the GUI, an alert comprising the response code score; and automatically implement the recommended action without requiring additional user input;

deploy the encrypted data package for automated delivery to a second application programming interface of the client system while the online transaction is still in the active session; and cause execution of the executable instructions to implement the recommended action, thereby reducing transaction processing delays and enabling real-time prevention of fraudulent activity.

2. The system of claim 1, further comprising computer code stored in the memory, wherein the computer code, when retrieved from the memory and executed by the one or more processors causes the one or more processors to store computer-executable instructions that:

access a third set of transaction data associated with the online transaction in progress delivered via the first application programming interface; and parse the third set of transaction data to determine if the online transaction is one or more of: an account opening, a payment, an account update.

3. The system of claim 1, wherein the first set of payment instrument data includes one more of: credit card number data, debit card number data, direct deposit account data, or routing number data.

4. The system of claim 1, wherein the first set of identity attribute data includes one more of: name data, address data, phone data, electronic mail address data, date of birth data, social security number data, or driver's license data.

5. A computer-implemented method of online transaction fraud detection, the computer-implemented method comprising, as implemented by one or more computing devices configured with specific executable instructions to at least:

receive, from a client system, via a graphical user interface (GUI), a set of client-specific parameters for use in detecting online fraudulent transactions, wherein the GUI comprises a plurality of sets of input elements to enable a client to make selections about one or more client-specific parameters, wherein the one or more client-specific parameters include at least one of: a date, a range of dates, a time of day, a type of transaction, a monetary value of a transaction, and a type of personal identifiable information, and wherein the set of client-specific parameters are associated with a first client identifier;

receive, from the client system, a first request to determine a likelihood of fraud for an online transaction associated with a first user account;

route the first request to a first identity linkage server of a plurality of linkage servers, wherein the first identity linkage server is determined based on a first client type associated with the client system, and wherein the first identity linkage server is configured to resolve an account and an identity by:

accessing, via a first application programming interface of the client system, a first set of payment instrument data associated with the online transaction in an active session and the account;

accessing, via the first application programming interface of the client system, a first set of identity attribute data associated with the online transaction in the active session and an identity, wherein the first set of identity attribute data is generated at a consumer device;

based on the first set of payment instrument data, determining a client identifier associated with the online transaction in progress;

in response to a determination that the first client identifier is associated with the online transaction, applying the set of client-specific parameters associated with the first client identifier while the online transaction is active;

automatically resolving the account using the set of client-specific parameters and the first set of payment instrument data to generate a resolved account that indicates that the first set of payment instrument data is identified;

automatically resolving the identity using the set of client-specific parameters and the first set of identity attribute data to generate a resolved identity that indicates that the first set of identity attribute data is identified;

route the first resolved account and the resolved identity to a match system, wherein the match system is configured to generate a response code score indicating a likelihood of fraud by:

accessing, from a datastore, historical account data corresponding to the first user account and historical identity data corresponding to the first user account;

comparing the resolved identity against the historical account data to identify a first set of matches between the resolved account and the resolved identity, wherein the historical account data comprises one or more account inquiries;

comparing the resolved account against the historical identity data to identify a second set of matches between the resolved account and the resolved identity, wherein the historical identity data comprises existing account data;

based on the first set of matches and the second set of matches, determining, by applying a rules engine configured with preconfigured rules, a response code score, wherein the preconfigured rules comprise fuzzy match parameters, confidence thresholds, or transaction-type criteria that dynamically adjust confidence levels for different types of transactions, wherein the response code score is based on one or more of the set of client-specific parameters, and wherein the response code score is further based on household data corresponding to the client identifier, wherein the household data comprises an indication of members likely to be associated with a household for the client identifier; and route the response code score to the first identity linkage server, wherein the first identity linkage server is further configured to:

generate a recommended action based on the response code score, wherein the recommended action includes one or more of:

denying or blocking the online transaction;

requesting additional authenticating information with respect to the first user account;

approve the online transaction;

transmit a fraud event alert comprising a summary or indication of a detected fraudulent event to the client system; or contact one or more enforcement authorities regarding the detected fraudulent event; and generate an encrypted and digitally signed data package comprising the response code score and executable instructions that are configured, when executed, to:

display, via the GUI, an alert comprising the response code score; and automatically implement the recommended action without requiring additional user input;

deploy the encrypted data package for automated delivery to a second application programming interface of the client system while the online transaction is still in the active session; and cause execution of the executable instructions to implement the recommended action.

6. The computer-implemented method of claim 5 further comprising specific executable instructions that:

access a third set of transaction data associated with the online transaction in progress delivered via the first application programming interface; and parse the third set of transaction data to determine if the online transaction is one or more of: an account opening, a payment, an account update.

7. The computer-implemented method of claim 5, wherein the first set of payment instrument data includes one more of: credit card number data, debit card number data, direct deposit account data, or routing number data.

8. The computer-implemented method of claim 5, wherein the first set of identity attribute data includes one more of: name data, address data, phone data, electronic mail address data, date of birth data, social security number data, or driver's license data.

9. The computer-implemented method of claim 5, wherein to generate the response code score, the computer-implemented method further comprises specific executable instructions that generate a confidence indicator based on the first set of matches and the second set of matches.

10. A non-transitory computer storage medium storing computer-executable instructions that, when executed by a processor, cause the processor to at least:

receive, from a client system, via a graphical user interface (GUI), a set of client-specific parameters for use in detecting online fraudulent transactions, wherein the GUI comprises a plurality of sets of input elements to enable a client to make selections about one or more client-specific parameters, wherein the one or more client-specific parameters include at least one of: a date, a range of dates, a time of day, a type of transaction, a monetary value of a transaction, and a type of personal identifiable information, and wherein the set of client-specific parameters are associated with a first client identifier;

receive, from the client system, a first request to determine a likelihood of fraud for an online transaction associated with a first user account;

route the first request to a first identity linkage server of a plurality of linkage servers, wherein the first identity linkage server is determined based on a first client type associated with the client system, and wherein the first identity linkage server is configured to resolve an account and an identity by:

accessing, via a first application programming interface of the client system, a first set of payment instrument data associated with the online transaction in an active session and the account;

accessing, via the first application programming interface of the client system, a first set of identity attribute data associated with the online transaction in the active session and an identity, wherein the first set of identity attribute data is generated at a consumer device;

based on the first set of payment instrument data, determining a client identifier associated with the online transaction in progress;

in response to a determination that the first client identifier is associated with the online transaction, applying the set of client-specific parameters associated with the first client identifier while the online transaction is active;

automatically resolving the account using the set of client-specific parameters and the first set of payment instrument data to generate a resolved account that indicates that the first set of payment instrument data is identified;

automatically resolving the identity using the set of client-specific parameters and the first set of identity attribute data to generate a resolved identity that indicates that the first set of identity attribute data is identified;

route the first resolved account and the resolved identity to a match system, wherein the match system is configured to generate a response code score indicating a likelihood of fraud by:

accessing, from a datastore, historical account data corresponding to the first user account and historical identity data corresponding to the first user account;

comparing the resolved identity against the historical account data to identify a first set of matches between the resolved account and the resolved identity, wherein the historical account data comprises one or more account inquiries;

comparing the resolved account against the historical identity data to identify a second set of matches between the resolved account and the resolved identity, wherein the historical identity data comprises existing account data;

based on the first set of matches and the second set of matches, determining, by applying a rules engine configured with preconfigured rules, a response code score, wherein the response code score is based on one or more of the set of client-specific parameters, and wherein the response code score is further based on household data corresponding to the client identifier, wherein the household data comprises an indication of members likely to be associated with a household for the client identifier; and route the response code score to the first identity linkage server, wherein the first identity linkage server is further configured to:

generate a recommended action based on the response code score, wherein the recommended action includes one or more of:

denying or blocking the online transaction;

requesting additional authenticating information with respect to the first user account;

approve the online transaction;

transmit a fraud event alert comprising a summary or indication of a detected fraudulent event to the client system; or contact one or more enforcement authorities regarding the detected fraudulent event; and generate an encrypted data package comprising the response code score and executable instructions that are configured, when executed, to:

display, via the GUI, an alert comprising the response code score; and implement the recommended action without requiring additional user input;

deploy the encrypted data package for automated delivery to a second application programming interface of the client system while the online transaction is still in the active session; and cause execution of the executable instructions to implement the recommended action.

11. The non-transitory computer storage medium of claim 10, further storing computer-executable instructions that:

access a third set of transaction data associated with the online transaction in progress delivered via the first application programming interface; and parse the third set of transaction data to determine if the online transaction is one or more of: an account opening, a payment, an account update.

12. The non-transitory computer storage medium of claim 10, wherein the first set of identity attribute data includes one more of: name data, address data, phone data, electronic mail address data, date of birth data, social security number data, or driver's license data.

13. The non-transitory computer storage medium of claim 10, wherein the first set of payment instrument data includes one more of: credit card number data, debit card number data, direct deposit account data, or routing number data.

14. The non-transitory computer storage medium of claim 10, further storing computer-executable instructions that, when executed by the processor, further cause the processor to at least generate a confidence indicator based on the first set of matches and the second set of matches.

15. The non-transitory computer storage medium of claim 10, wherein automatically resolving the account comprises identifying at least one of: a payment method issuer, bank, country, or type of instrument.

16. The non-transitory computer storage medium of claim 10, wherein a first set of input elements of the plurality of sets of input elements enable a client to make a binary selection associated with at least one of the one or more client-specific parameters.

17. The non-transitory computer storage medium of claim 10, wherein a first set of input elements of the plurality of sets of input elements enable a client to associate a weight with at least one of the one or more client-specific parameters.

18. The non-transitory computer storage medium of claim 10, wherein a first set of input elements of the plurality of sets of input elements enable a client to associate a confidence level with at least one of the one or more client-specific parameters.

19. The non-transitory computer storage medium of claim 10, wherein to generate the response code score, the computer-executable instructions, when executed by the processor, further cause the processor to conduct at least one dark web scan for the first set of payment instrument data.

20. The non-transitory computer storage medium of claim 10, wherein to generate the response code score, the computer-executable instructions, when executed by the processor, further cause the processor to determine, based on historical transaction inquiry data, whether at least one of the first set of matches or the second set of matches are associated with a potentially fraudulent transaction.

* * * * *